US011016257B2

(12) United States Patent
Aznag et al.

(10) Patent No.: US 11,016,257 B2
(45) Date of Patent: May 25, 2021

(54) TELECOMMUNICATIONS ENCLOSURE AND ORGANIZER

(71) Applicant: CommScope Connectivity Belgium BVBA, Kessel-Lo (BE)

(72) Inventors: Mohamed Aznag, Scherpenheuvel (BE); Emilie De Groe, Kessel-Lo (BE); Eric Marcel M. Keustermans, Houwaart (BE); Diederik Houben, Berbroek (BE); Philippe Coenegracht, Hasselt (BE); Pieter Doultremont, Kermt-Hasselt (BE); Geert Van Genechten, Vorselaar (BE); Maddy Nadine Frederickx, Aarschot (BE); Maarten Michiels, Herent (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

(21) Appl. No.: 16/546,489

(22) Filed: Aug. 21, 2019

(65) Prior Publication Data

US 2020/0049916 A1   Feb. 13, 2020

Related U.S. Application Data

(63) Continuation of application No. 15/784,553, filed on Oct. 16, 2017, now Pat. No. 10,444,455, which is a
(Continued)

(51) Int. Cl.
*G02B 6/44* (2006.01)
*G02B 6/00* (2006.01)

(52) U.S. Cl.
CPC ......... *G02B 6/4446* (2013.01); *G02B 6/4444* (2013.01); *G02B 6/4452* (2013.01);
(Continued)

(58) Field of Classification Search
CPC .................................. G02B 6/44; G02B 6/00
(Continued)

(56) References Cited

U.S. PATENT DOCUMENTS

| 4,498,732 A | 2/1985 | Campbell et al. |
| 5,222,183 A | 6/1993 | Daems et al. |

(Continued)

FOREIGN PATENT DOCUMENTS

| DE | 3136738 A1 | 3/1983 |
| DE | 20 2006 008 654 U1 | 9/2006 |

(Continued)

OTHER PUBLICATIONS

International Search Report for International Application No. PCT/EP2013/055989 dated Aug. 14, 2013 (5 pages).

*Primary Examiner* — Kaveh C Kianni
(74) *Attorney, Agent, or Firm* — Merchant & Gould P.C.

(57) ABSTRACT

A closure includes a cover and seal block. A feeder cable pathway and rear cover is provided for separation of feeder cables from drop cables. The organizer in the closure includes an end cap and rear cable storage. Cable fixation clips, linear or bendable, can be used individually or daisy chained together. Cable fixation chambers are positioned on top of the gel block housing. The organizer is a click together organizer. Dual heights on cable guides on sides of the groove plate facilitate cable installation. Tray supports with rounded ends prevent looseness of the tray mounts. Other organizers include cable routing features for compact storage.

17 Claims, 55 Drawing Sheets

Related U.S. Application Data continuation of application No. 14/390,535, filed as application No. PCT/EP2013/055989 on Mar. 21, 2013, now Pat. No. 9,791,653.

(60) Provisional application No. 61/619,747, filed on Apr. 3, 2012, provisional application No. 61/766,514, filed on Feb. 19, 2013.

(52) U.S. Cl.
CPC ......... *G02B 6/4454* (2013.01); *G02B 6/4445* (2013.01); *G02B 6/4455* (2013.01)

(58) Field of Classification Search
USPC ........................................................ 385/135
See application file for complete search history.

(56) References Cited

U.S. PATENT DOCUMENTS

| | | | | |
|---|---|---|---|---|
| 5,278,933 | A * | 1/1994 | Hunsinger | G02B 6/4442 385/135 |
| 5,323,480 | A | 6/1994 | Mullaney et al. | |
| 5,473,724 | A | 12/1995 | Board et al. | |
| 5,479,553 | A | 12/1995 | Daems et al. | |
| 5,515,472 | A | 5/1996 | Mullaney et al. | |
| 5,530,786 | A | 6/1996 | Radliff et al. | |
| 5,553,186 | A | 9/1996 | Allen | |
| 5,631,993 | A * | 5/1997 | Cloud | G02B 6/4446 385/135 |
| 5,644,671 | A * | 7/1997 | Goetter | G02B 6/4446 385/135 |
| 5,751,882 | A | 5/1998 | Daems et al. | |
| 5,754,723 | A | 5/1998 | Fremgen | |
| 5,764,843 | A | 6/1998 | Macken et al. | |
| 5,764,844 | A | 6/1998 | Mendes | |
| 5,907,653 | A * | 5/1999 | Burek | G02B 6/3801 385/135 |
| 5,911,027 | A | 6/1999 | Macken et al. | |
| 6,009,224 | A | 12/1999 | Allen | |
| 6,009,225 | A | 12/1999 | Ray et al. | |
| 6,215,939 | B1 * | 4/2001 | Cloud | G02B 6/4444 385/134 |
| 6,226,435 | B1 | 5/2001 | Hunsinger | |
| 6,304,707 | B1 | 10/2001 | Daems et al. | |
| 6,424,782 | B1 | 7/2002 | Ray | |
| 6,504,986 | B1 | 1/2003 | Wambeke et al. | |
| 6,507,691 | B1 * | 1/2003 | Hunsinger | G02B 6/4454 385/135 |
| 6,788,871 | B2 | 9/2004 | Taylor | |
| 6,792,191 | B1 * | 9/2004 | Clapp, Jr. | G02B 6/4452 385/135 |
| 6,827,597 | B1 * | 12/2004 | Metzbower | H01R 13/502 439/320 |
| 7,113,686 | B2 | 9/2006 | Bellekens et al. | |
| 7,340,145 | B2 | 3/2008 | Allen | |
| 8,055,114 | B2 | 11/2011 | Kluwe et al. | |
| 8,213,761 | B2 * | 7/2012 | Gronvall | G02B 6/4471 385/135 |
| 8,355,615 | B2 | 1/2013 | Vastmans et al. | |
| 8,472,775 | B2 * | 6/2013 | Corbille | G02B 6/445 385/135 |
| 8,705,926 | B2 * | 4/2014 | Giraud | G02B 6/4452 385/135 |
| 8,965,168 | B2 * | 2/2015 | Cowen | G02B 6/4452 385/135 |
| 9,075,217 | B2 * | 7/2015 | Giraud | G02B 6/4452 |
| 2002/0191937 | A1 * | 12/2002 | Knox | G02B 6/4453 385/135 |
| 2004/0175090 | A1 | 9/2004 | Vastmans et al. | |
| 2004/0228598 | A1 * | 11/2004 | Allen | G02B 6/4452 385/135 |
| 2004/0256138 | A1 * | 12/2004 | Grubish | H02G 3/22 174/93 |
| 2005/0145522 | A1 * | 7/2005 | Bloodworth | G02B 6/4457 206/409 |
| 2005/0175307 | A1 * | 8/2005 | Battey | G02B 6/3897 385/135 |
| 2005/0207711 | A1 * | 9/2005 | Vo | G02B 6/4444 385/94 |
| 2005/0213921 | A1 * | 9/2005 | Mertesdorf | G02B 6/3897 385/135 |
| 2005/0271344 | A1 * | 12/2005 | Grubish | G02B 6/445 385/135 |
| 2006/0275009 | A1 * | 12/2006 | Ellison | G02B 6/4452 385/135 |
| 2007/0183732 | A1 * | 8/2007 | Wittmeier | G02B 6/4442 385/135 |
| 2008/0067110 | A1 * | 3/2008 | Taylor | C10G 25/05 208/254 R |
| 2009/0046985 | A1 * | 2/2009 | Gronvall | G02B 6/4442 385/135 |
| 2009/0060421 | A1 * | 3/2009 | Parikh | G02B 6/4442 385/71 |
| 2009/0185782 | A1 * | 7/2009 | Parikh | G02B 6/4446 385/135 |
| 2009/0238531 | A1 * | 9/2009 | Holmberg | G02B 6/4454 385/135 |
| 2009/0252472 | A1 * | 10/2009 | Solheid | G02B 6/4447 385/135 |
| 2009/0304341 | A1 * | 12/2009 | Shimirak | H02G 15/013 385/135 |
| 2010/0183274 | A1 * | 7/2010 | Brunet | G02B 6/4454 385/135 |
| 2011/0052133 | A1 * | 3/2011 | Simmons | G02B 6/4455 385/135 |
| 2011/0217017 | A1 * | 9/2011 | Drouard | H02G 15/013 385/135 |
| 2013/0074311 | A1 | 3/2013 | Vastmans et al. | |
| 2013/0209049 | A1 * | 8/2013 | Kowalczyk | G02B 6/4457 385/135 |
| 2013/0322839 | A1 | 12/2013 | Claessens et al. | |
| 2014/0193129 | A1 | 7/2014 | Bryon et al. | |
| 2014/0321825 | A1 | 10/2014 | Claessens et al. | |
| 2015/0168663 | A1 | 6/2015 | Aznag et al. | |
| 2015/0205064 | A1 | 7/2015 | Claessens et al. | |

FOREIGN PATENT DOCUMENTS

| | | | | |
|---|---|---|---|---|
| EP | 0216073 | A1 | 4/1987 | |
| EP | 1180707 | A2 | 2/2002 | |
| EP | 1157295 | A1 | 11/2002 | |
| EP | 1 843 182 | A1 | 10/2007 | |
| EP | 2549316 | A1 | 1/2013 | |
| EP | 2680055 | A1 | 1/2014 | |
| ES | 2551595 | A2 | 11/2015 | |
| IT | 1294356 | B1 | 3/1999 | |
| WO | 96/32660 | A1 | 10/1996 | |
| WO | 1997002504 | A1 | 1/1997 | |
| WO | 1998048308 | A1 | 10/1998 | |
| WO | 2000033118 | A1 | 6/2000 | |
| WO | 2000065397 | A1 | 11/2000 | |
| WO | 2004/051337 | A1 | 6/2004 | |
| WO | WO-2004051337 | A1 * | 6/2004 | ........ G02B 6/4445 |
| WO | 2007/027388 | A2 | 3/2007 | |
| WO | 2008/067110 | A1 | 6/2008 | |
| WO | 2011131505 | A1 | 10/2011 | |
| WO | 2012019936 | A1 | 2/2012 | |
| WO | 2012045663 | A1 | 4/2012 | |
| WO | 2012168372 | A1 | 12/2012 | |
| WO | 2012171864 | A1 | 12/2012 | |
| WO | 2013139622 | A1 | 9/2013 | |
| WO | 2014122103 | A1 | 8/2014 | |

\* cited by examiner

FIG. 23
FIG. 24
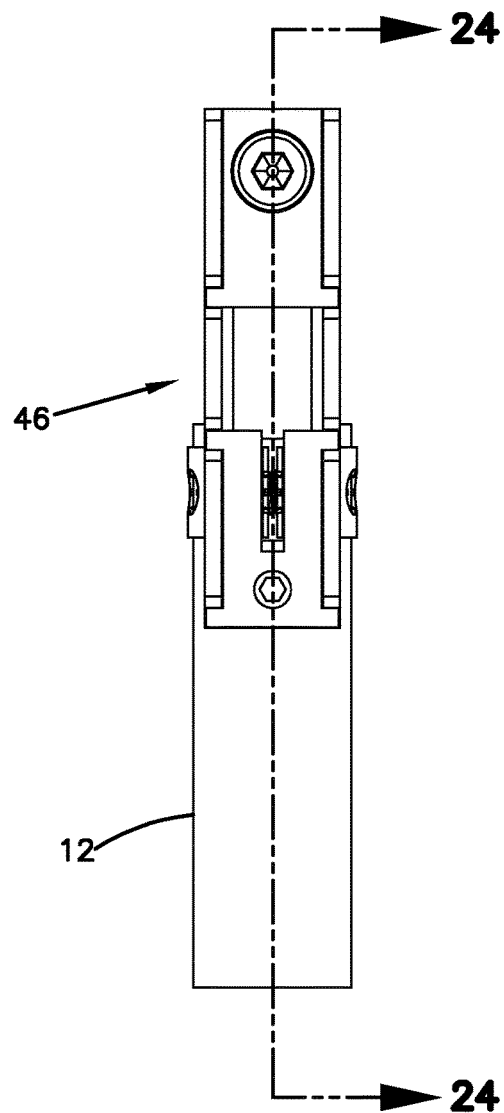
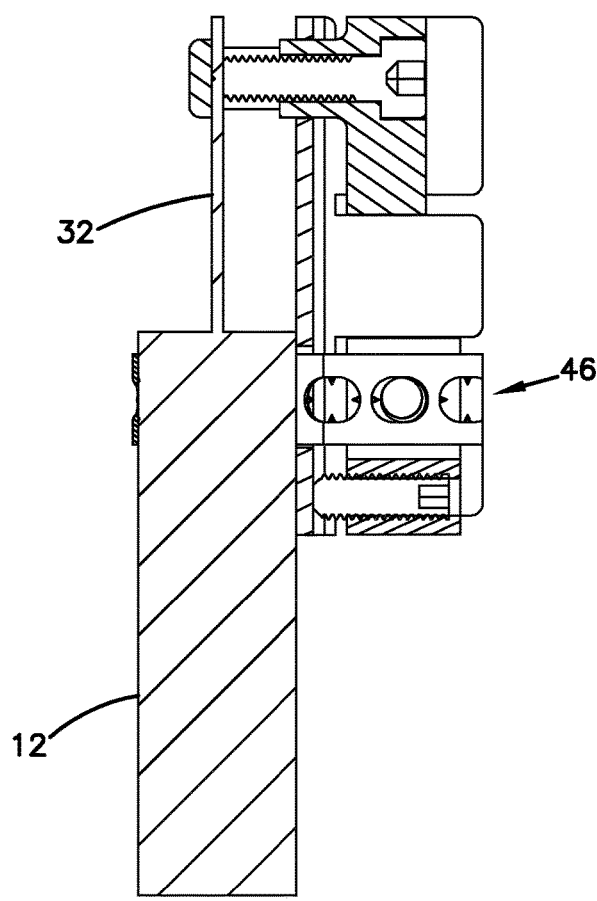

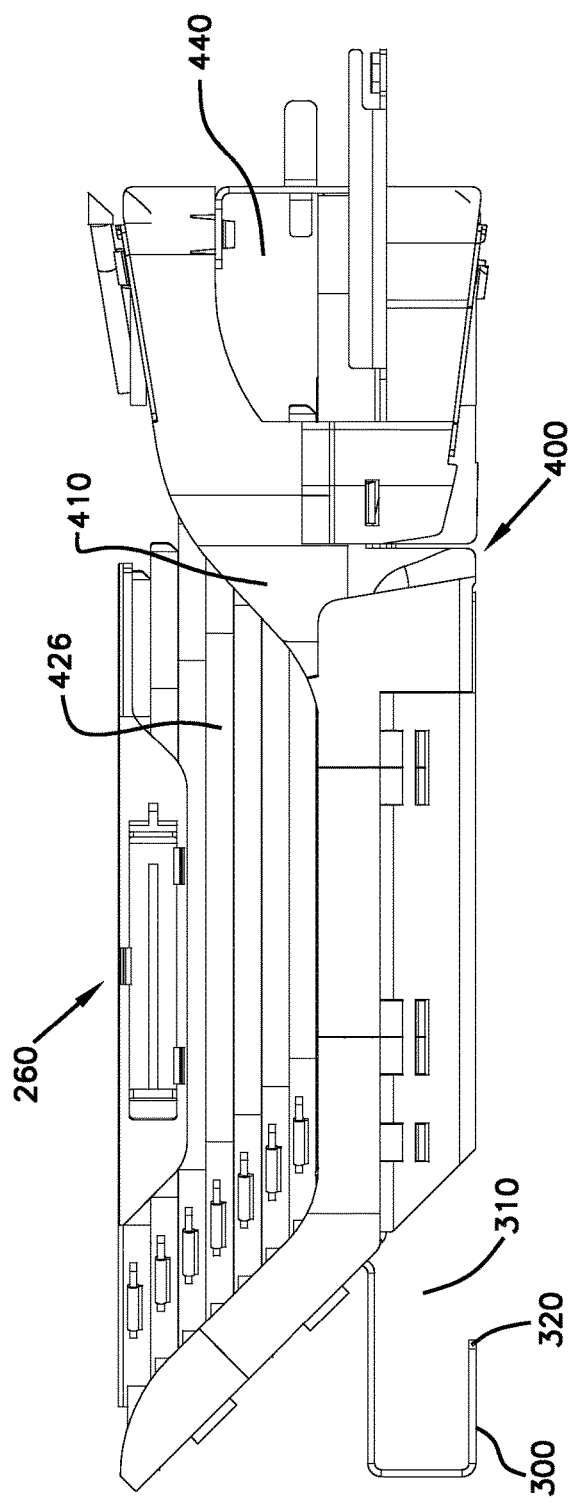
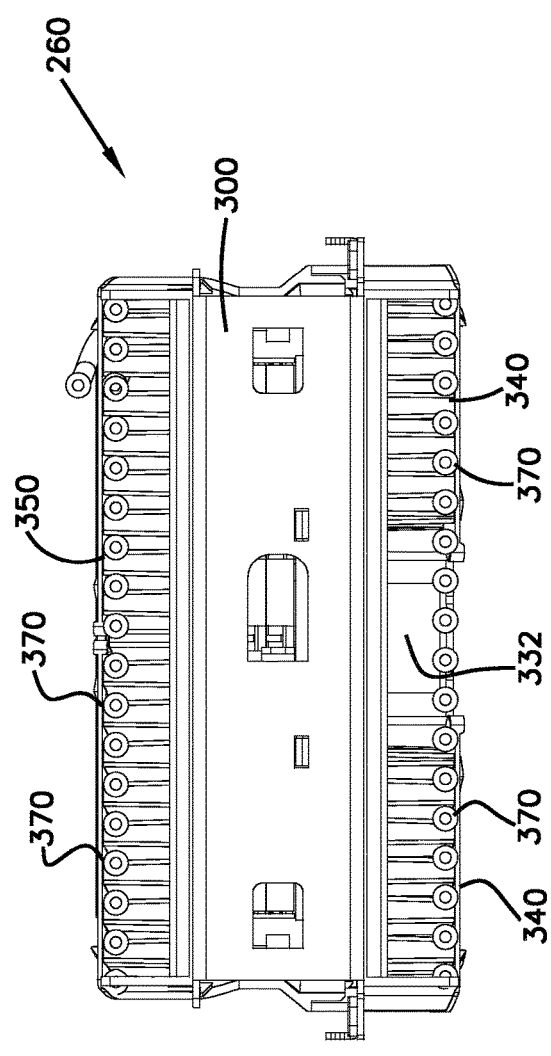
FIG. 51
FIG. 52

TELECOMMUNICATIONS ENCLOSURE AND ORGANIZER

This application is a Continuation of U.S. patent application Ser. No. 15/784,553 filed 16 Oct. 2017, now U.S. Pat. No. 10,444,455, which is a Continuation of U.S. patent application Ser. No. 14/390,535 filed 3 Oct. 2014, now U.S. Pat. No. 9,791,653, which is a National Stage Application of PCT/EP2013/055989, filed 21 Mar. 2013, which claims benefit of U.S. Provisional Ser. No. 61/619,747, filed 3 Apr. 2012 and U.S. Provisional Ser. No. 61/766,514, filed 19 Feb. 2013 and which applications are incorporated herein by reference. To the extent appropriate, a claim of priority is made to each of the above disclosed applications.

TECHNICAL FIELD

The present disclosure relates to telecommunications enclosures, and more particularly to telecommunications enclosures including cable organizers for fiber optic cables.

BACKGROUND

Telecommunications system typically employ a network of telecommunications cables capable of transmitting large volumes of data and voice signals over relatively long distances. Telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures or "closures" are adapted to house an protect telecommunications components such as splices, termination panels, power splitters, and wave division multiplexors.

It is often preferred for telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to reseal the enclosures. Other telecommunications enclosures take the form of elongated sleeves formed by wrap around covers or half-shells having longitudinal edges that are joined by clamps or other retainers. Still other telecommunications enclosures include two half-pieces that are joined together through clamps, wedges or other structures. Telecommunications enclosures are typically sealed to inhibit the intrusion of moisture or other contaminants.

SUMMARY

The enclosure includes a cover having a dome configuration with an open end. A seal block seals the open end. The seal block allows for cables to enter and exit an interior of the enclosure. The seal block includes a gel seal with cable openings in one embodiment. The seal block includes an upper portion and a lower portion.

In one embodiment, the seal block includes arms which are moveable relative to a remainder of the seal block to allow for cable access during assembly or re-entry. The seal block mounts to the cover with side latches. The cover is not cylindrical and has at the open end a dimension L which is longer than a dimension W in the cross-direction. Arms on the seal block between the side latches mount to tabs on the cover to further secure the seal block to the cover.

In another embodiment, the seal block mounts to a base. The base mounts to the dome with a seal.

An upper portion of the seal block defines mounting locations for cable fixation clamps which mount to cables entering or exiting enclosure.

The interior defines a space for telecommunications equipment, such as storage, splitter or splice trays, positioned on a frame. Various areas for cable routing are also provided in addition to the cable routing on the storage trays. The enclosure can be used in any orientation. In the present description, the seal block is positioned at the bottom.

A cable organizer mounts to the seal block with snaps or other mounting structures such as fasteners. The organizer includes various clips, dividers, or other elements which define cable pathways and cable retention features for the internal cabling within the interior.

A first block of the organizer mounts to an upper portion of the seal block. One or more groove plates for holding trays mount to the first block and to each other in a stack. An end loop mounts to the upper most groove plate. On a front side of the organizer, trays can be mounted. On a rear side of the organizer, loop cable storage can be provided. Preferably the first block snap mounts to the upper portion of the seal block. Preferably the groove plates snap to the first block and to each other, and to the end loop plate.

Alternatively, one or more organizer blocks mount to the seal block, and cable trays are mounted to the organizer blocks.

In the present description, the front and rear are relative terms and could be reversed, or could be top/bottom if the enclosure's orientation is changed.

The first block defines one or two cable slots, on at least one side, and preferably has two slots on each side.

The first block includes a cable storage area on the front. The first block further includes mounting posts for mounting of clips for cables extending to the organizer.

On a rear side of the organizer, a divider plate mounts to a rear of first block to provide for segregated cable passageways between feeder cables and drop cables.

The divider plate preferably includes mounting posts for mounting of clips.

On the groove plates, pairs of fiber retainer fingers are provided for fiber retention. At least one finger includes a tab, and one finger is taller than an end of an adjacent finger. Such a construction facilitates ease of fiber placement.

The rear side further defines a loop cable storage basket formed by the first block, the groove plate or plates, and the end plate. The loop pathway is further constructed with clips mounted to mounting posts.

The clips can be mounted linearly, or they can be mounted at an angle. Each clip includes a mounting pocket for receiving one of the mounting posts. A snap mount feature retains the clip with the respective mounting post. A cable retention feature defines a closed loop and can be provided with a mounting clip positioned on the clip wherein the mounting pocket defines a mounting location for holding an extension of the clip. In this manner, adjacent clips mount in a daisy chain style arrangement to create closed loop areas for cables. The clips can also mount to clip elements on the frame, groove plate, front plate or rear divider plate to form a closed loop.

The trays are pivotally mounted to the groove plates. A shaft is received by arms of the groove plate to retain the trays in a pivoted manner. A shaft includes a non-cylindrical portion which facilitates positioning of the tray in a desired position, such as in a storage position or in an access position. The tray includes a rounded knob which rests against a base portion of groove plate to maintain trays in the desired position, wherein looseness is reduced.

Alternative cable routings are provided with alternative organizers disclosed herein. Some designs promote dense arrangements with a low profile.

BRIEF DESCRIPTION OF THE DRAWINGS

FIG. 23 is a side view of the cable clamp;

FIG. 24 is a cross-sectional view of the cable clamp of FIG. 23;

FIG. 51 is a side view of the organizer of FIG. 48;

FIG. 52 is an end view of the organizer of FIG. 48;

DETAILED DESCRIPTION

Figure 1:
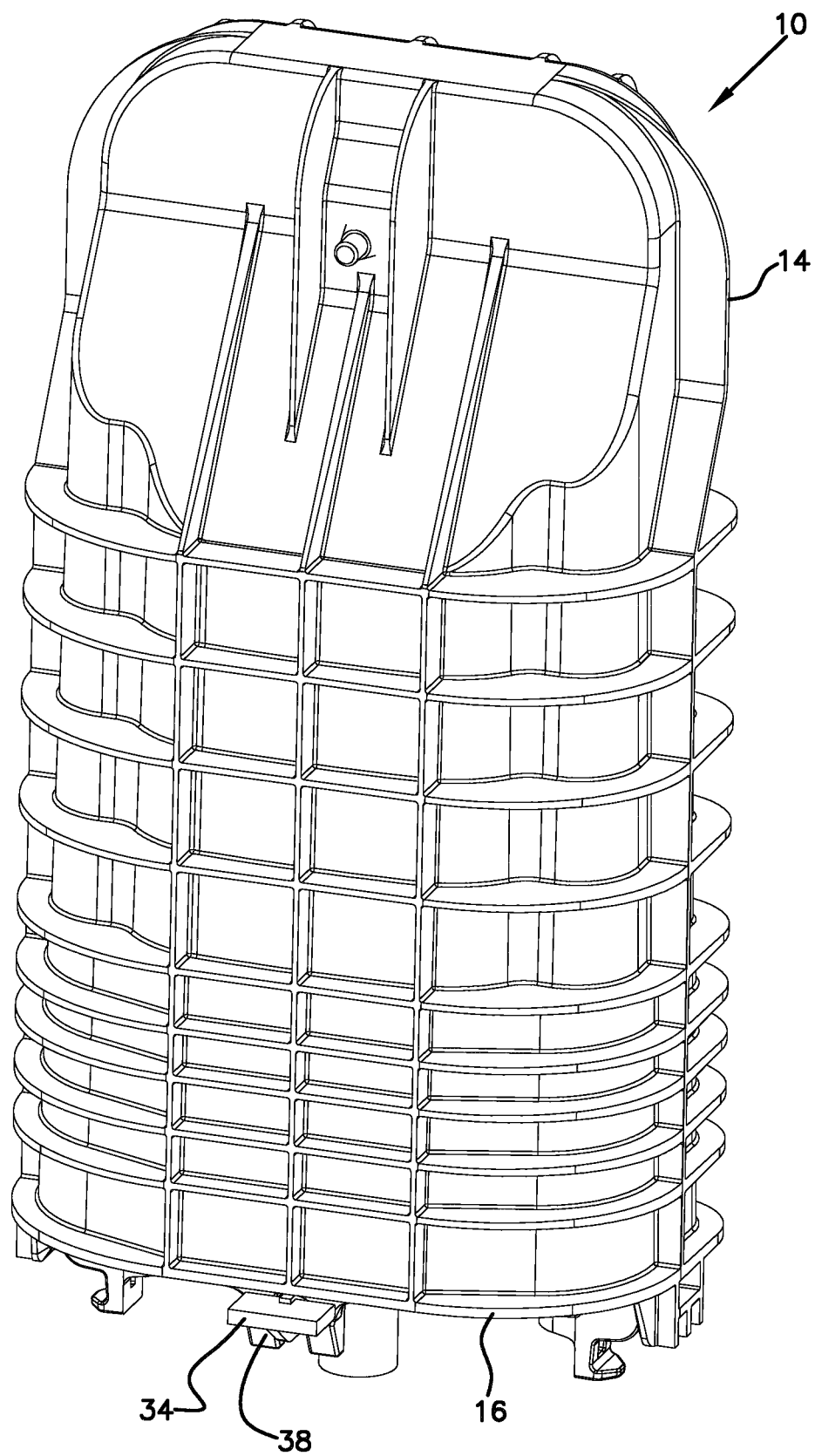
FIG. 1 is a perspective view of a telecommunications enclosure.
Figure 2:
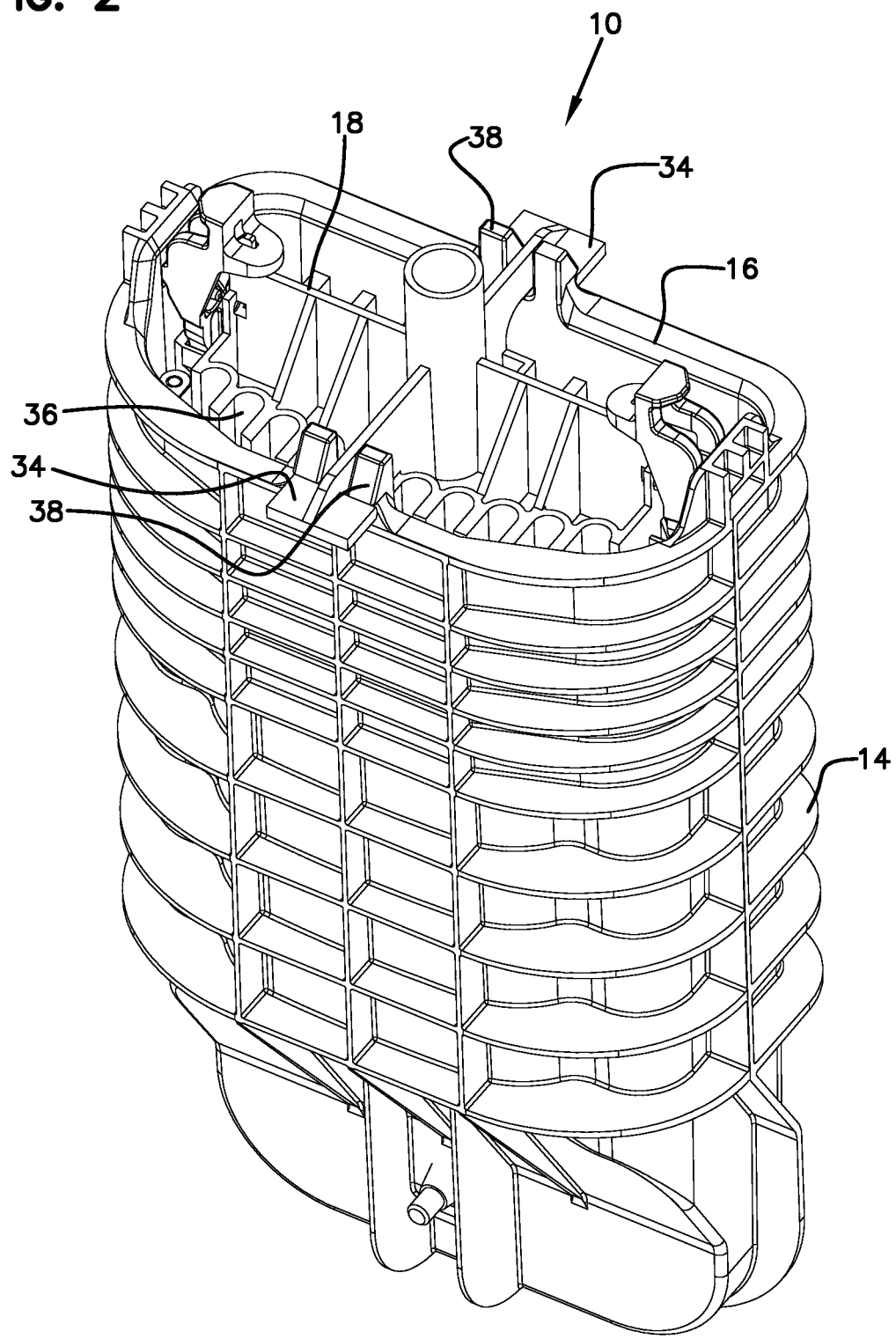
FIG. 2 is another perspective view of the telecommunications enclosure.
Figure 3:
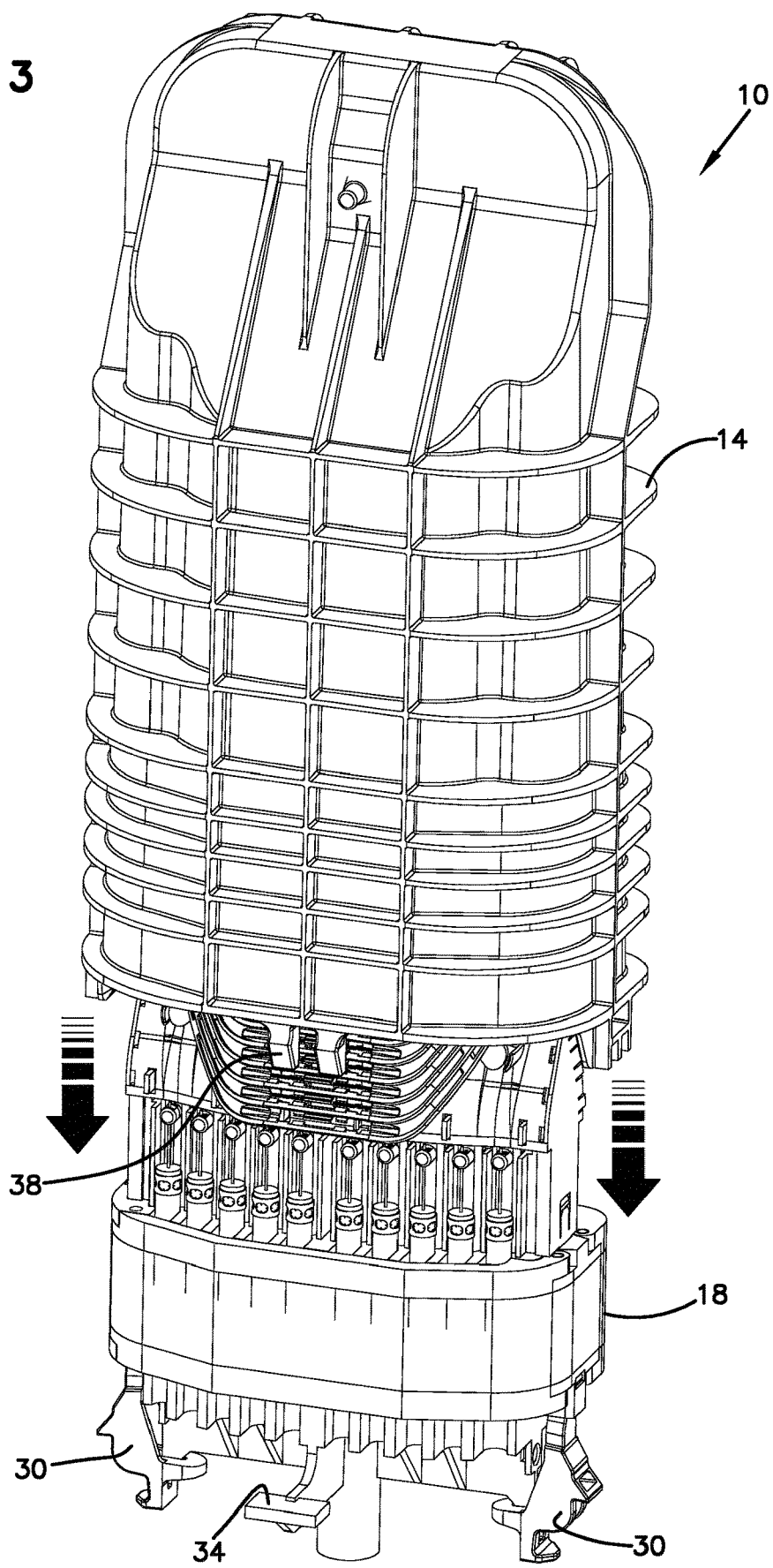
FIG. 3 is a perspective view showing the cover being removed from the seal and interior frame.
Figure 4:
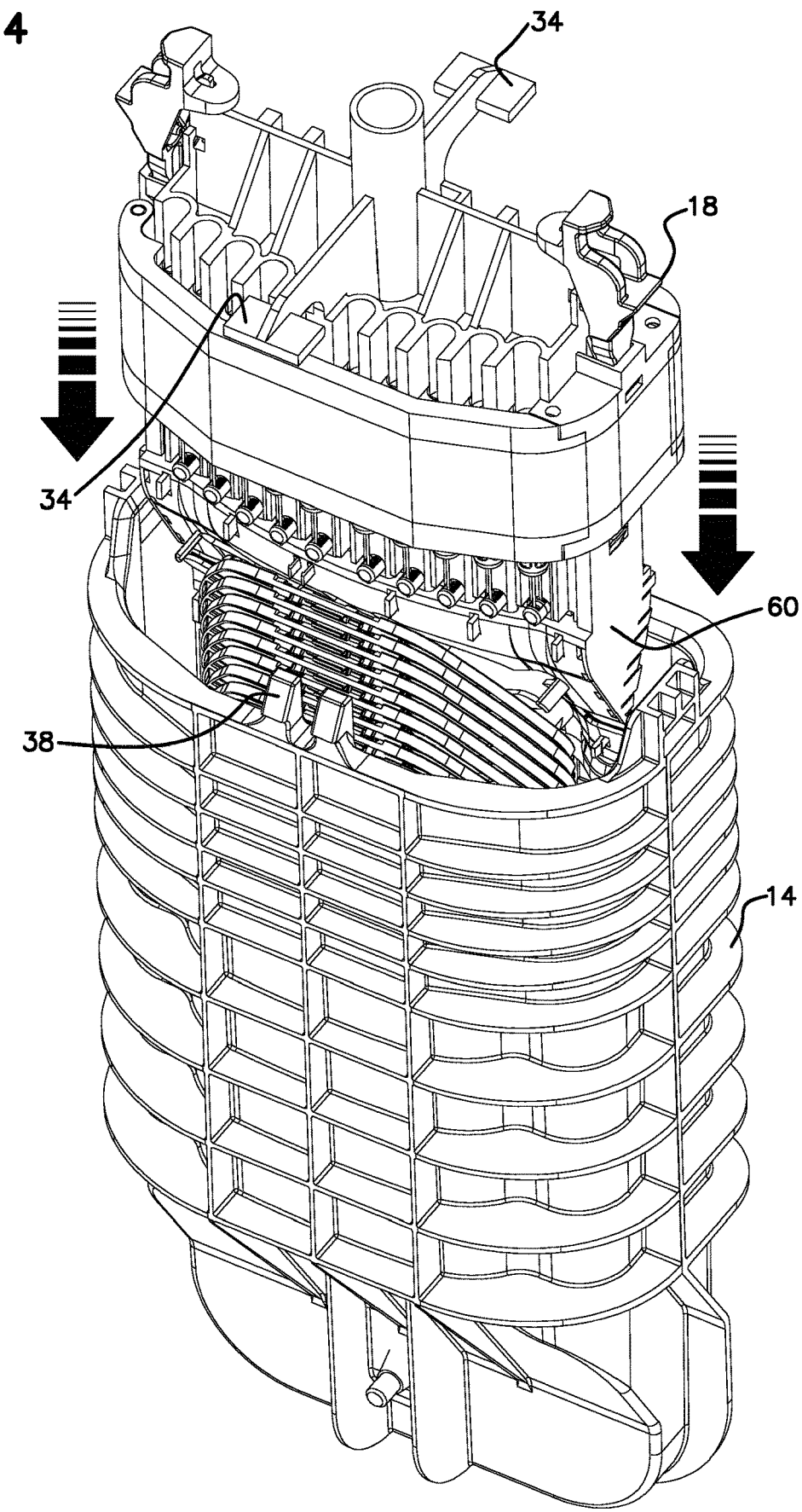
FIG. 4 is another perspective view of the seal and interior frame being removed from the cover.
Figure 5:
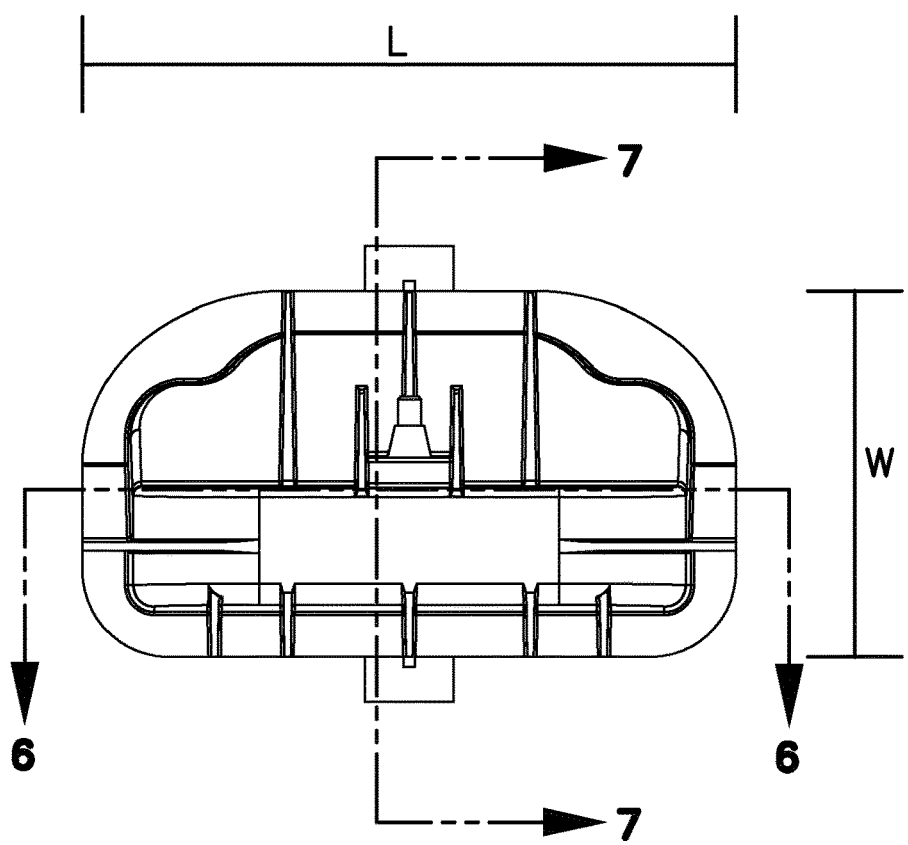
FIG. 5 is an end view of the telecommunications enclosure.

Referring now to the FIGS., closure 10 for cables 12 includes a cover 14 having a dome configuration with an open end 16. A seal block 18 seals open end 16. Seal block 18 allows for cables to enter and exit an interior 20 of closure 10. Seal block 18 includes a gel seal 22. Seal block 18 includes an upper portion 24 and a lower portion 26 with openings 28 for cables. Gel seal 22 is formed from separate portions for assembly with the cables 12, and for re-entry.

Seal block 18 mounts to cover 14 with latches 30. Cover 14 is not round and has at open end 16 a dimension L which is longer than a dimension W in the cross-direction.

Under pressure, there may be a tendency for cover 14 to expand outwardly, thereby resulting in a loss of seal. Arms 34 on seal block 18 mount to tabs 38 on cover 14 to further secure seal block 18 to cover 14.

Figure 27:
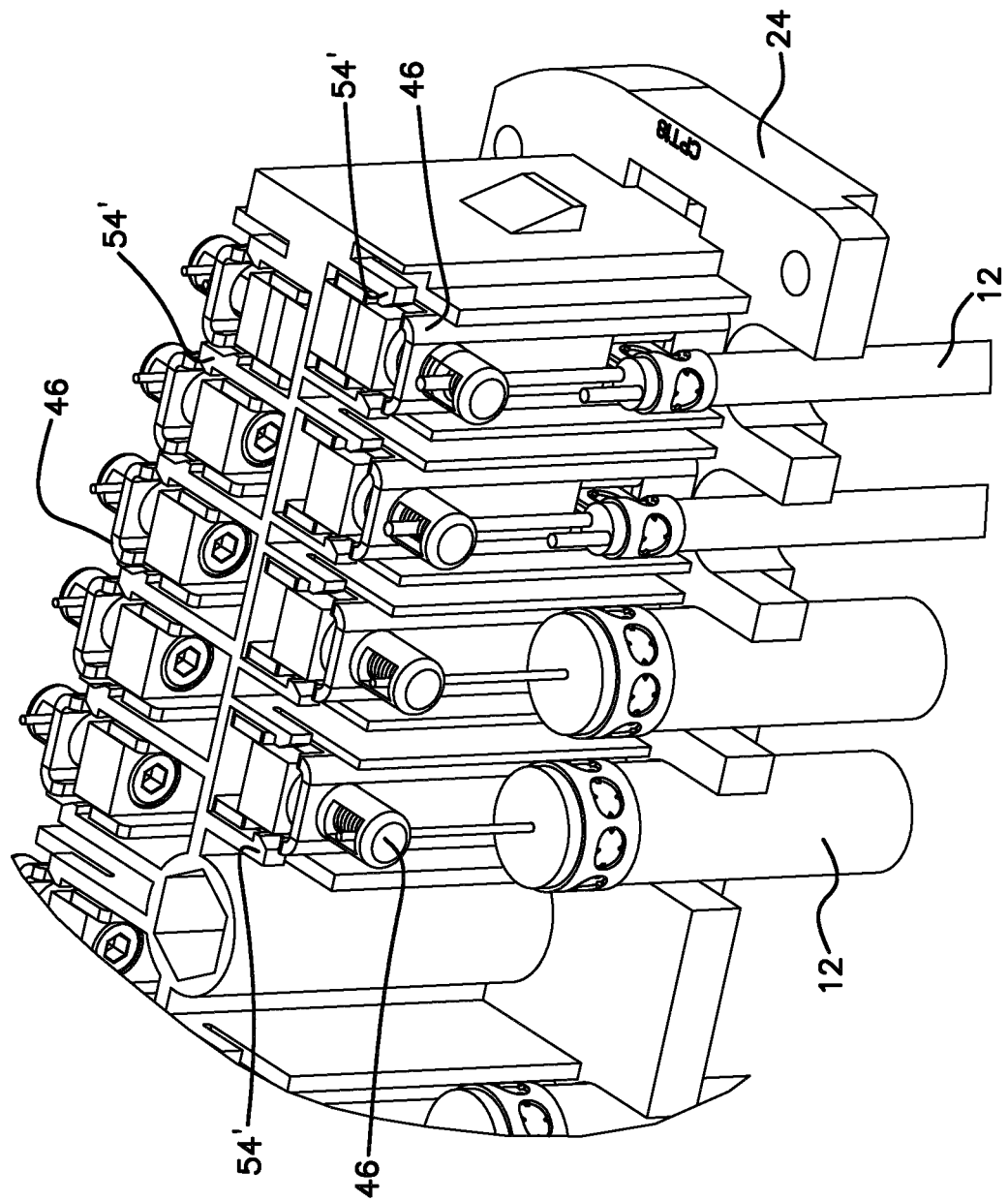
FIG. 27 shows the cable clamps mounted to the seal block with an alternative clip arrangement.
Figure 28:
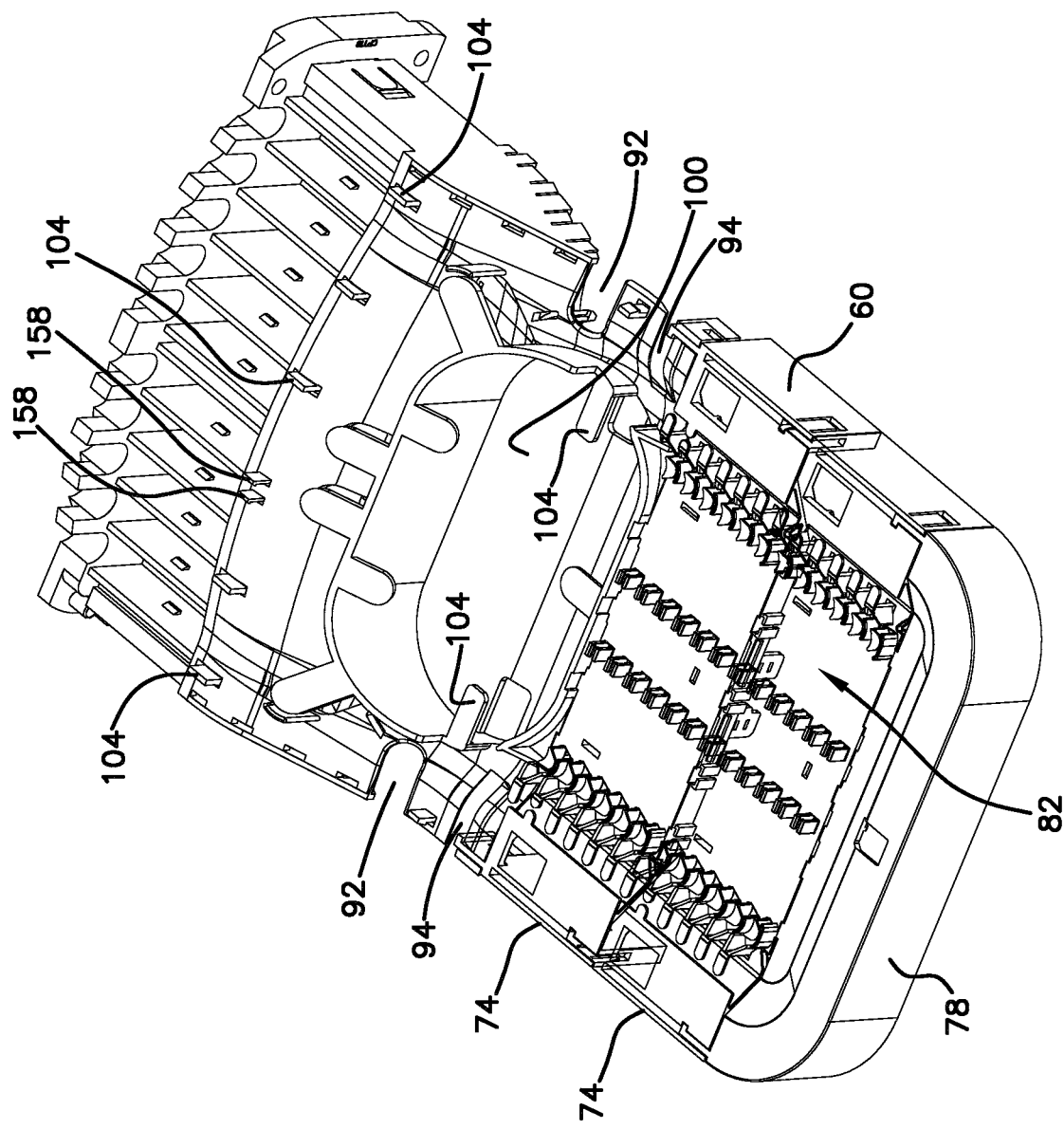
FIG. 28 is a perspective view of the organizer and upper portion of the seal block.
Figure 29:
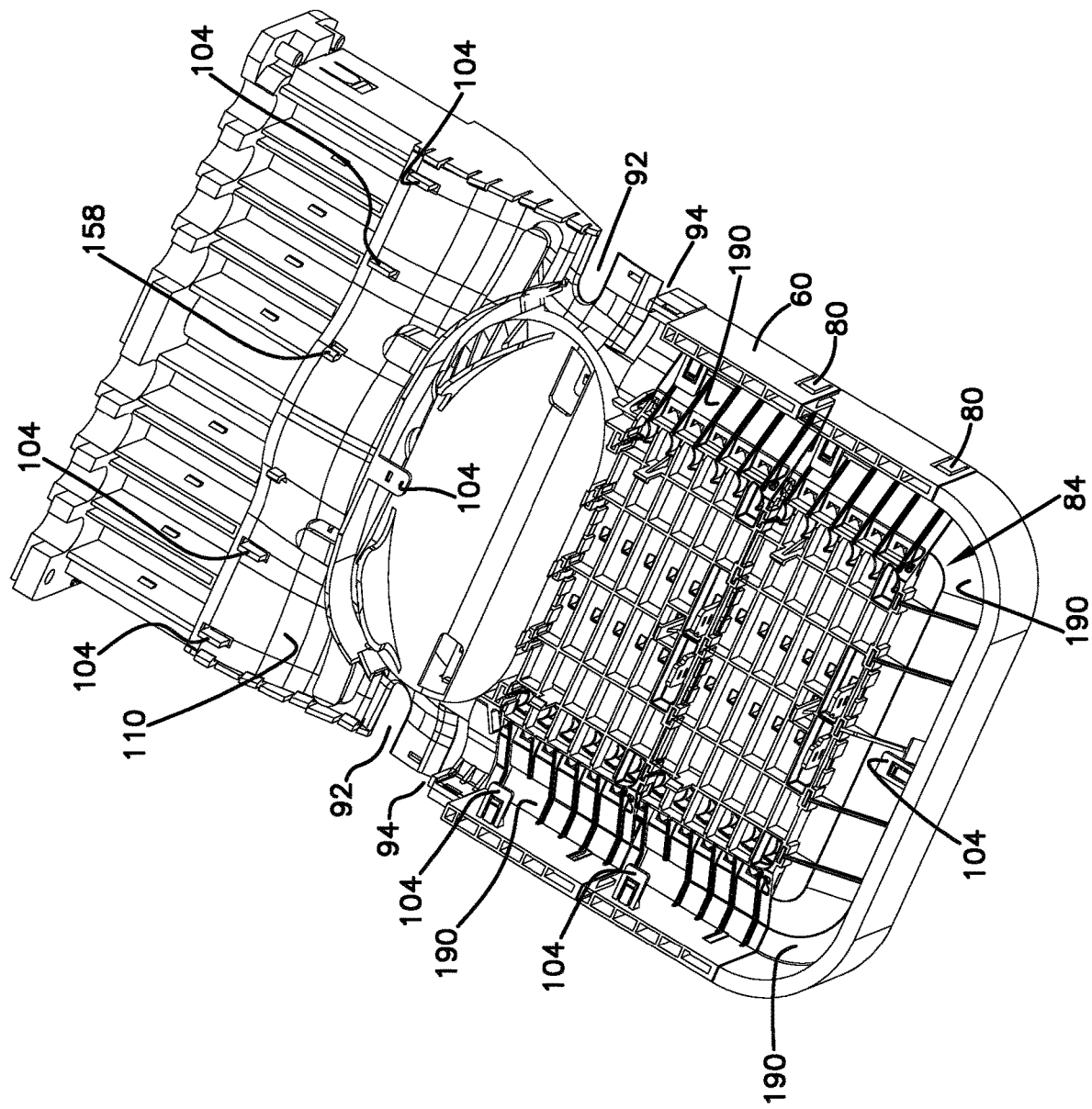
FIG. 29 is a further perspective view of the organizer of FIG. 28.
Figure 30:
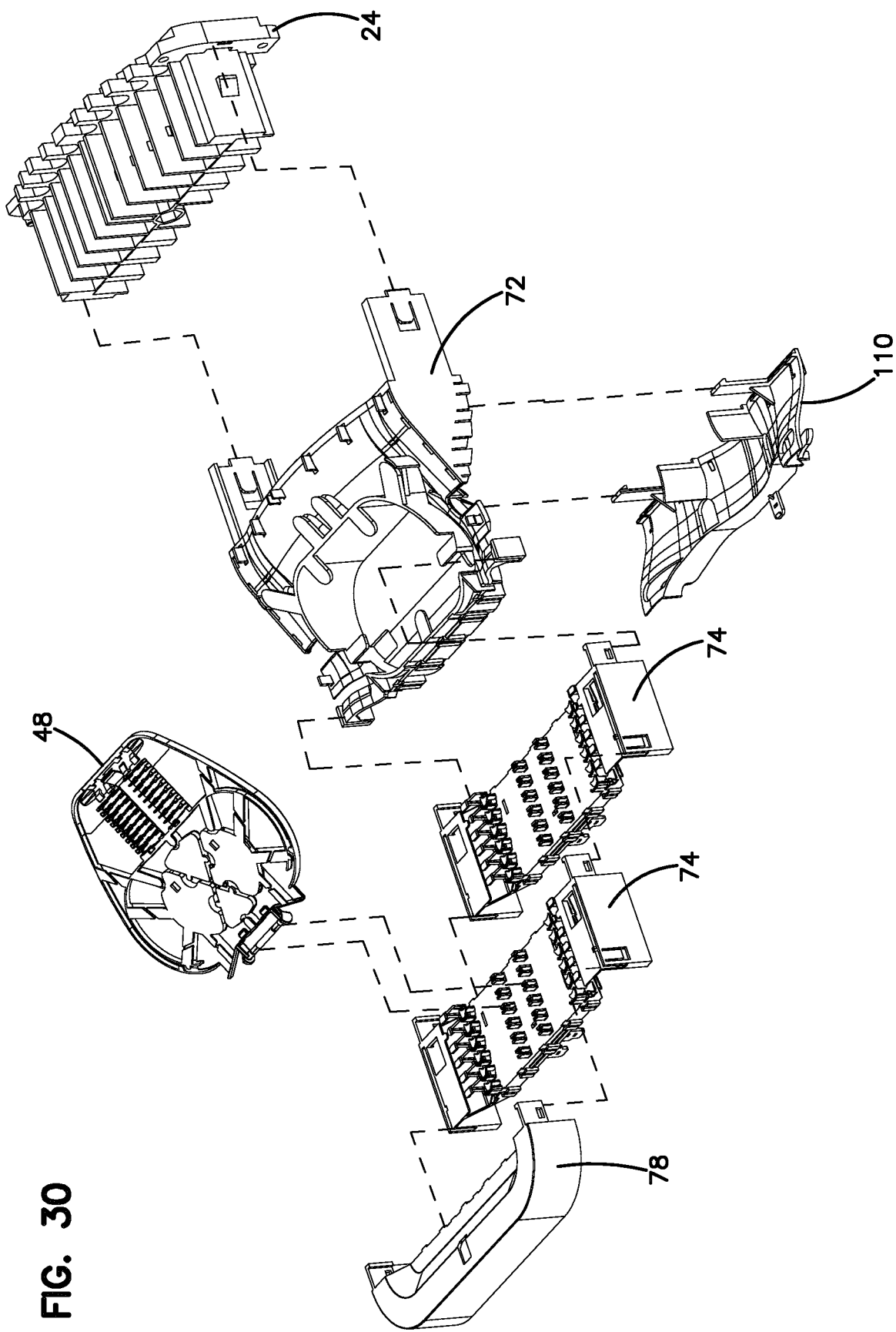
FIG. 30 is an exploded view of the organizer of FIG. 29 in perspective view.
Figure 31:
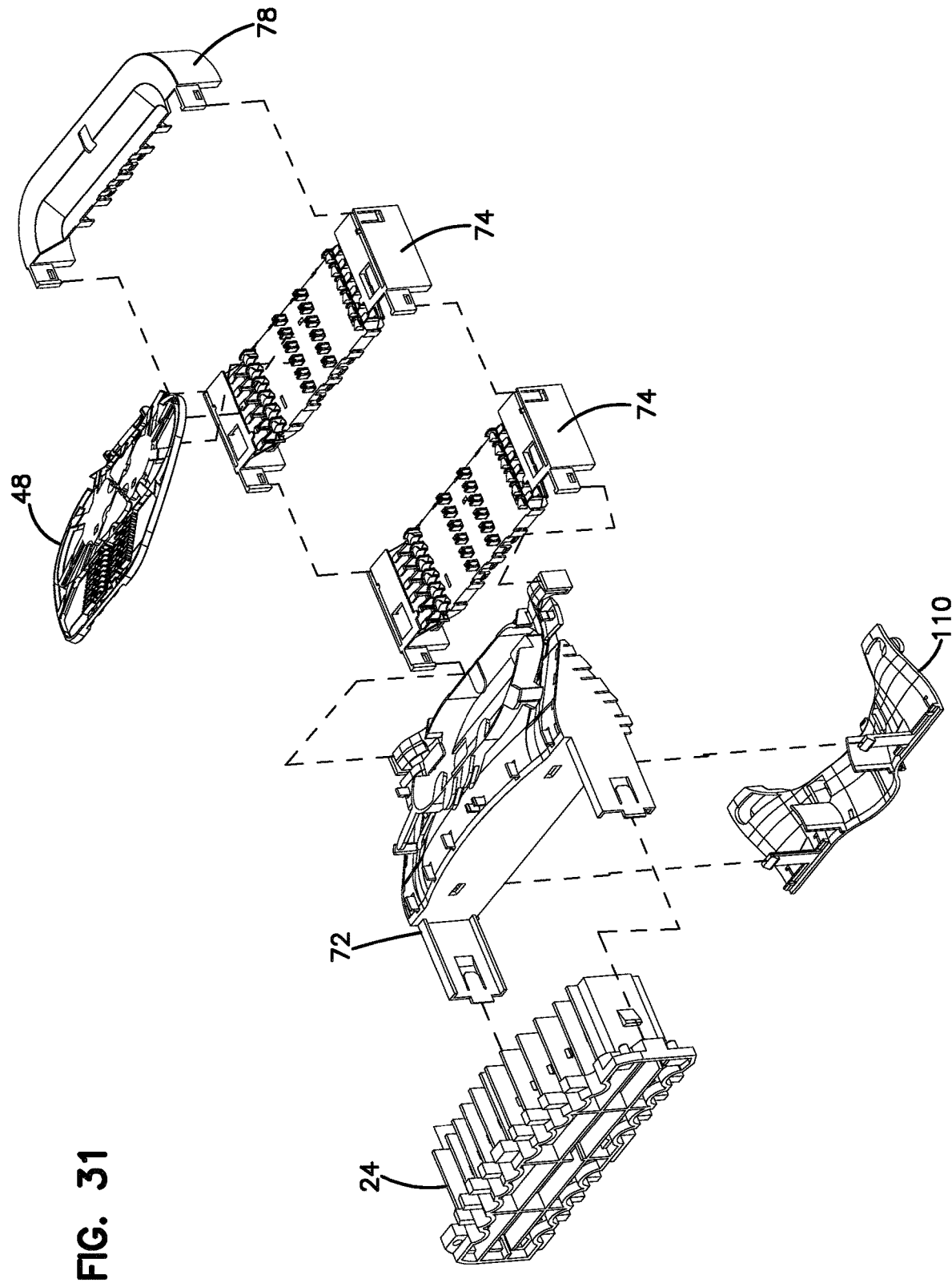
FIG. 31 is a further perspective view of the organizer of FIG. 10.
Figure 32:
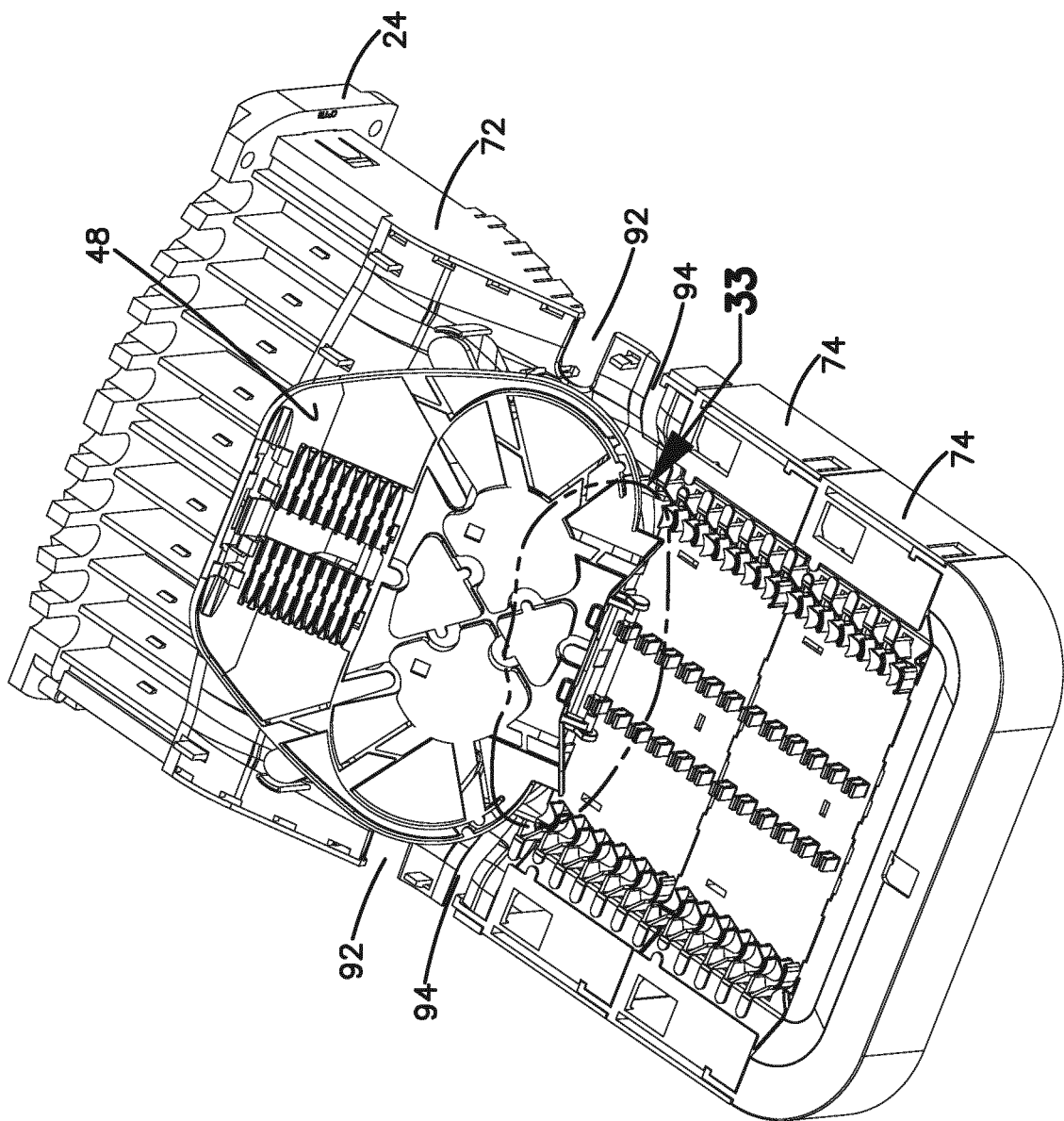
FIG. 32 is a perspective view of the organizer of FIGS. 28-31 showing a fiber tray.
Figure 33:
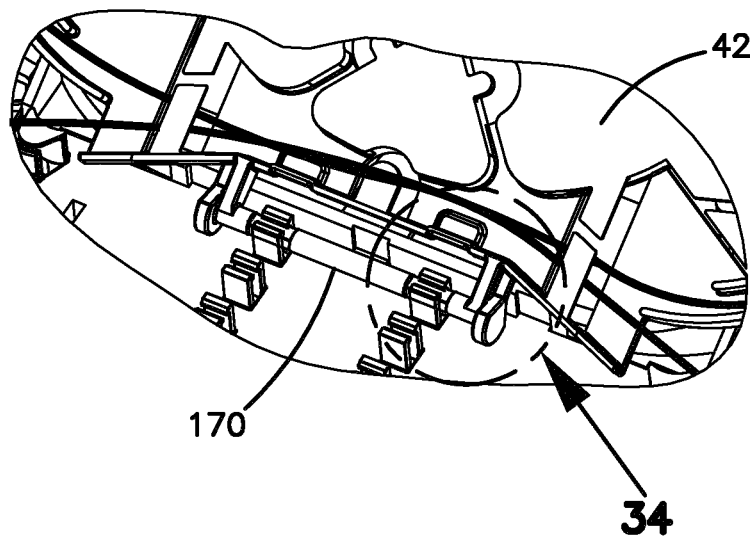
FIG. 33 shows a detail view of the mounting of the tray to the organizer.
Figure 34:
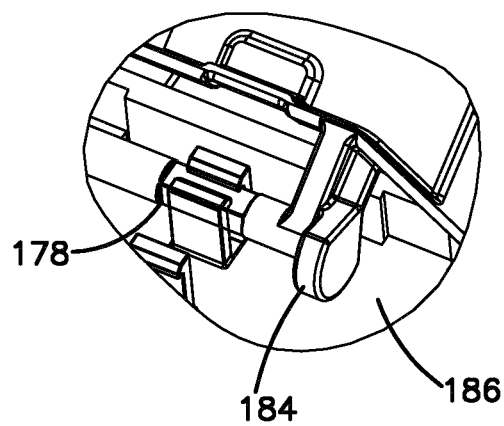
FIG. 34 shows a further enlarged view of a portion of the mounting of the tray to the organizer.
Figure 35:
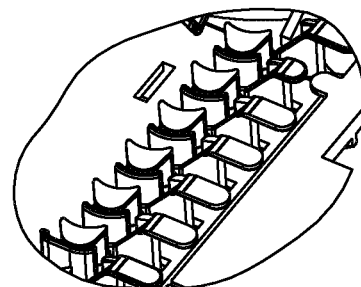
FIG. 35 shows the cable management fingers of a groove plate.
Figure 36:
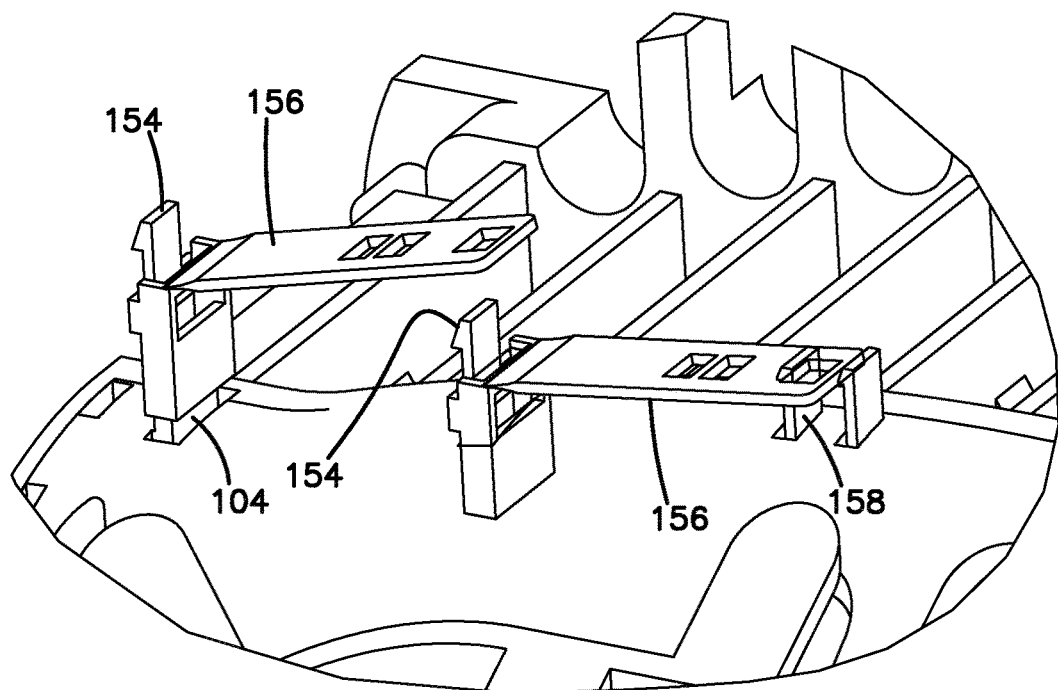
FIG. 36 shows the cable retention features of the organizer.
Figure 37:
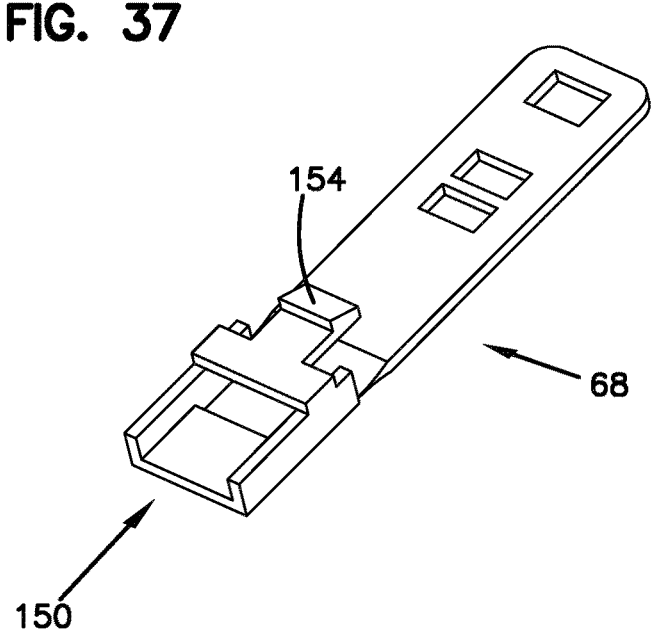
FIG. 37 shows a cable retention finger.
Figure 38:
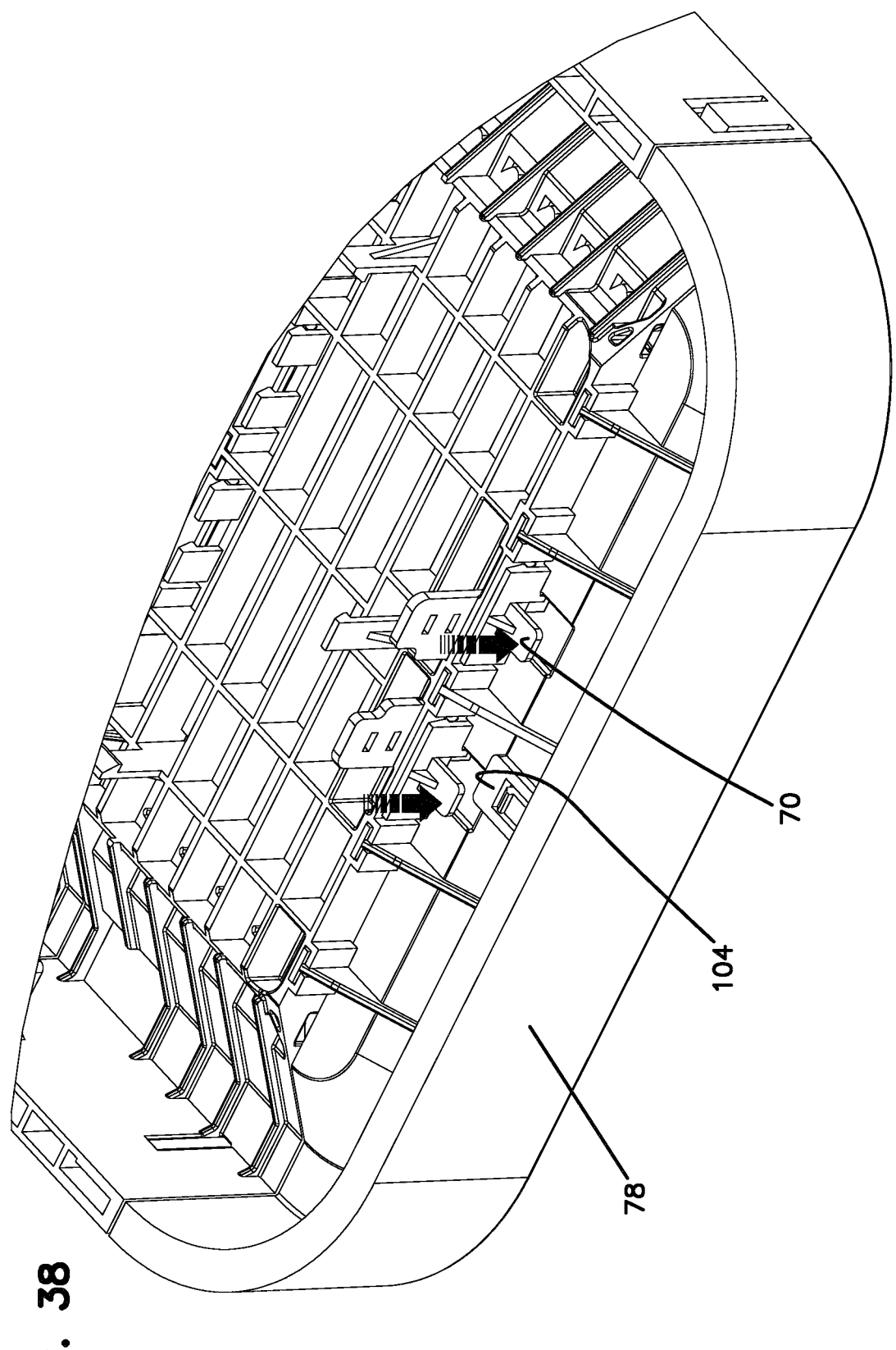
FIG. 38 shows an enlarged perspective view of an upper portion of the organizer.
Figure 39:
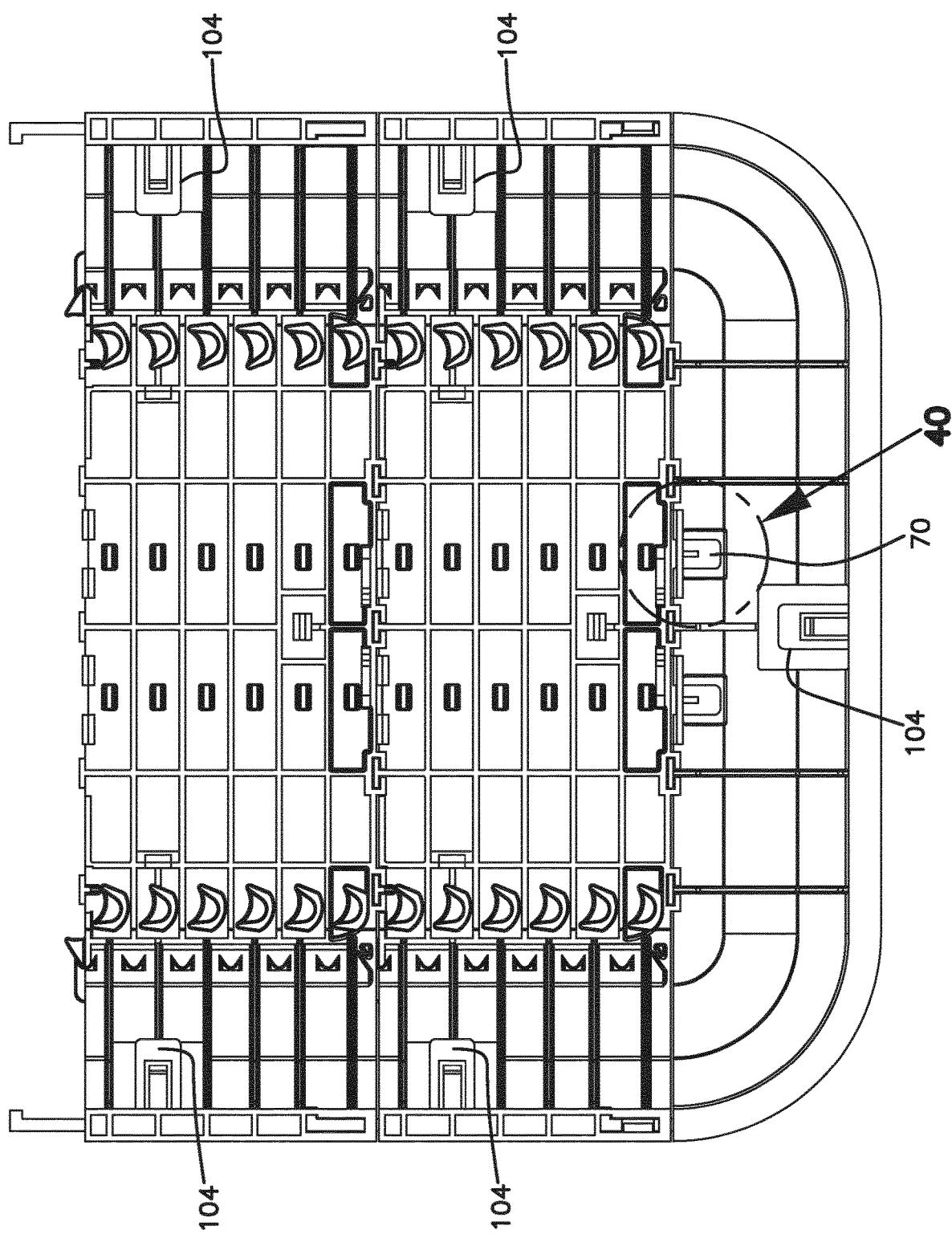
FIG. 39 shows in top view an upper portion of the organizer.
Figure 40:
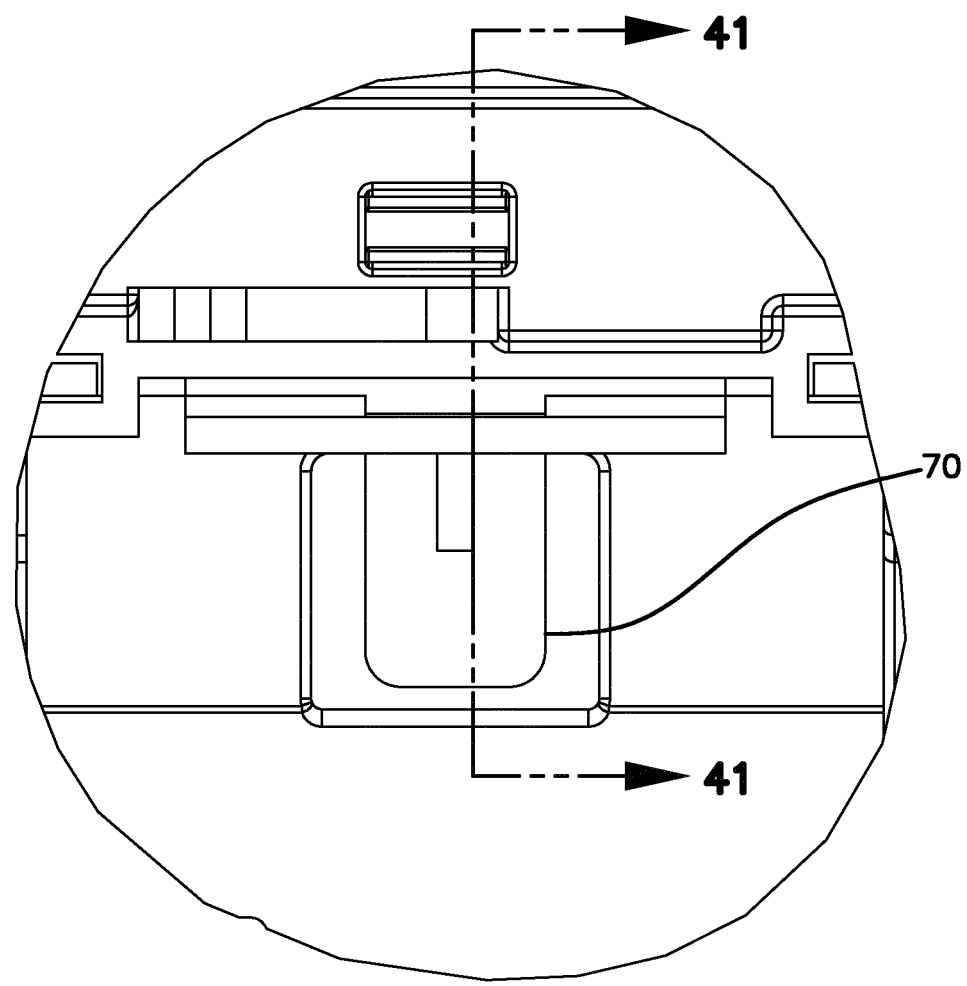
FIG. 40 shows in detail a latch portion of the organizer.
Figure 41:
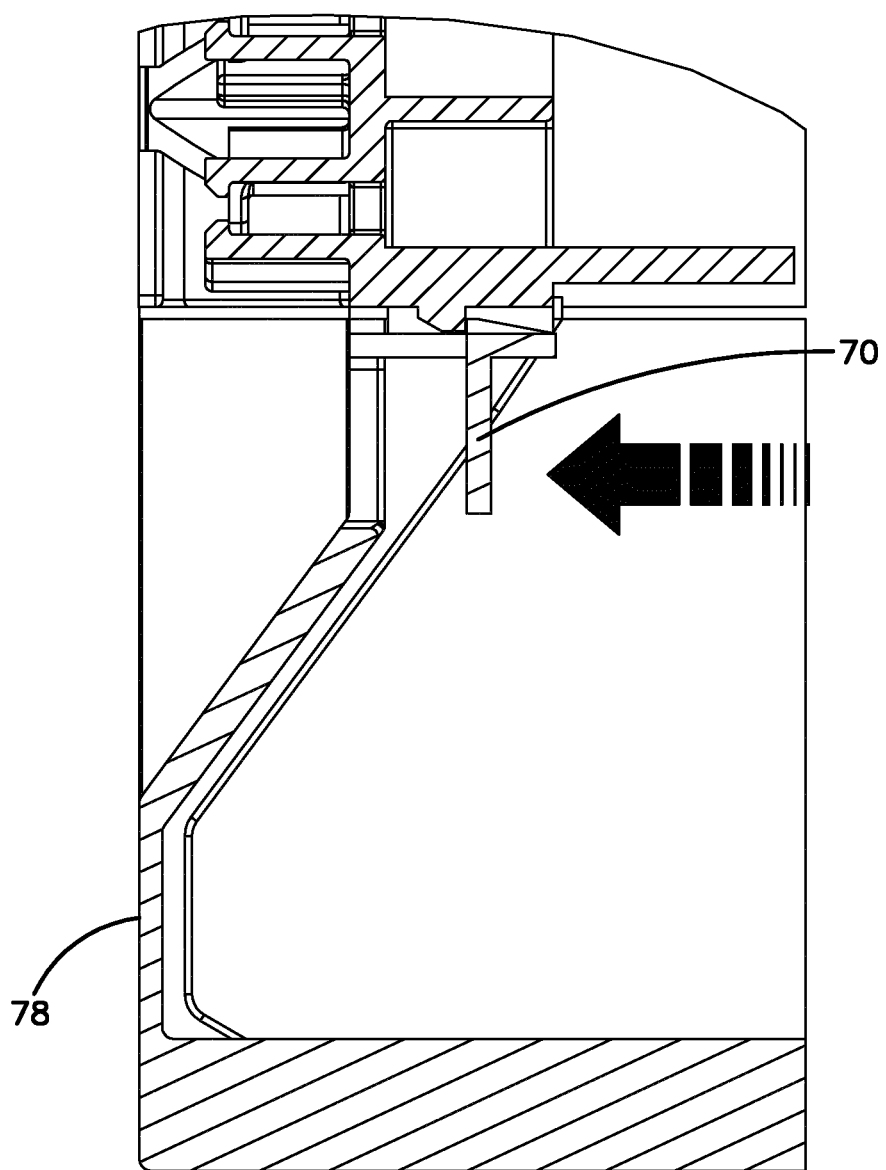
FIG. 41 shows in cross-section a portion of the organizer.
Figure 42:
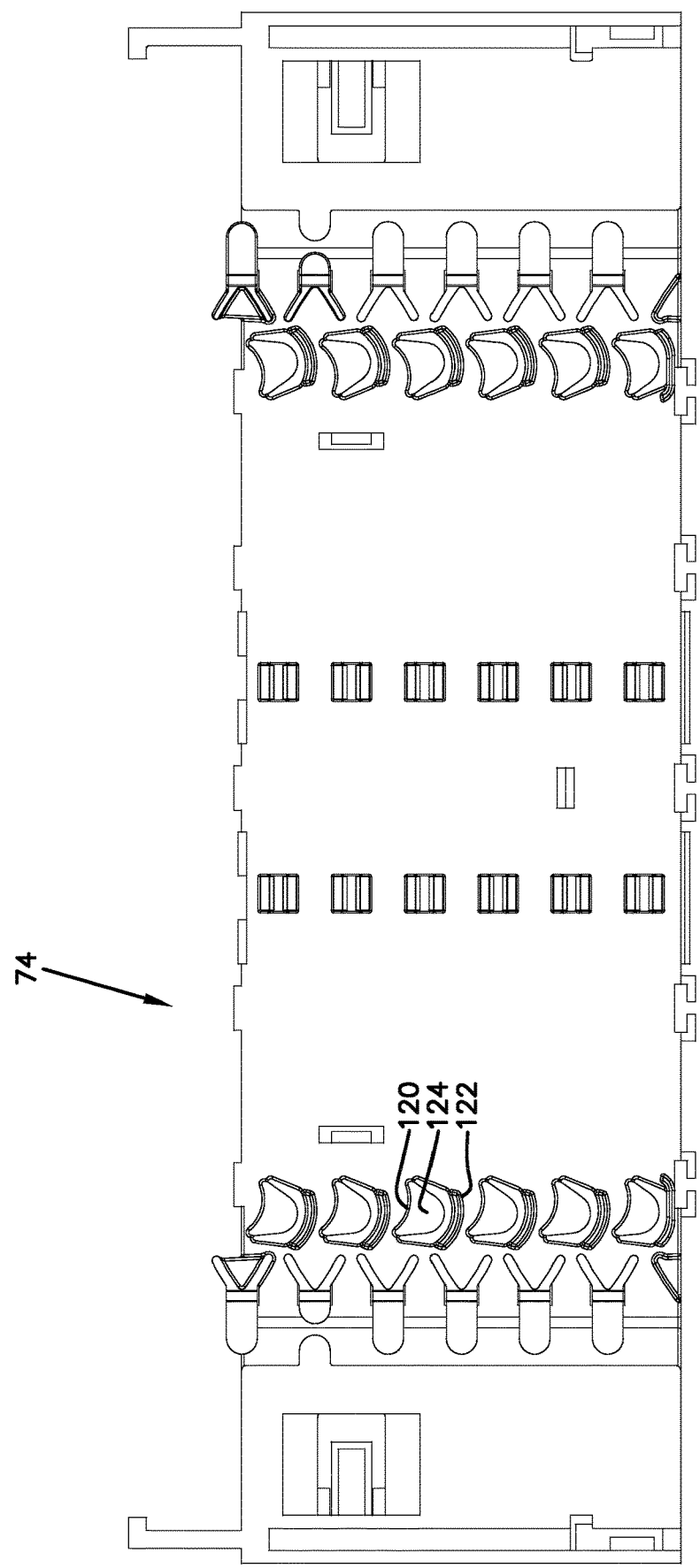
FIG. 42 shows a top view of the groove plate.
Figure 43:
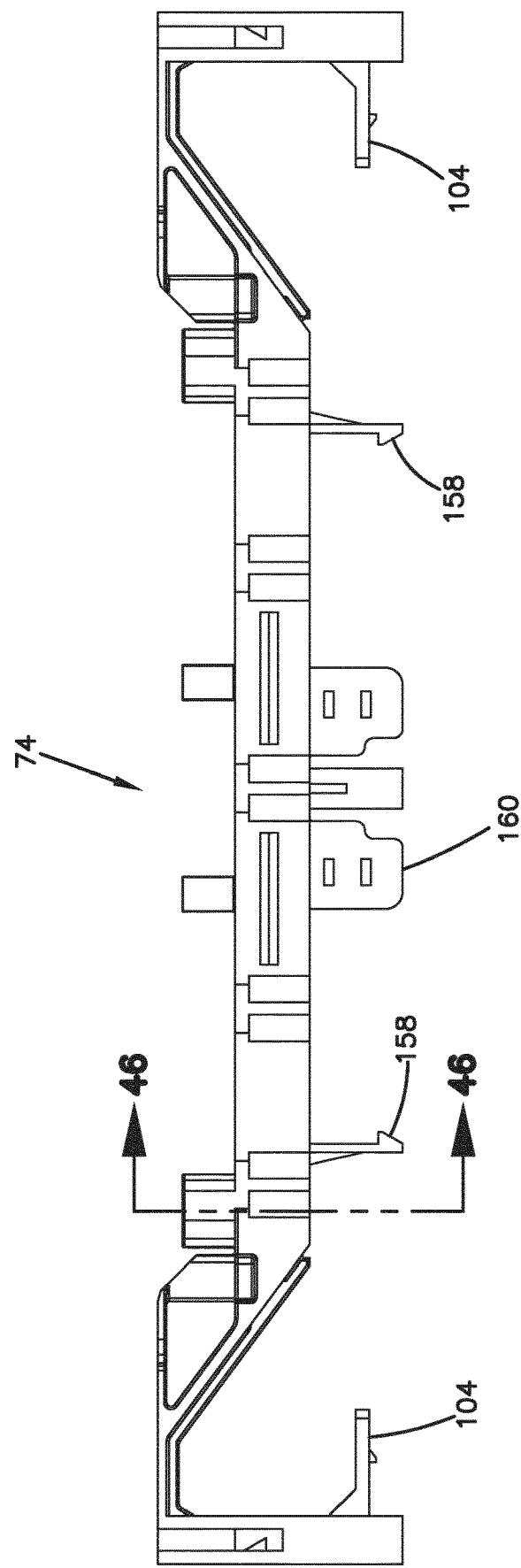
FIG. 43 shows a side view of the groove plate.
Figure 44:
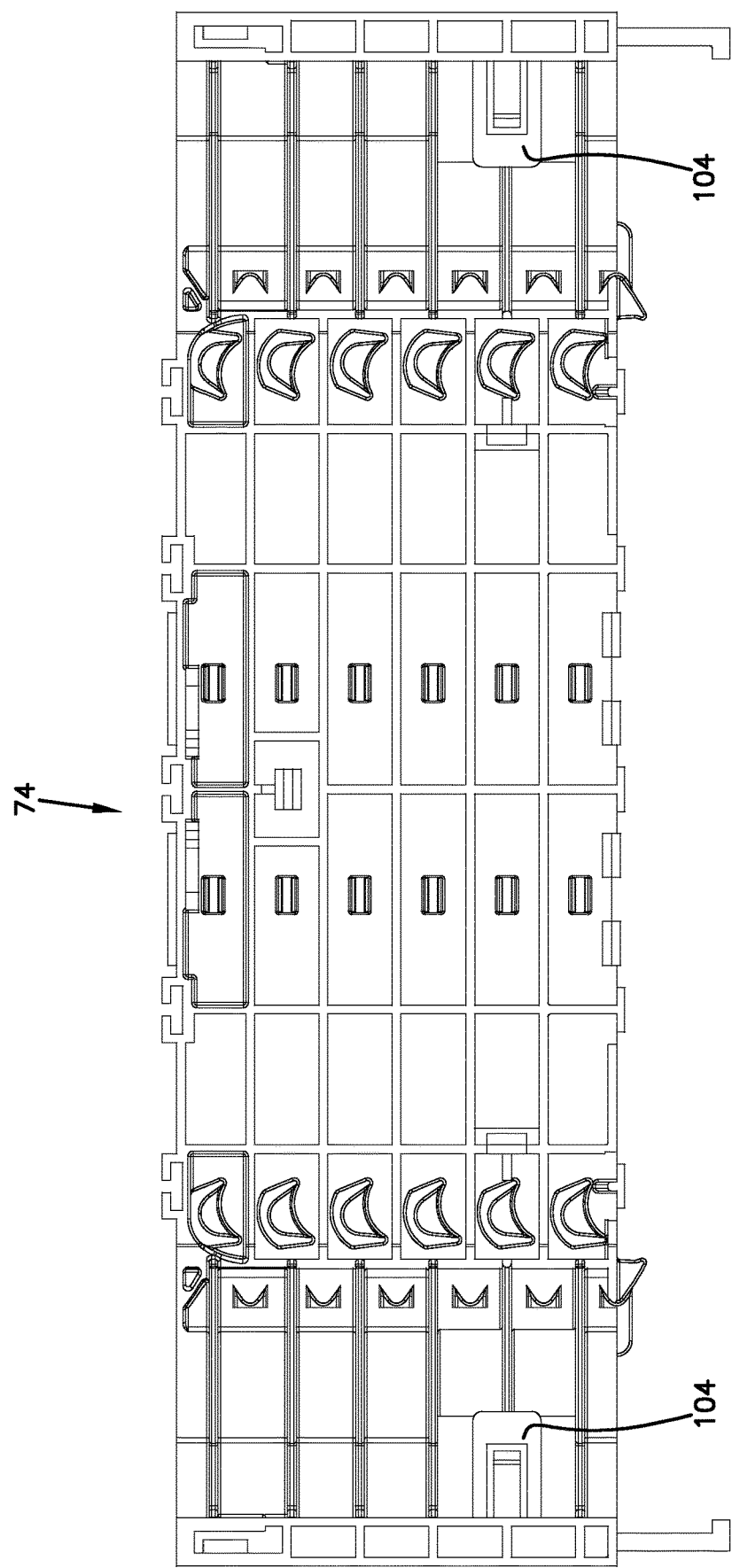
FIG. 44 shows a bottom view of the groove plate.
Figure 45:
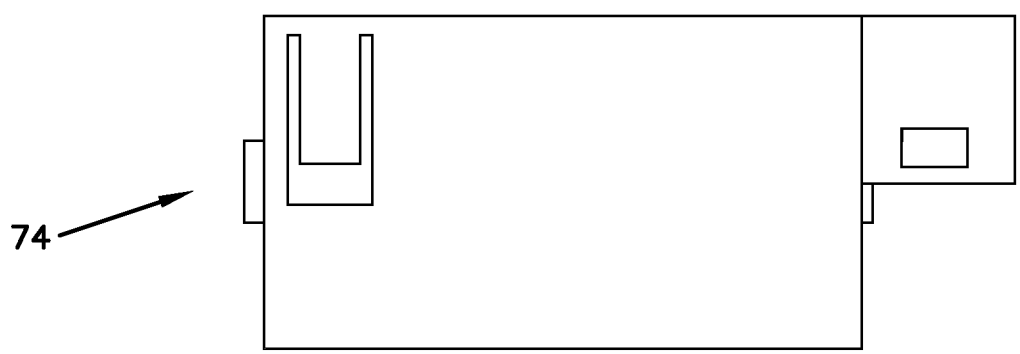
FIG. 45 shows an end view of the groove plate.
Figure 46:
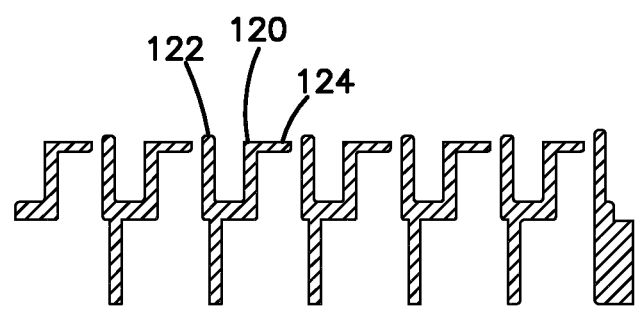
FIG. 46 is a cross-sectional view showing the cable management fingers of the groove plate.

Upper portion 24 of seal block 18 defines mounting locations 44 for cable fixation clamps 46 which mount to cables 12 with strength members 32 entering or exiting enclosure 10. Clamps 46 can mount to the cables outside of closure 10, then be mounted to closure 10. Clamps 46 fit into pockets 50 and are held with chips 54. Clamps 46 can float within pockets 50 in the z direction. Alternative clips 54 are shown in FIG. 27. Clamps 46 are adjustable for different cables and strength members.

As shown, interior 20 defines a space for telecommunications equipment, such as splitter or splice trays 48. Various areas for cable routing are also provided in addition to the cable routing on the trays 48.

As shown in the FIGS., seal block 18 also includes arms 52 with gel seal 22 which are moveable (pivotable) relative to a remainder of seal block 18 to allow for cable access during assembly or cable re-entry. A cable organizer 60 mounts to seal block 18 with snaps 64. Organizer 60 includes various clips 68 which define cable pathways and cable retention features for the internal cabling within interior 20.

A first block 72 snaps to upper portion 24 of seal block 18. Groove plates 74 snap mount to first block 72 and to each other with snaps 80. An end plate 78 mounts to the upper most groove plate with snaps. Preferably end plate 78 is removable with snaps 70. On a front side 82 of organizer 60, flip trays 48 can be mounted. Trays can be any of storage, splice, splitter or other function. On a rear side 84 of organizer 60, cable storage can be provided.

First block 72 defines two cable openings 92, 94 on each side. First block 72 further includes a cable storage area 100. First block 72 further includes mounting posts 104 for mounting of clips 68 for cables extending to organizer 60.

On rear side 84 of organizer 60, a divider plate 110 snap mounts to a rear of first block 72 to provide for segregated cable passageways. Divider plate 110 includes mounting posts 114 for mounting of clips 68. One use of divider plate 110 is to separate feeder cables (loop cables in one example) as they enter enclosure 10. These cables pass under divider plate 110, and are stored as loops on the rear side of organizer 60. Cables needed on the front side are passed through one of openings 92, 94 to the front side for use on a tray 48 or storage in area 100.

On groove plates 74, pairs of fiber retainer fingers 120, 122 are provided for fiber retention. As shown, finger 120 includes a tab 124. Further, finger 122 is taller than an end of tab 124. Such a construction facilitates ease of fiber placement.

Rear side 84 further defines a loop cable storage basket formed by first block 72, groove plates 74, and end plate 78. The loop pathway is further constructed with clips 68 mounted to mounting posts 134. Loop ties can also be used if desired.

Clips 68 can be mounted linearly, or they can be mounted at an angle. Each clip 68 includes a mounting pocket 150 for receiving one of the mounting posts 104. A snap mount feature retains clip 68 with the respective mounting post. A cable retention feature defining a closed loop can be provided with a mounting clip 154 positioned on clip 68 wherein mounting pocket 150 defines a mounting location for holding extension 156 of clip 68. In this manner, adjacent clips mount in a daisy chain style arrangement to create closed loop areas for cables. Clips 68 can also mount to projecting clips 158 on organizer 60.

Referring to the FIGS., trays 48 are pivotally mounted to groove plates 74. A shaft 170 is received by arms 174 of groove plate 74 to retain trays 48 in a pivotal manner. Shaft 170 includes a non-cylindrical portion 178 which facilitates positioning of tray 48 in a desired position, such as a storage position or an access position. Tray 48 includes a rounded knob 184 which rests against a base portion 186 of groove plate 74 to maintain trays 48 in the desired position, wherein looseness is reduced.

Cables can be routed into and through closure 10 as desired. Feeder cables can be routed under divider plate 110, and stored on rear side 84 in storage area 190 in loops. Cables needed on front side 82 are passed to the front side and are stored in area 100 or sent to a desired tray 48. The drop cables exit through seal block 18. Clips 68 are used to secure the cables in closure 10. Openings 92, 94 can be used to separate the loop cables from the cables stored on the front side of the organizer 60. Various of the clips 68 and other fingers and tie wraps can be used to manage the cables in an organized fashion for ease of access and maintenance.

Figure 47:
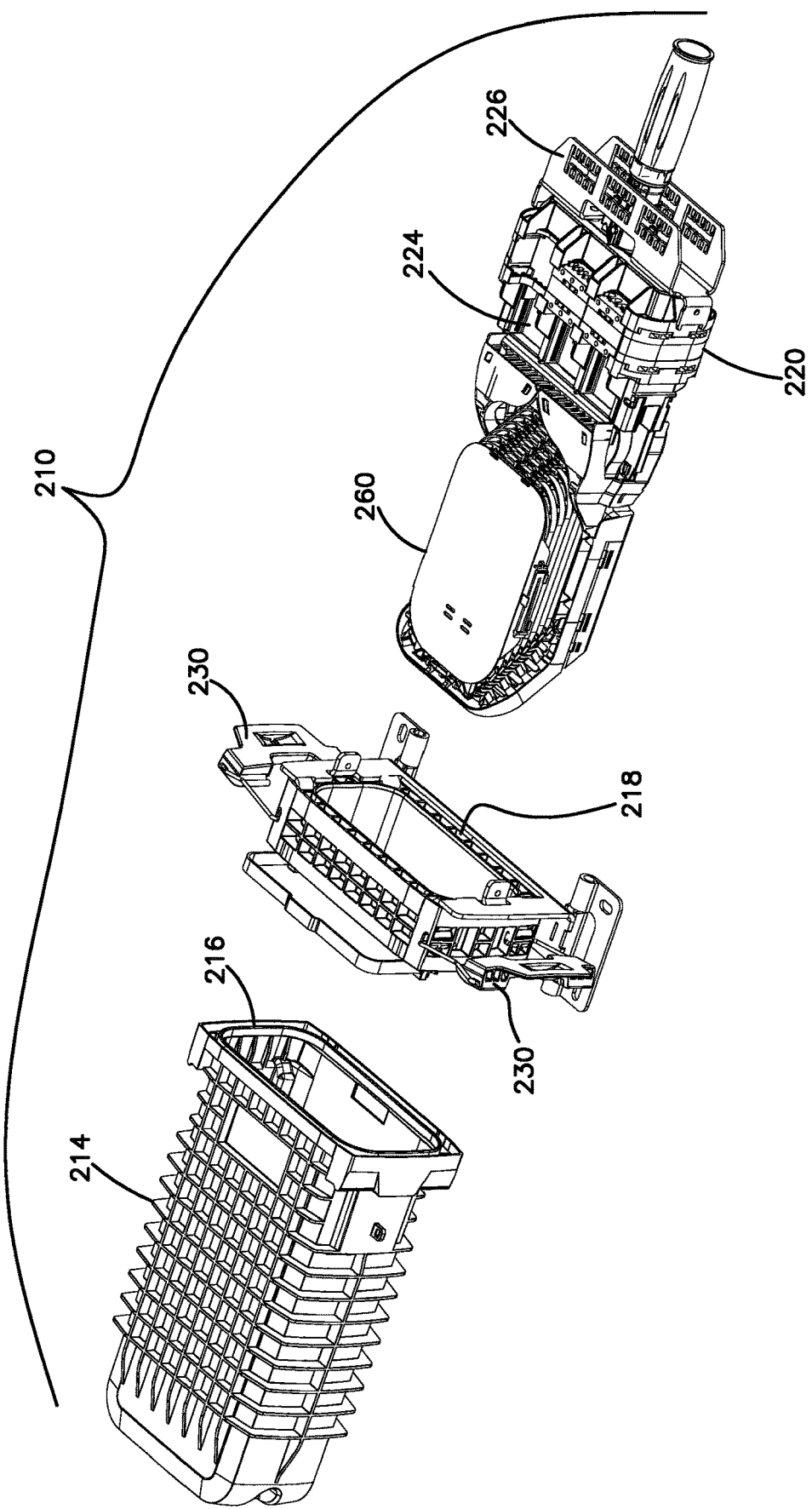
FIG. 47 is an exploded perspective view of another telecommunications enclosure.
Figure 48:
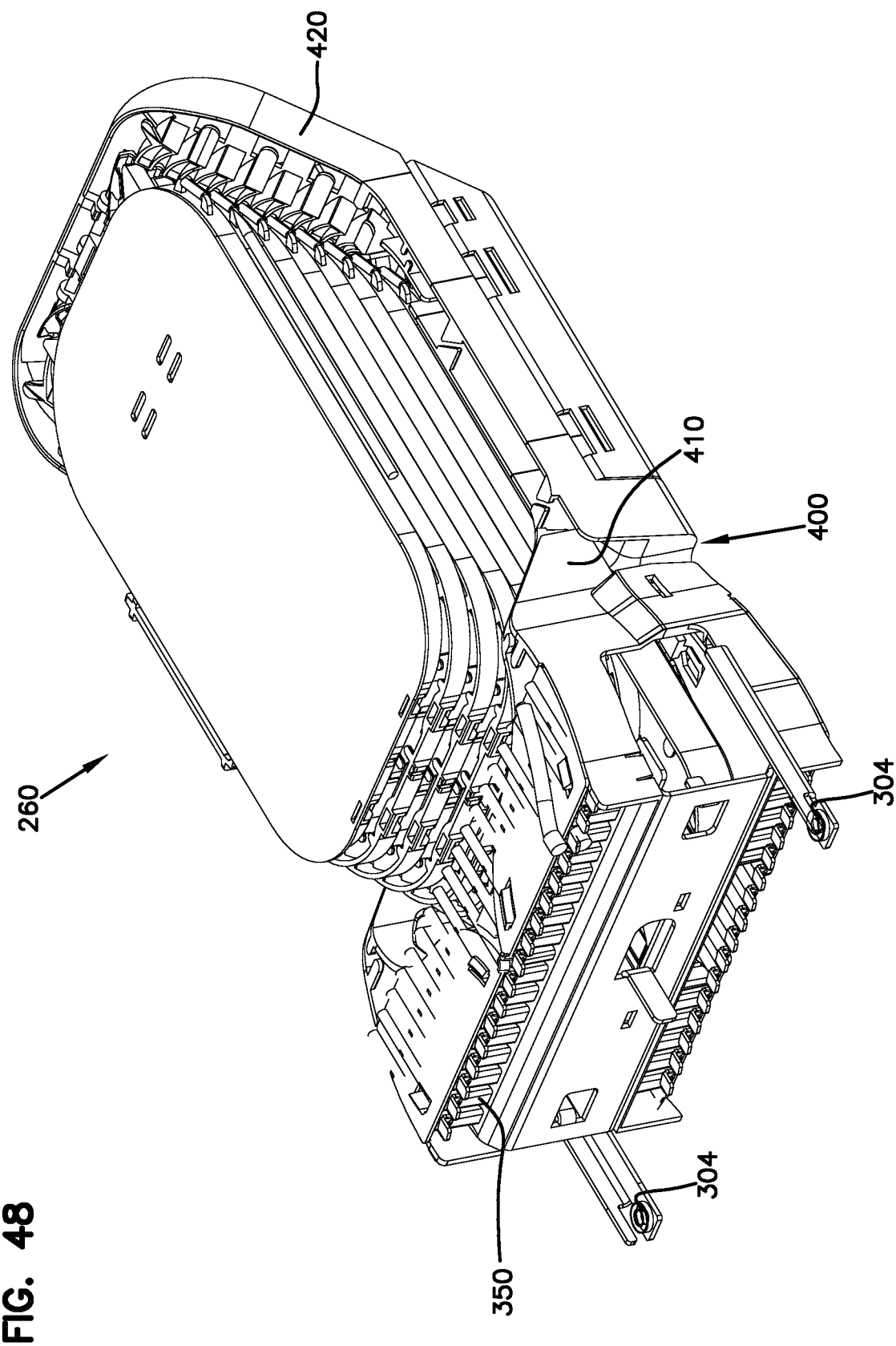
FIG. 48 is a perspective view of the organizer of the enclosure of FIG. 47.
Figure 49:
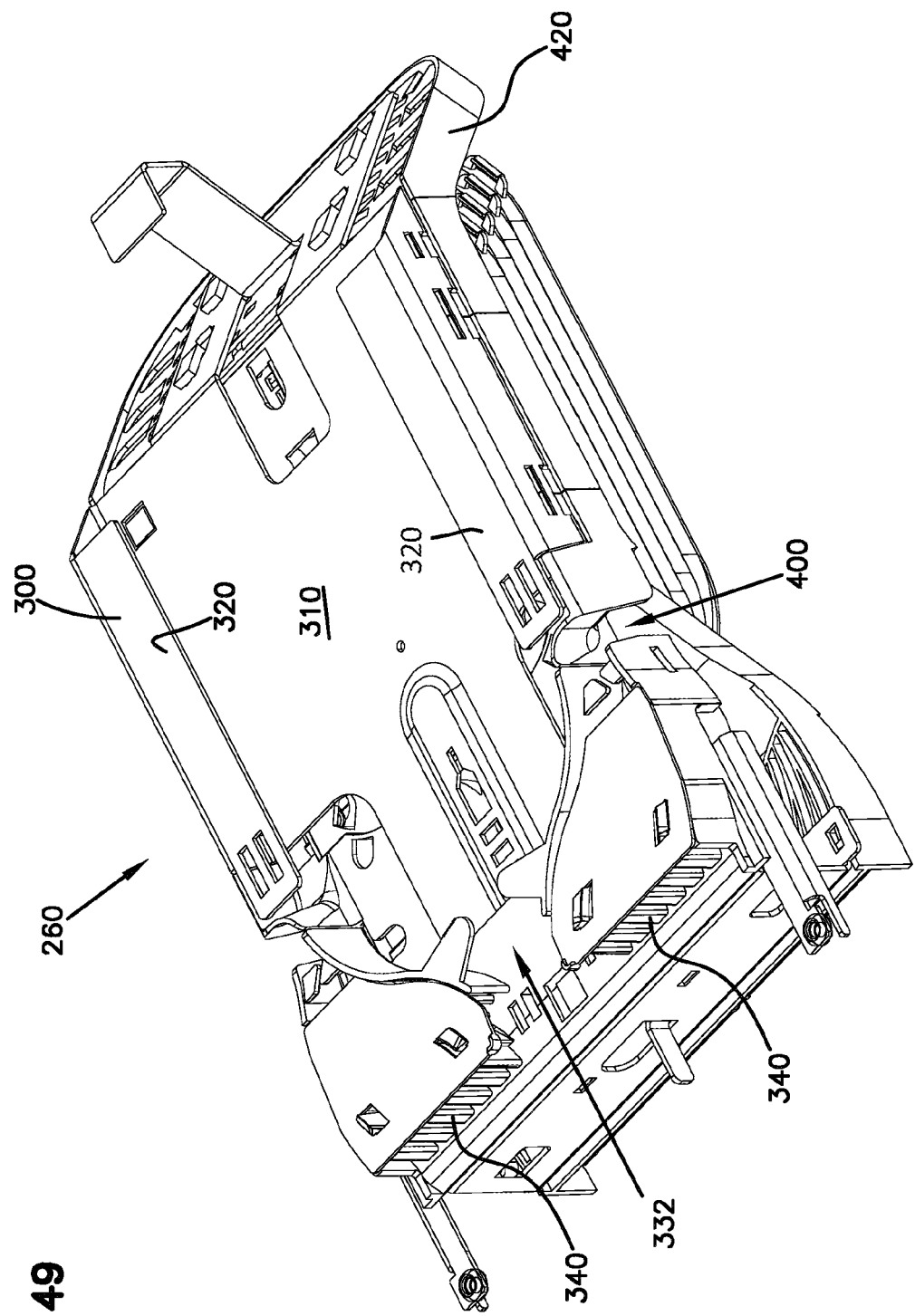
FIG. 49 is a perspective view showing the opposite side of the organizer of FIG. 49.
Figure 50:
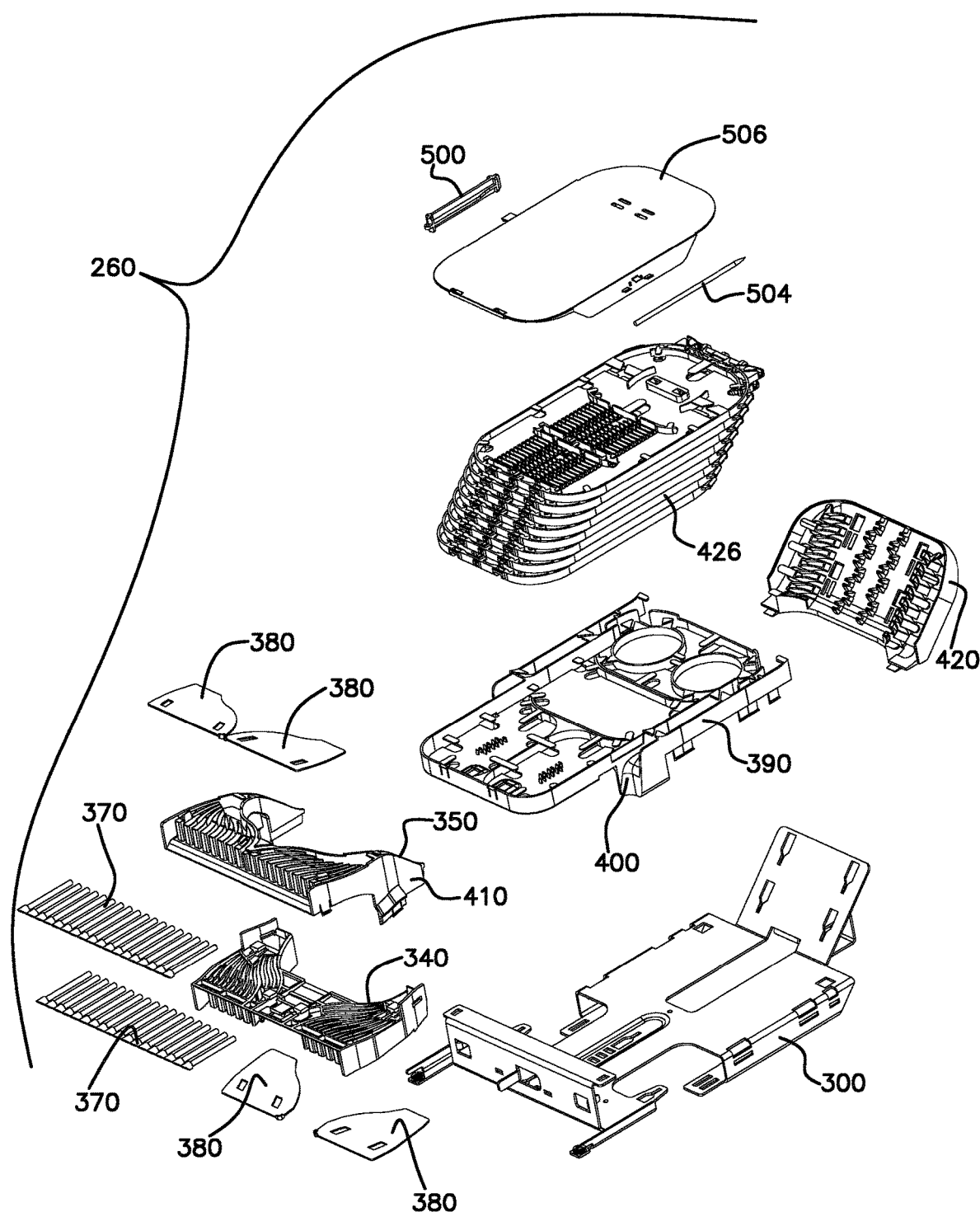
FIG. 50 is an exploded perspective view of the organizer of FIG. 48.
Figure 53:
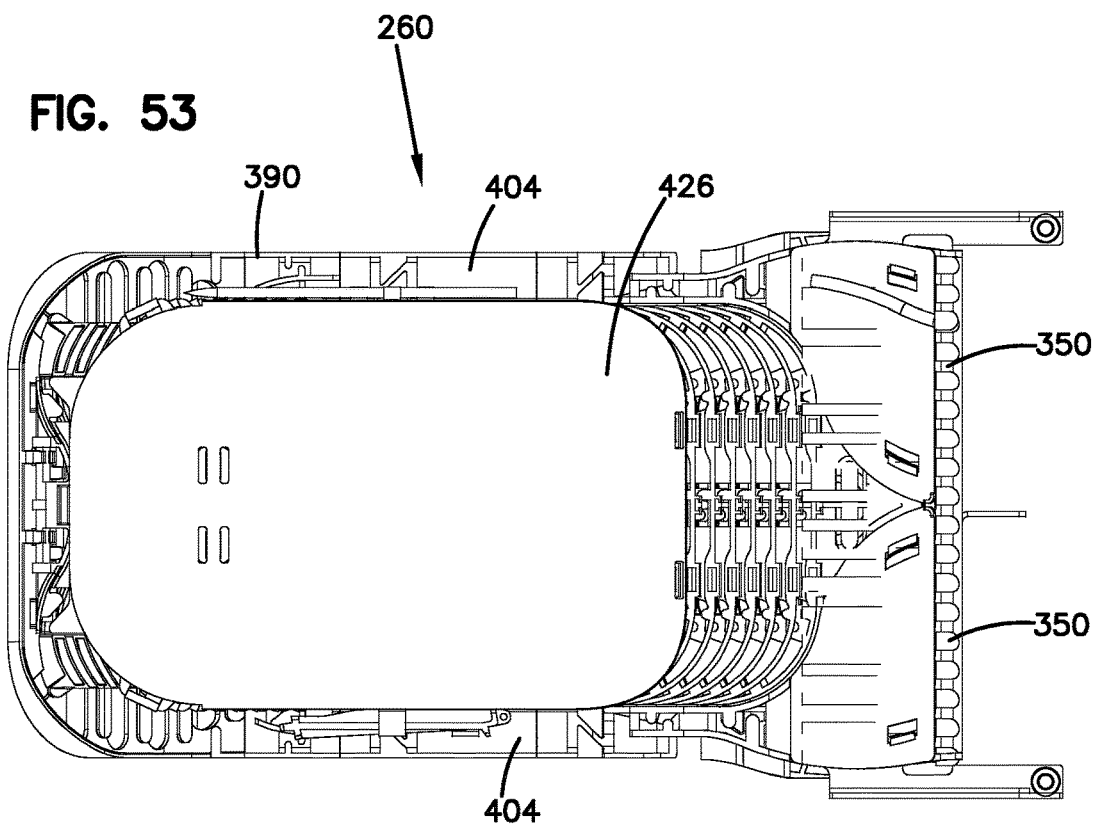
FIG. 53 is a top view of the organizer of FIG. 48.
Figure 54:
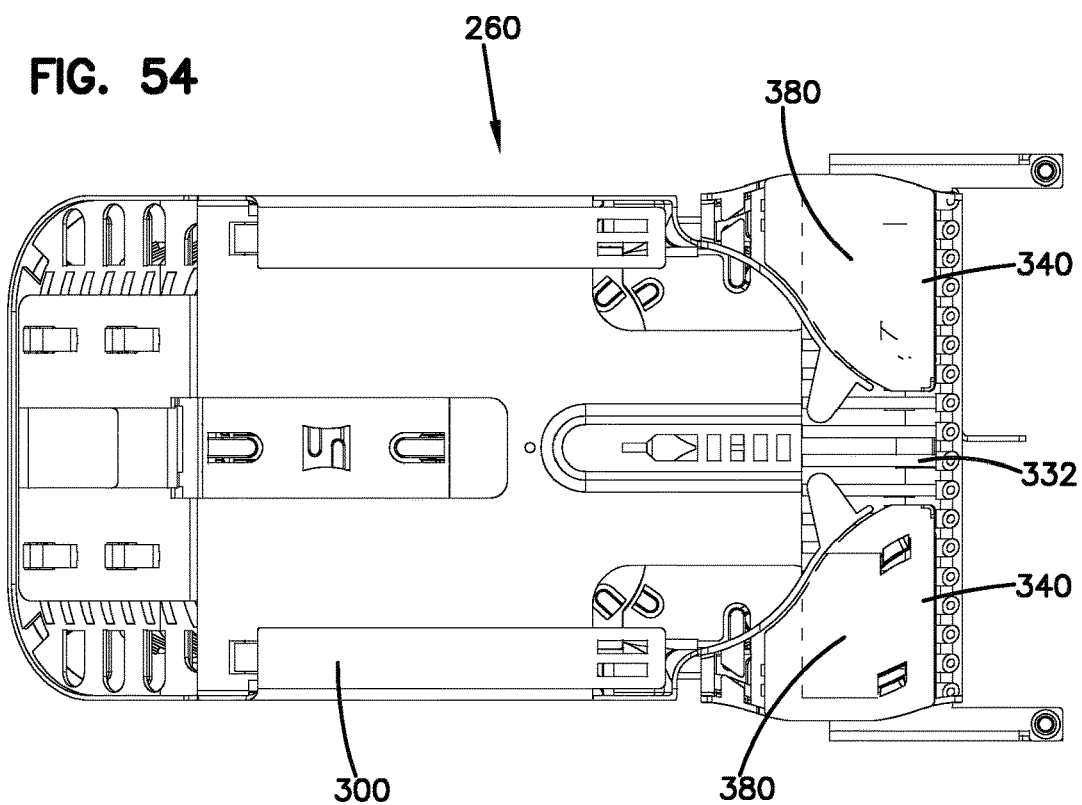
FIG. 54 is a bottom view of the organizer of FIG. 48.
Figure 55:
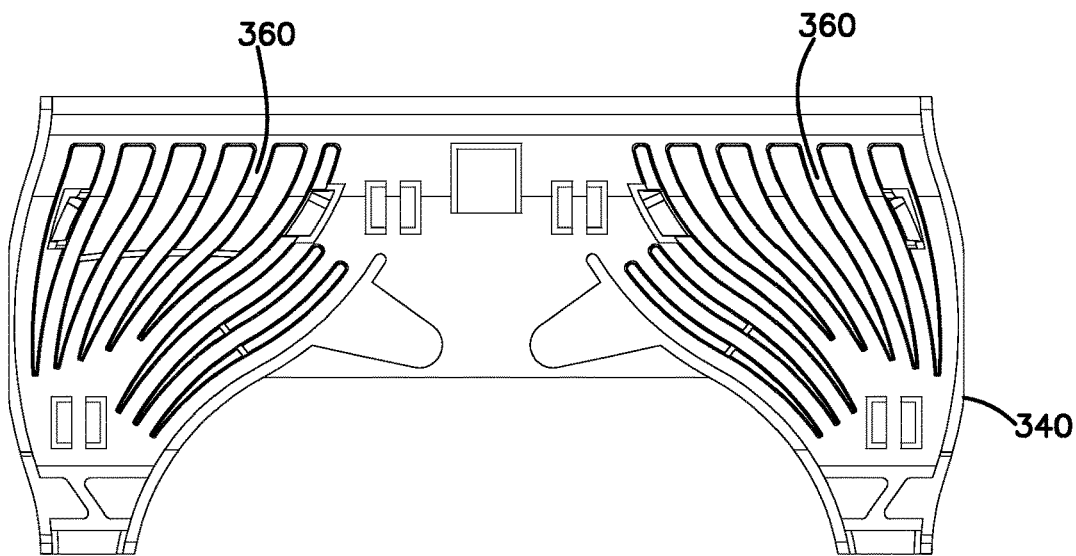
FIG. 55 is a plan view of a first tube holder.
Figure 56:
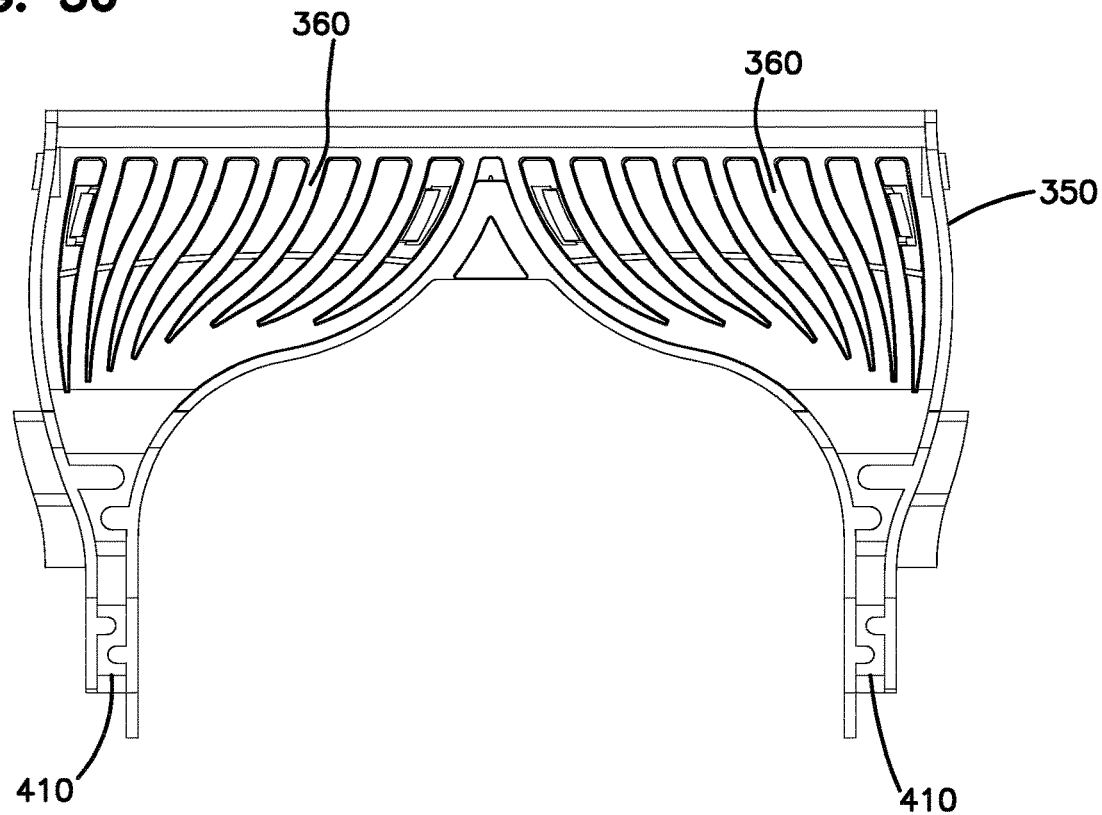
FIG. 56 is a plan view of a second tube holder.
Figure 57:
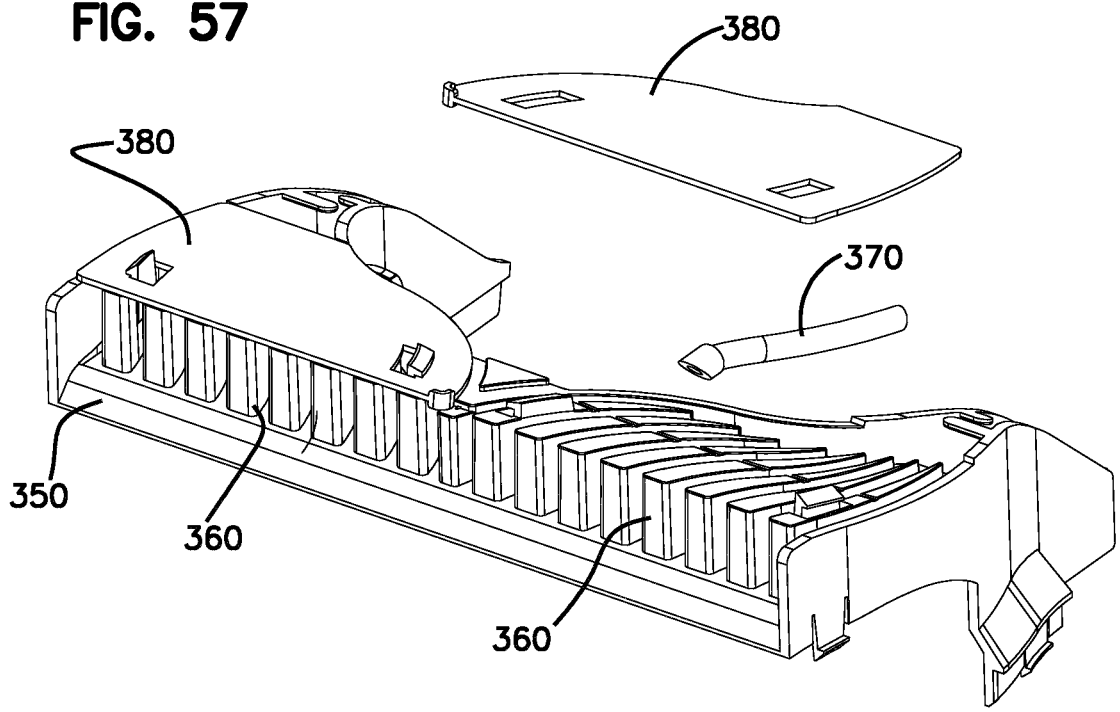
FIG. 57 shows the tube holder of FIG. 56 with a cover removed, and one of the tube retaining members removed.
Figure 58:
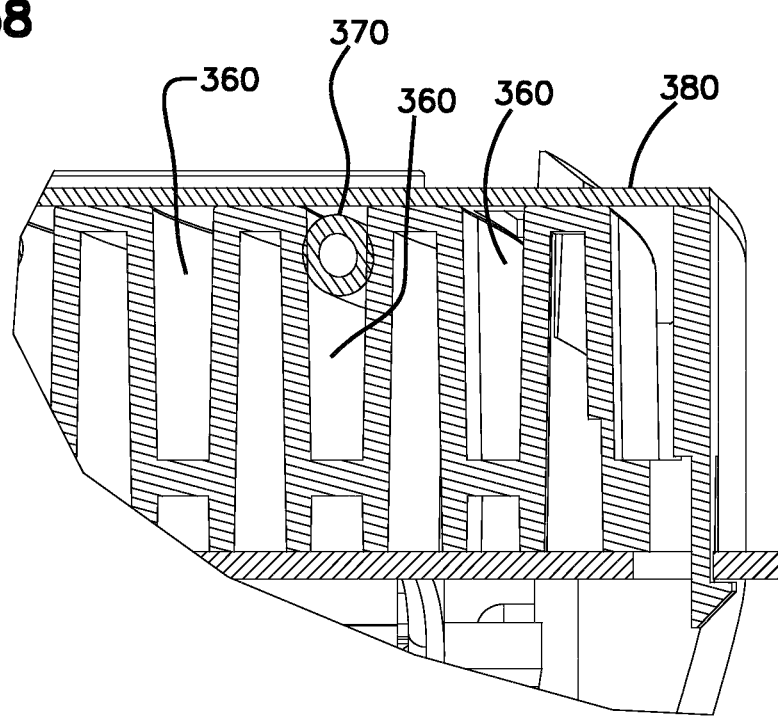
FIG. 58 shows a cross-section the cover and the tube retaining member in position within the tube holder of FIG. 56.
Figure 59:
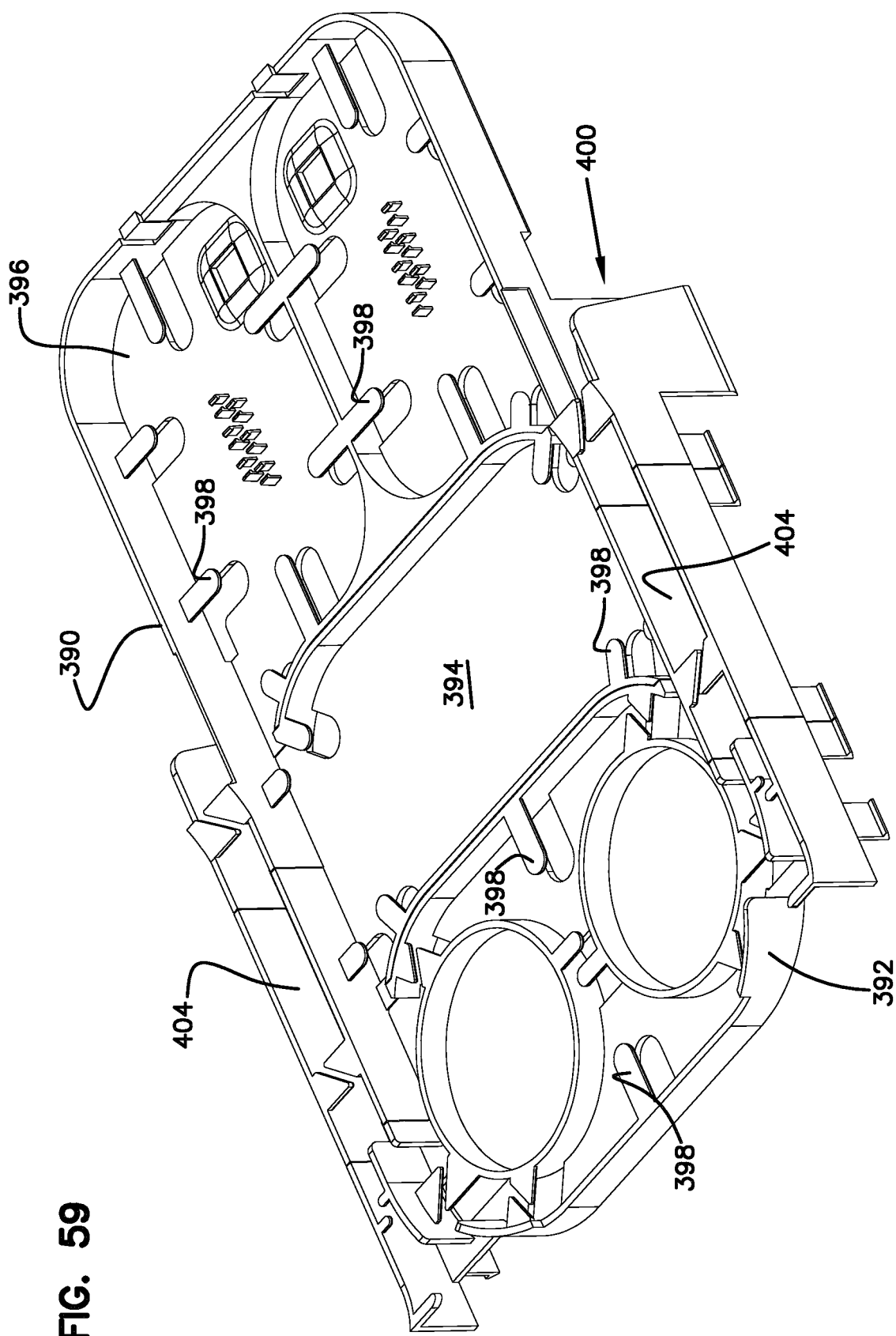
FIG. 59 is a perspective view of the cable organizer tray.
Figure 60:
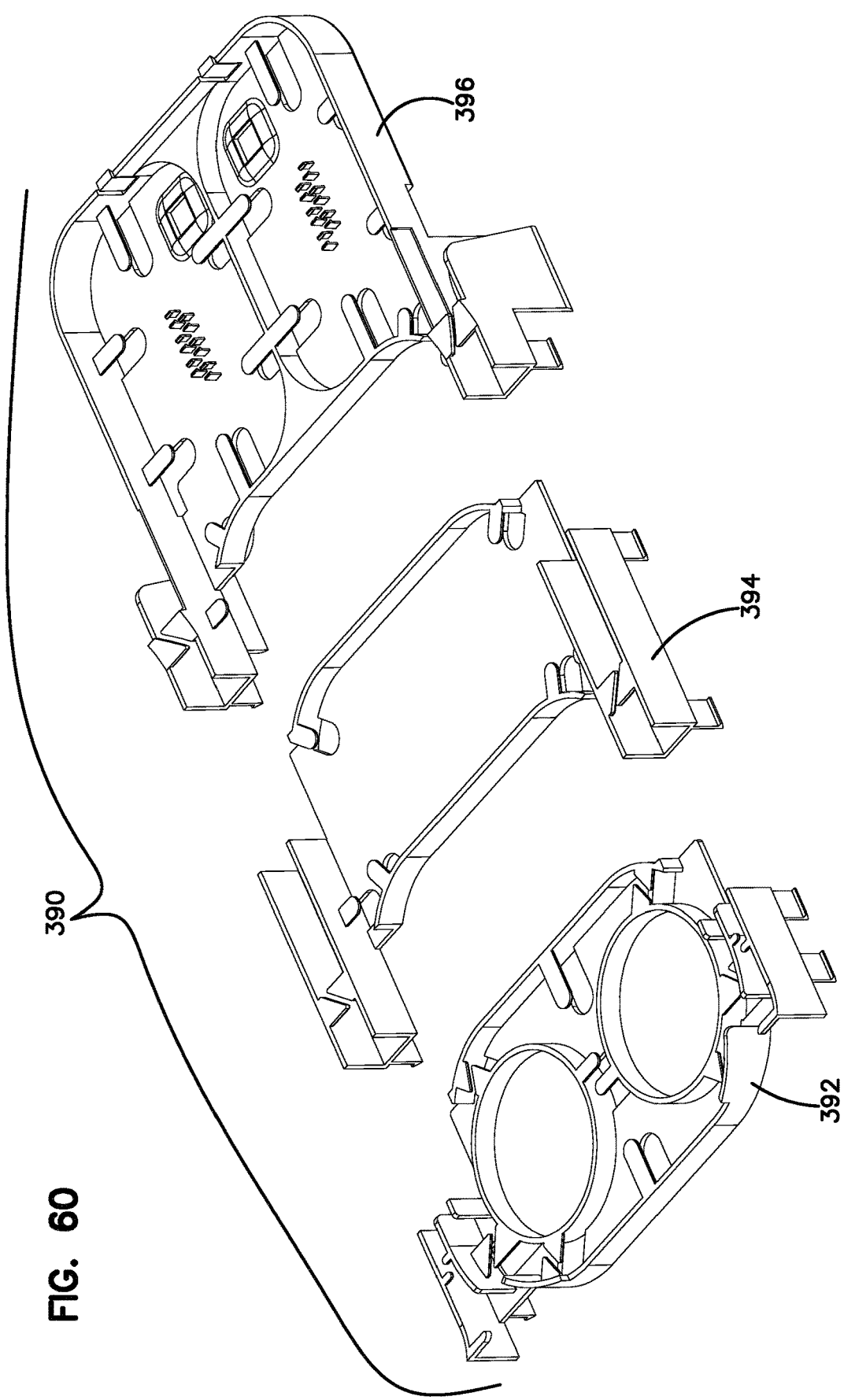
FIG. 60 is an exploded perspective view showing the cable organizer tray.
Figure 61:
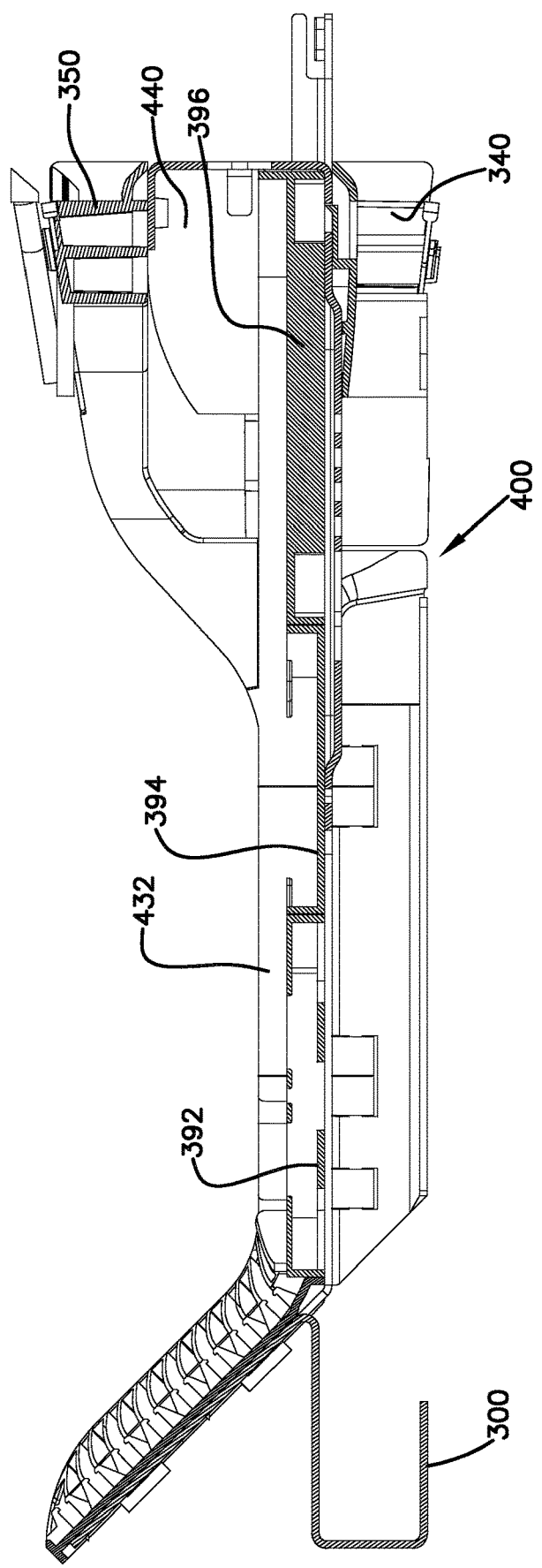
FIG. 61 is a cross-sectional view of the organizer without the pivoting trays.

Referring now to FIG. 47, another example embodiment of an enclosure 210 is shown with a cover 214 having an open end 216. A base 218 mounts to cover 14 with latches 230 and a seal. A seal block 220 seals to base 218 to thereby seal the interior of enclosure 210. Cables enter and exit through seal block 220 and are managed by organizer 260. Seal block also includes cable fixation areas 224, 226. Organizer 260 can include various functions including slack storage, splicing, and splitting of fiber optic cables. Organizer 60 could also be used.

Organizer 260 is similar in function to organizer 60, but differently constructed.

Organizer 260 includes a framework 300 which supports various elements on organizer 260. Framework 300 mounts with fasteners 304 to seal block 220. Framework 300 defines a rear cable basket 310, such as for storage of loop cables. Framework 300 can be made of metal for grounding of cables. Cable basket 310 includes various flanges 320 to assist with cable retention. Cables enter and exit adjacent end 330 of framework 300. Typically, feeder cables enter at opening 332 and can be stored in basket 310. Cables can also enter on the backside of framework 300 through bottom tube holder 340. Additional cables can enter at top tube holder 350. Both of top and bottom tube holders 340, 350 include cable slots 360 for cables entering into enclosure 210. As shown, cable slots 360 have a curved shape which facilitates positioning of the cables in a desired direction for use in organizer 260. The curves are generally the same length for each slot. Typically, the cables and tubes or jackets are received in the cable slots 360. A plurality of cables in a stack can be positioned in each cable slot. To help retain the cables in the cable slots, a flexible retention tube 370 is inserted into each cable slot 360 last in order to retain the cables or cable tubes in each cable slot. Tubes 370 can have a tube handle 372 to facilitate ease of use. In addition, covers 380 are provided to retain the retention tubes 370, and the cables in each of the cable slots. Cover 380 are snap fit over the top and bottom tube holders 340, 350.

Figure 8:
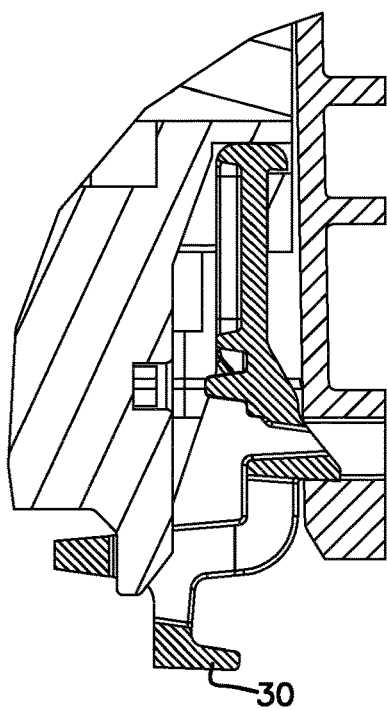
FIG. 8 is an enlarged view of a portion of the cross-section of FIG. 6.
Figure 9:
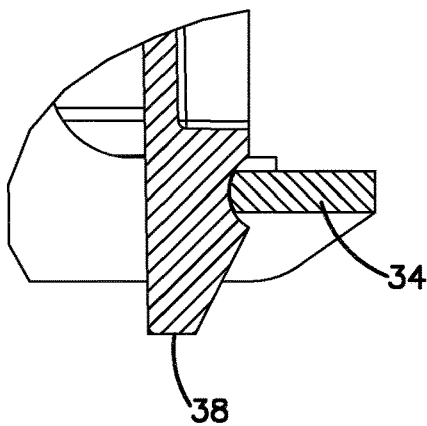
FIG. 9 is an enlarged view of a portion of the cross-section of FIG. 7.
Figure 6:
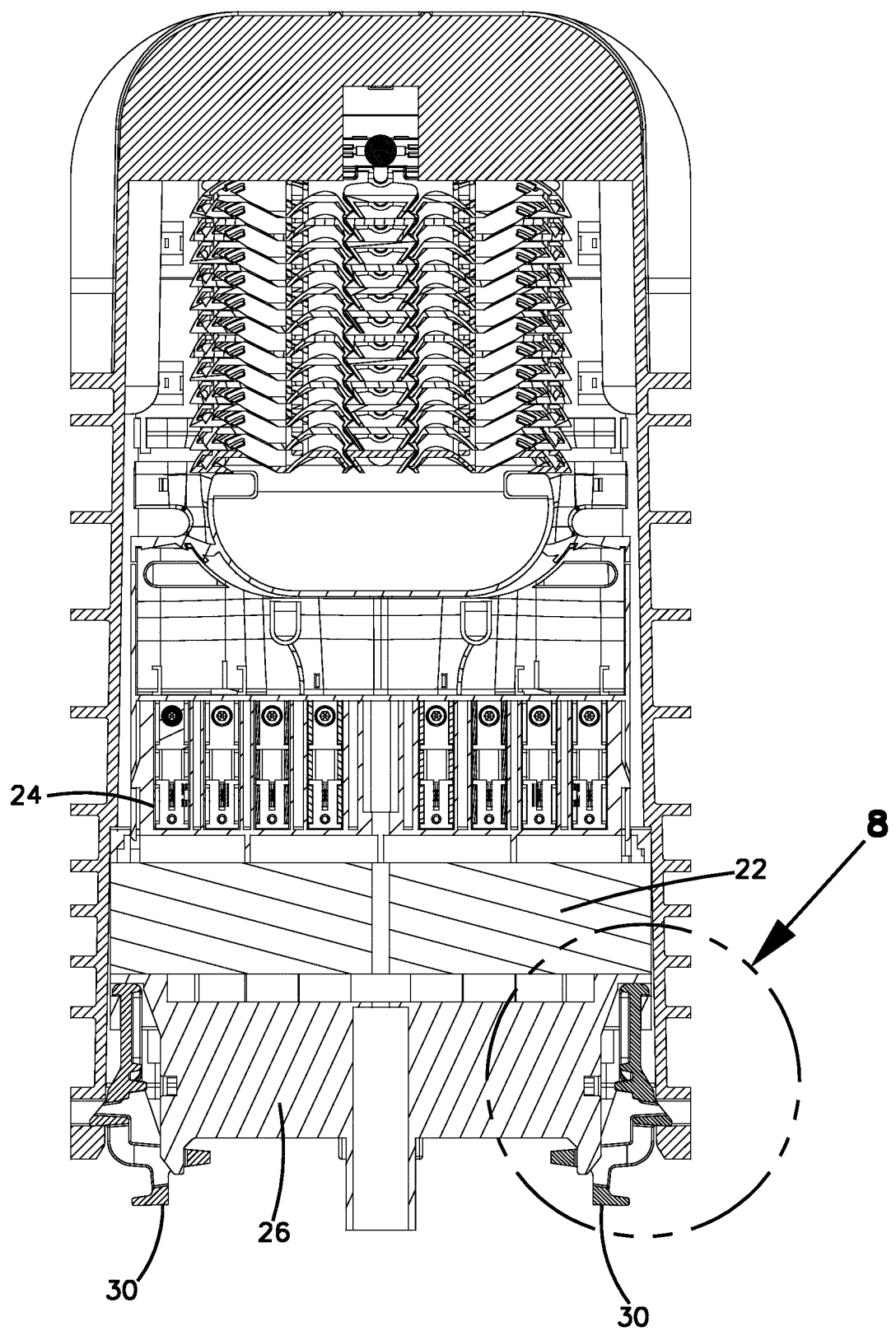
FIG. 6 is a cross-sectional view of the telecommunications enclosure.
Figure 7:
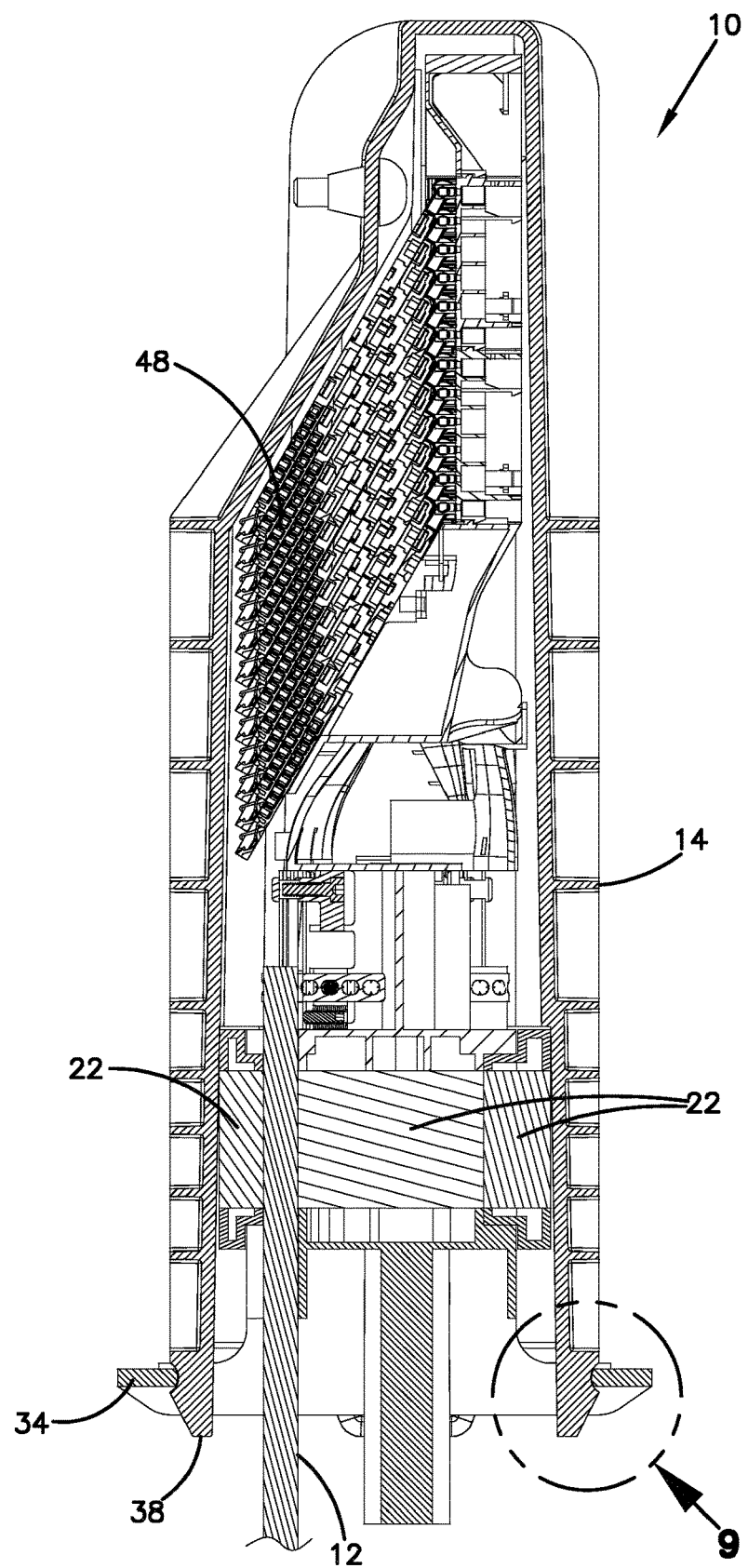
FIG. 7 is another cross-sectional view of the telecommunications enclosure.
Figure 10:
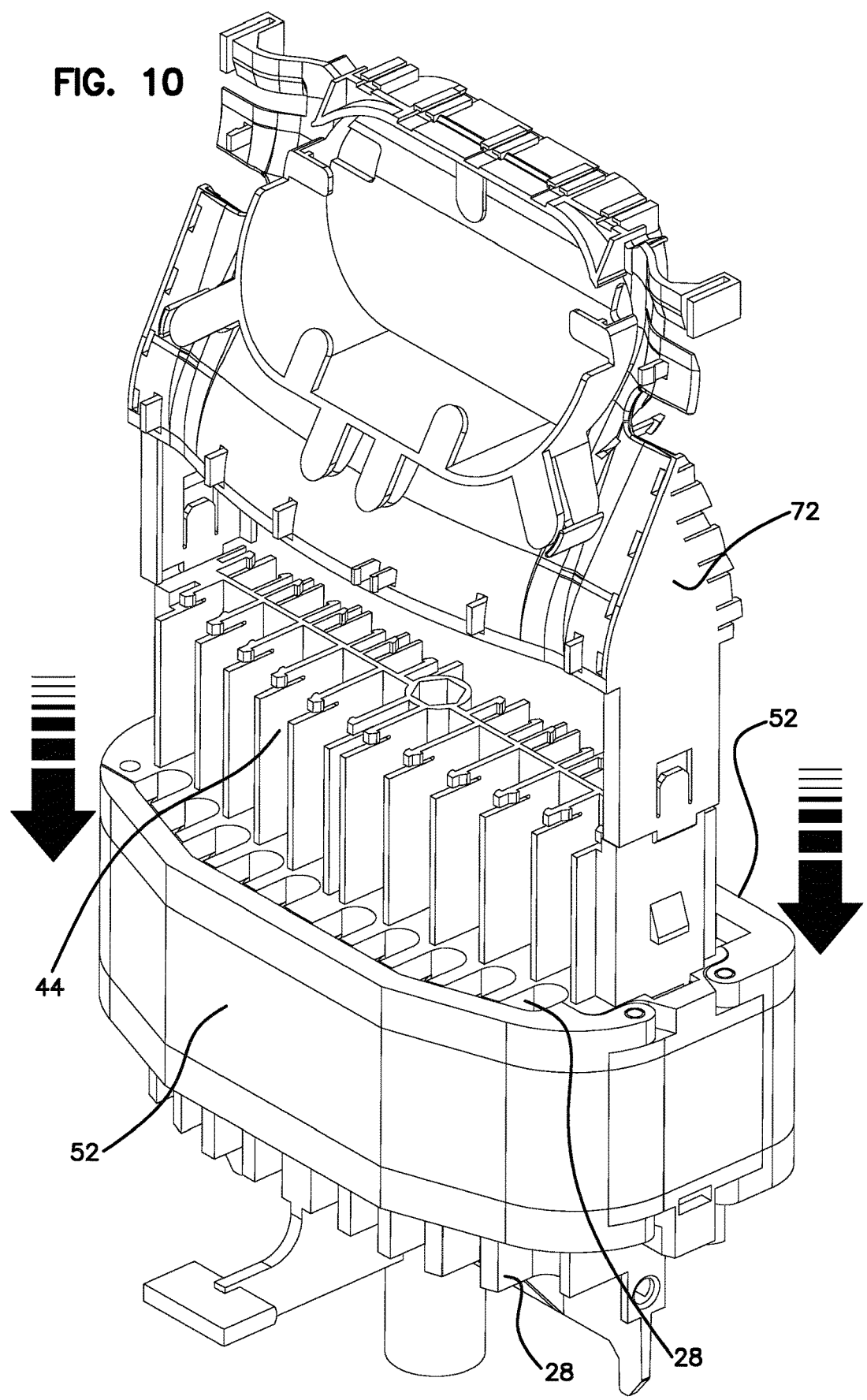
FIG. 10 shows the organizer being snap mounted to the seal block.
Figure 11:
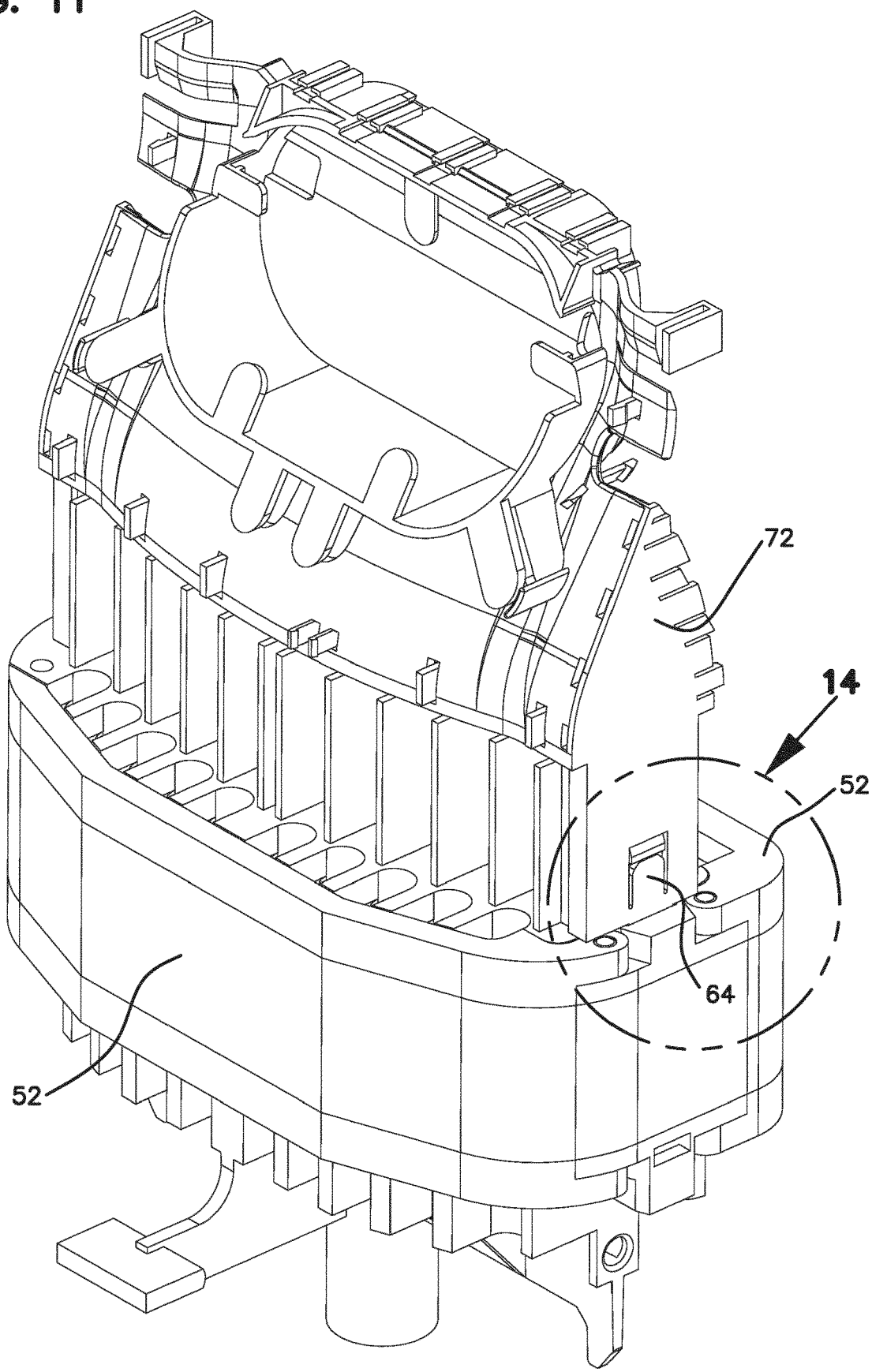
FIG. 11 shows the organizer mounted to the seal block.
Figure 12:
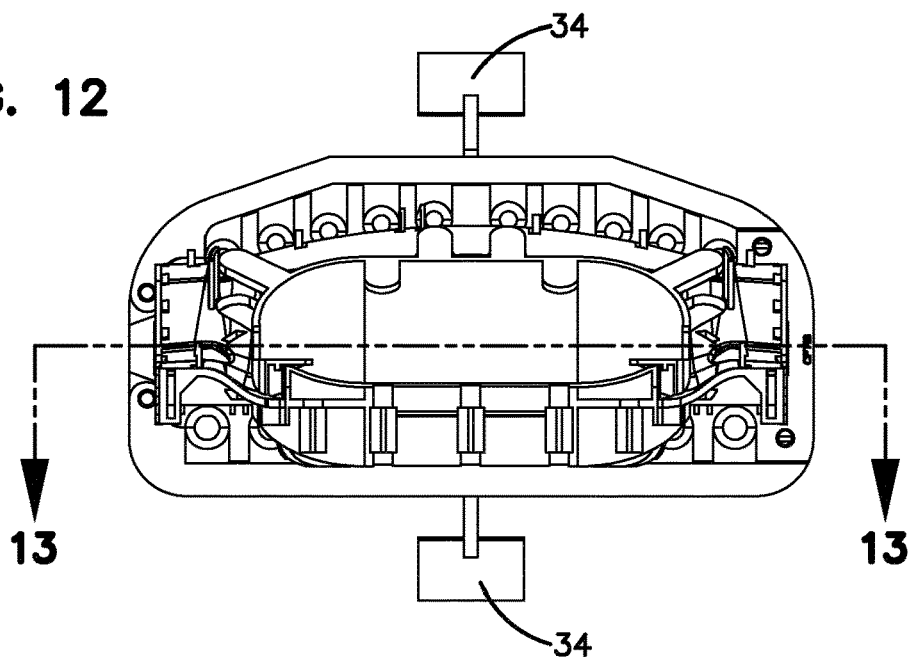
FIG. 12 shows in top view the organizer mounted to the seal block.
Figure 14:
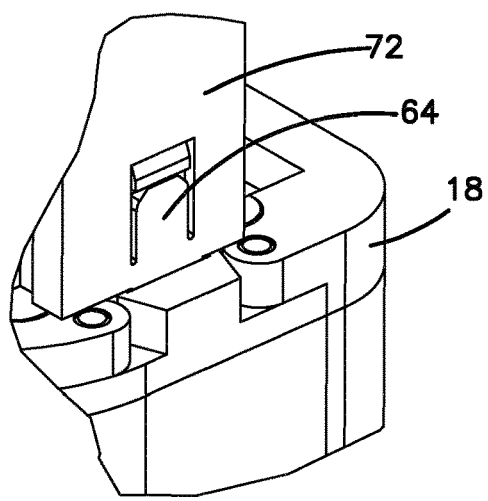
FIG. 14 is an enlarged view of the snap lock between the organizer and the seal block.
Figure 15:
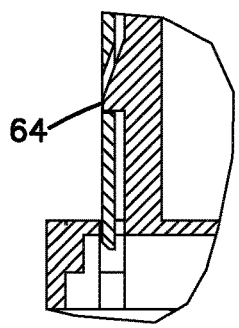
FIG. 15 is an enlarged view of a portion of the cross-section of FIG. 12.
Figure 13:
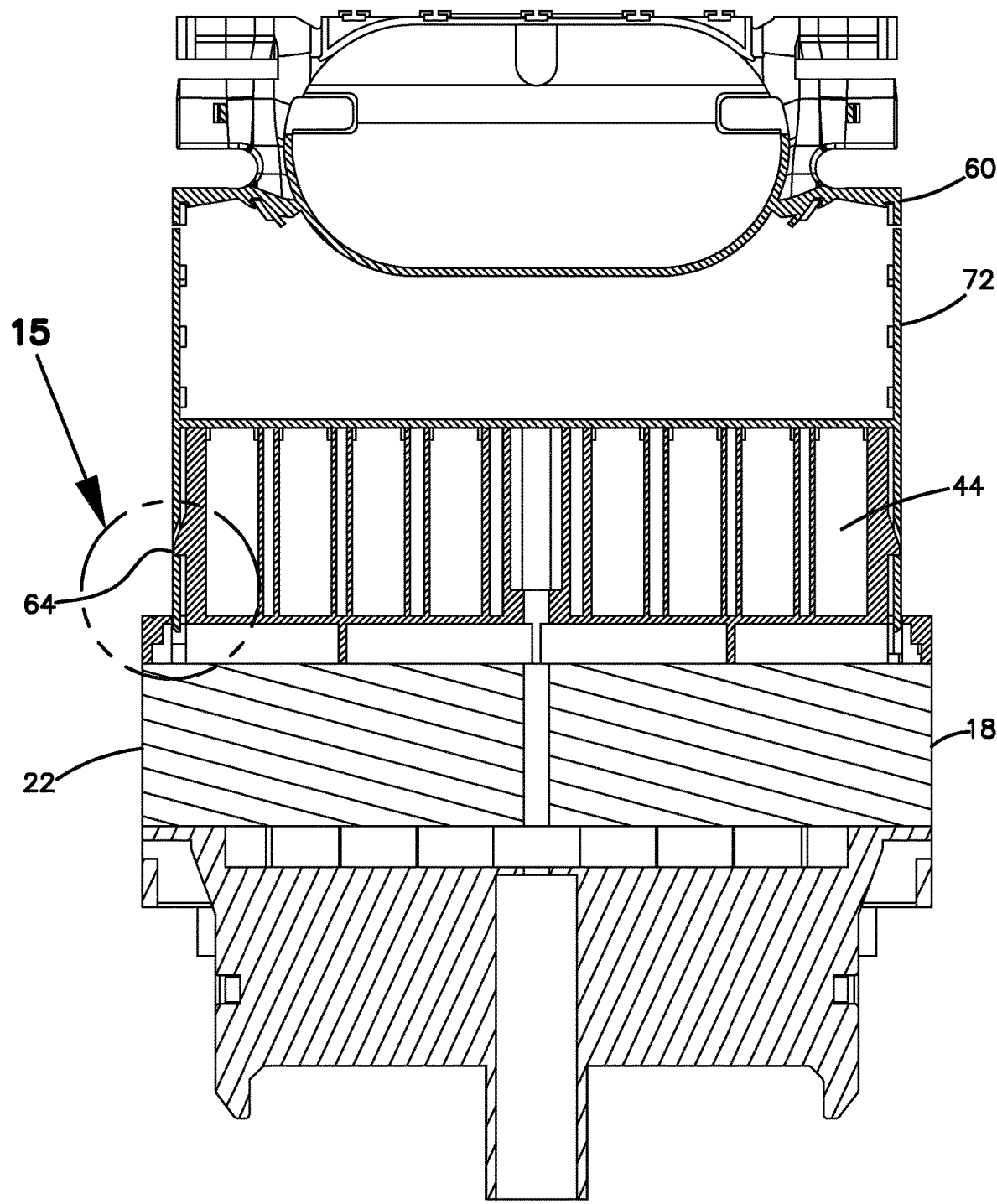
FIG. 13 shows in cross-section the organizer mounted to the seal block.
Figure 16:
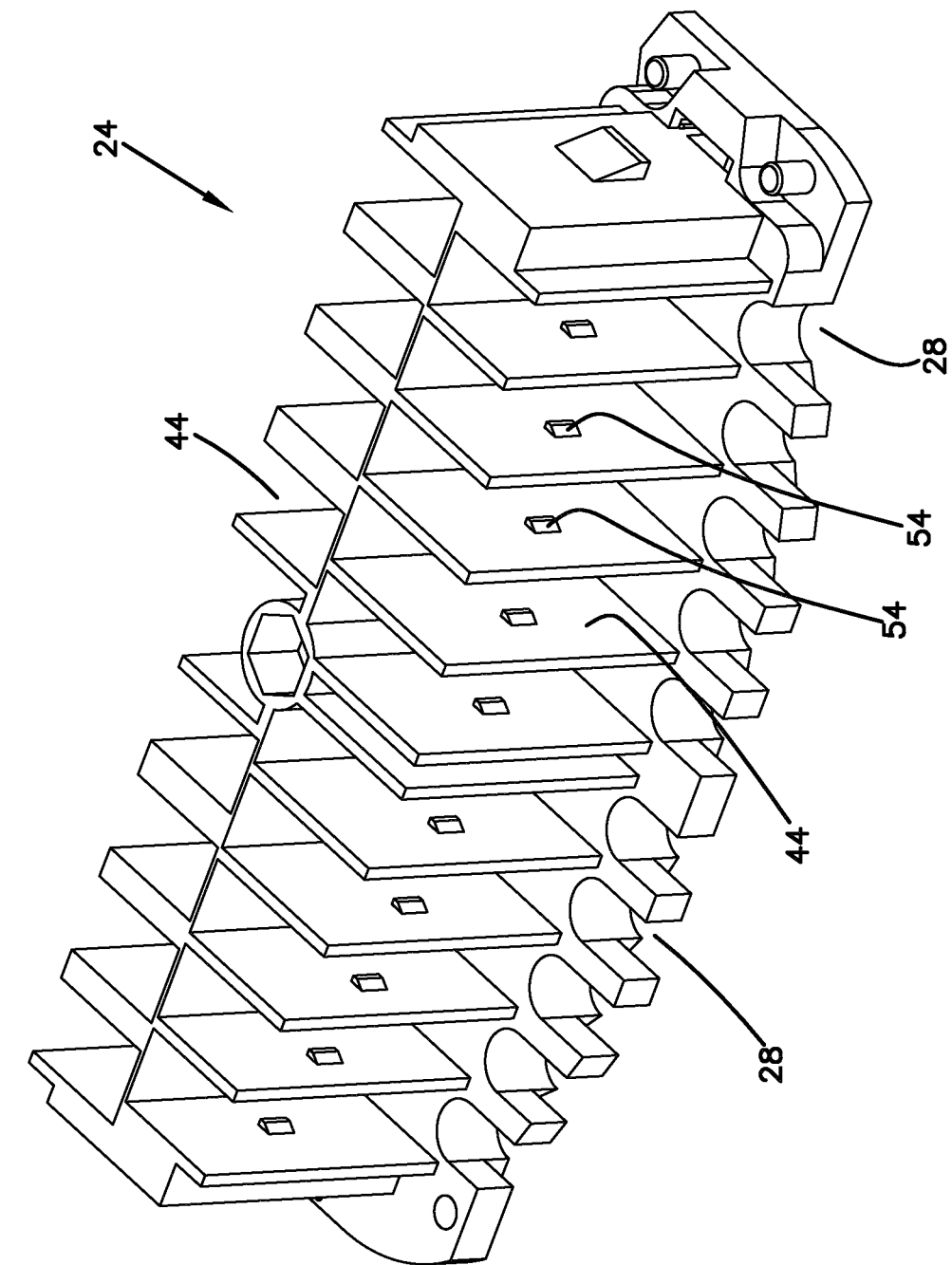
FIG. 16 is a perspective view of the upper portion of the seal block.
Figure 17:
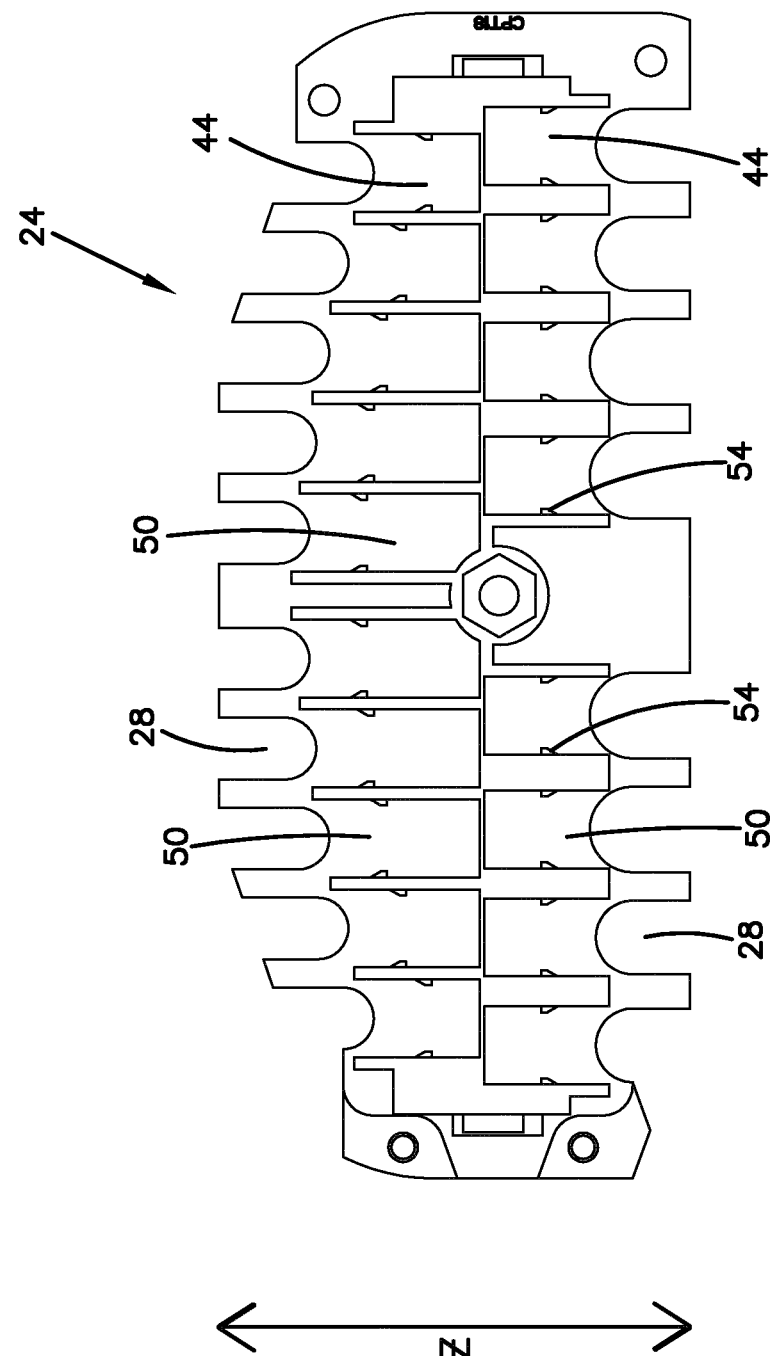
FIG. 17 is a top view of the upper portion of the seal block.
Figure 18:
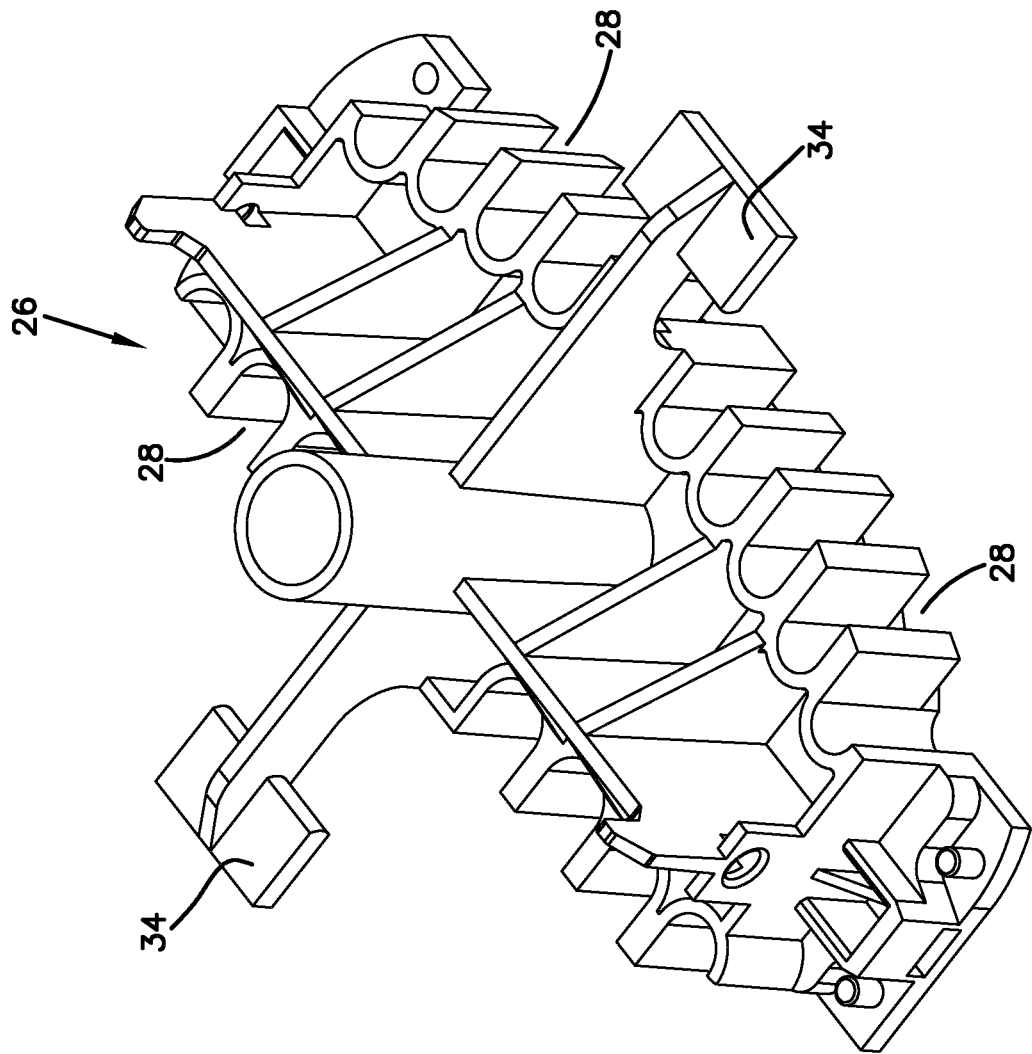
FIG. 18 is a perspective view of the lower portion of the seal block.
Figure 19:
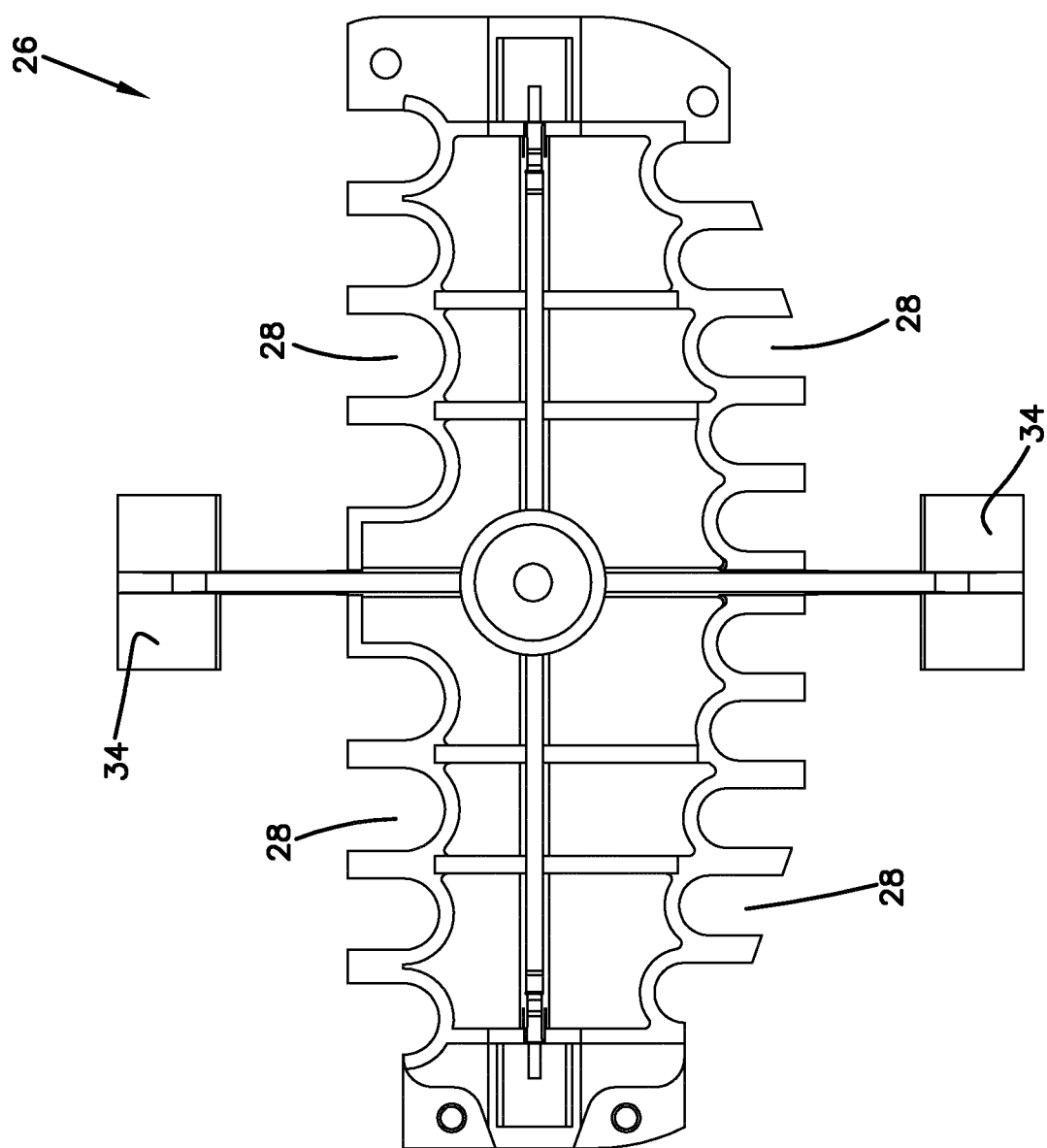
FIG. 19 is a bottom view of the lower portion of the seal block.
Figure 20:
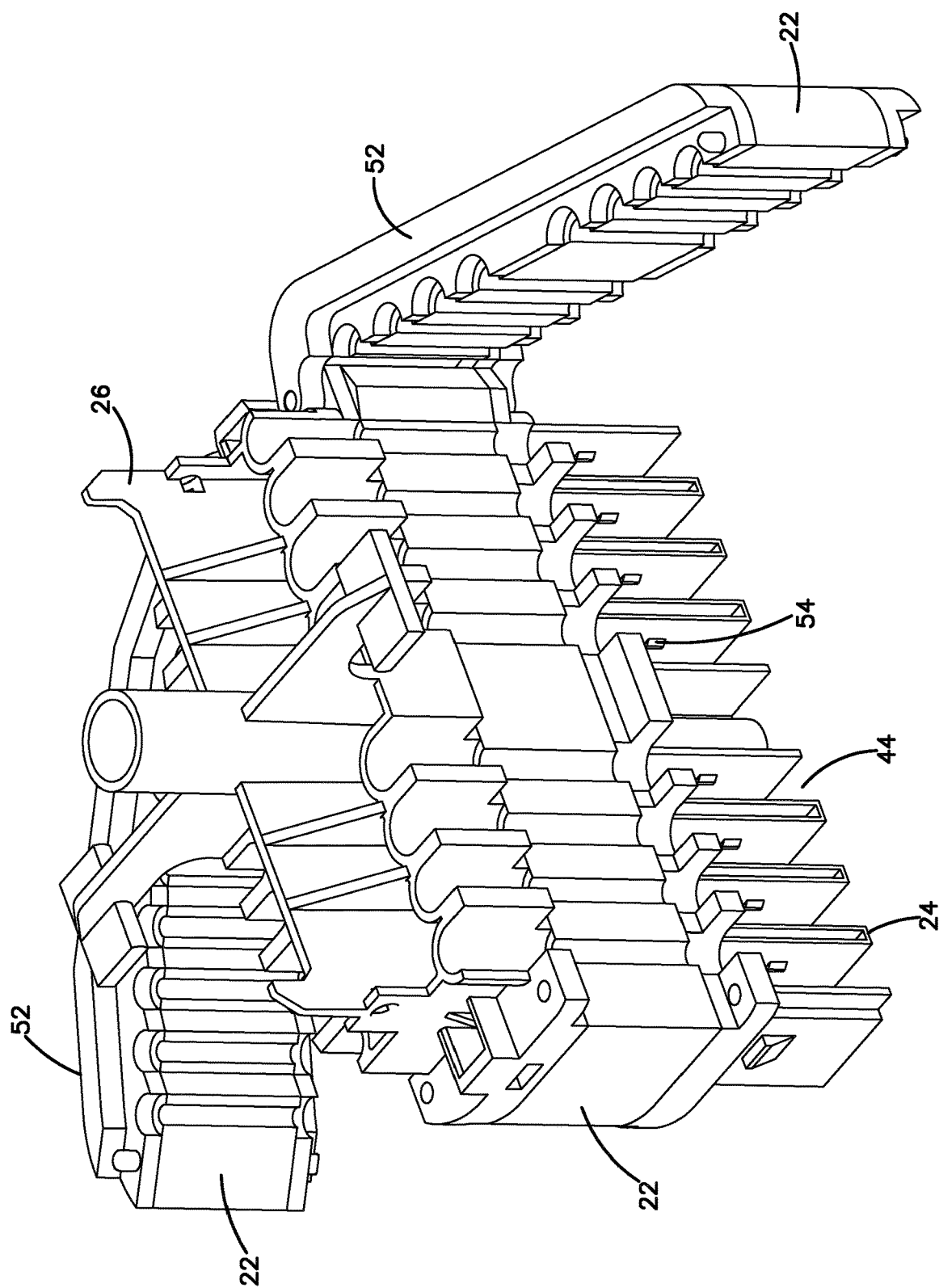
FIG. 20 is a view of the seal block showing the open covers.
Figure 21:
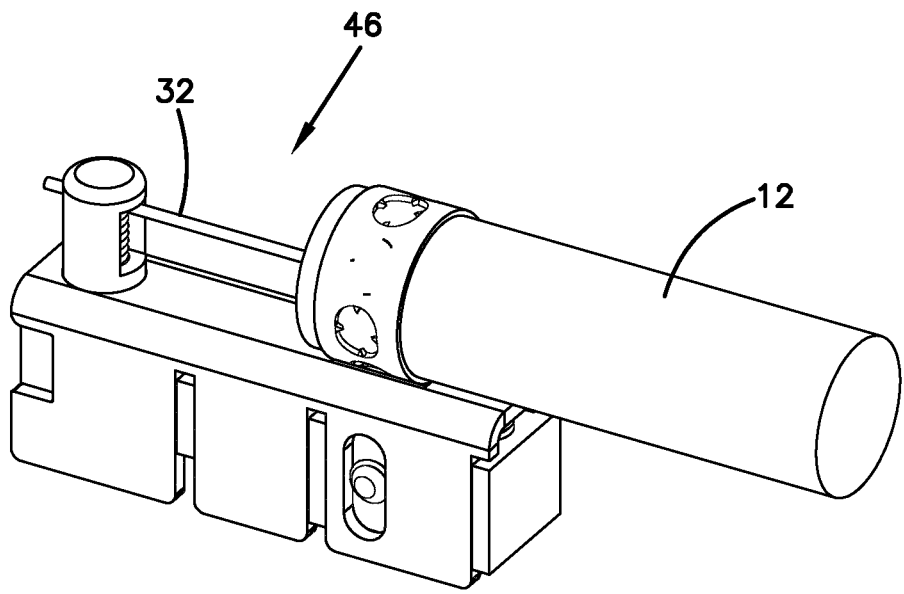
FIG. 21 is a perspective view of a cable clamp.
Figure 22:
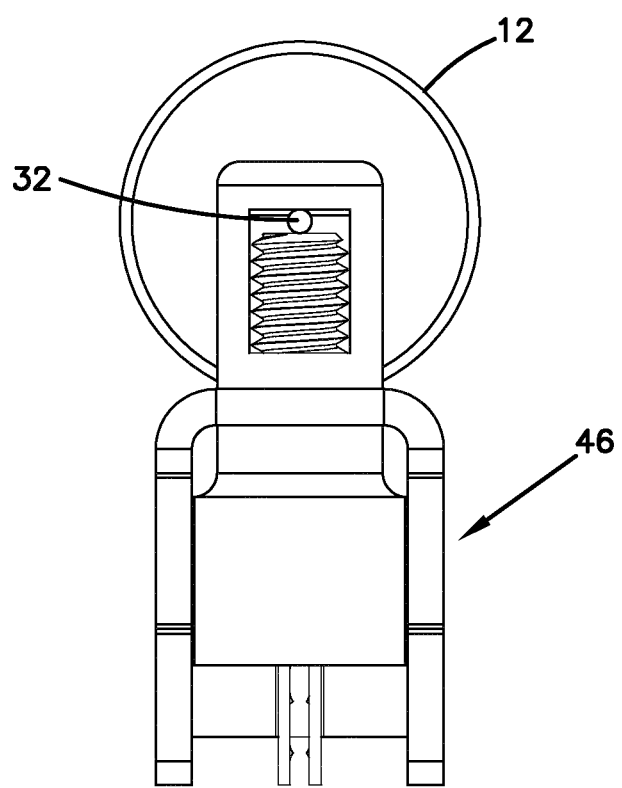
FIG. 22 is an end view of the cable clamp of FIG. 21.
Figure 25:
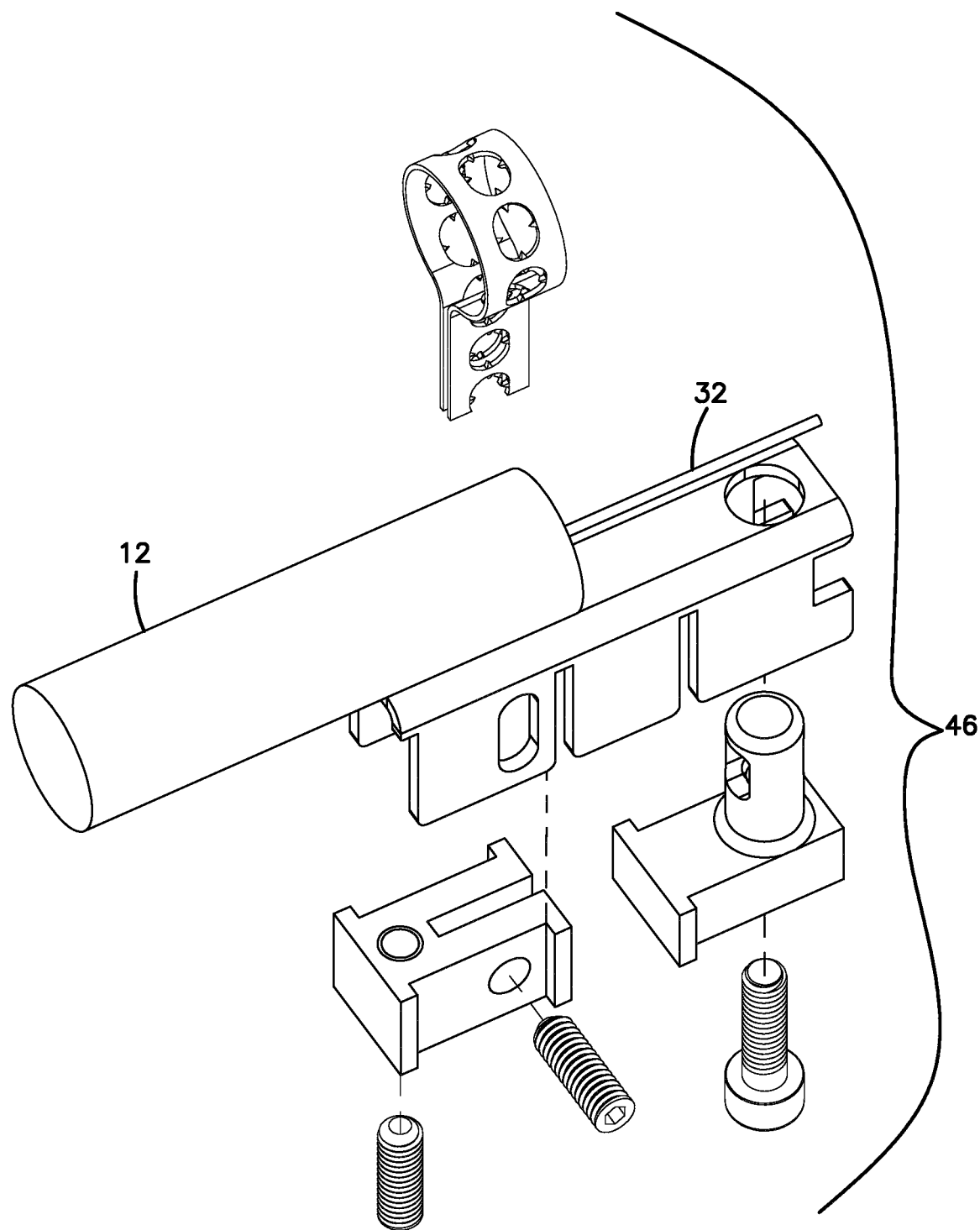
FIG. 25 is an exploded view of the cable clamp.
Figure 26:
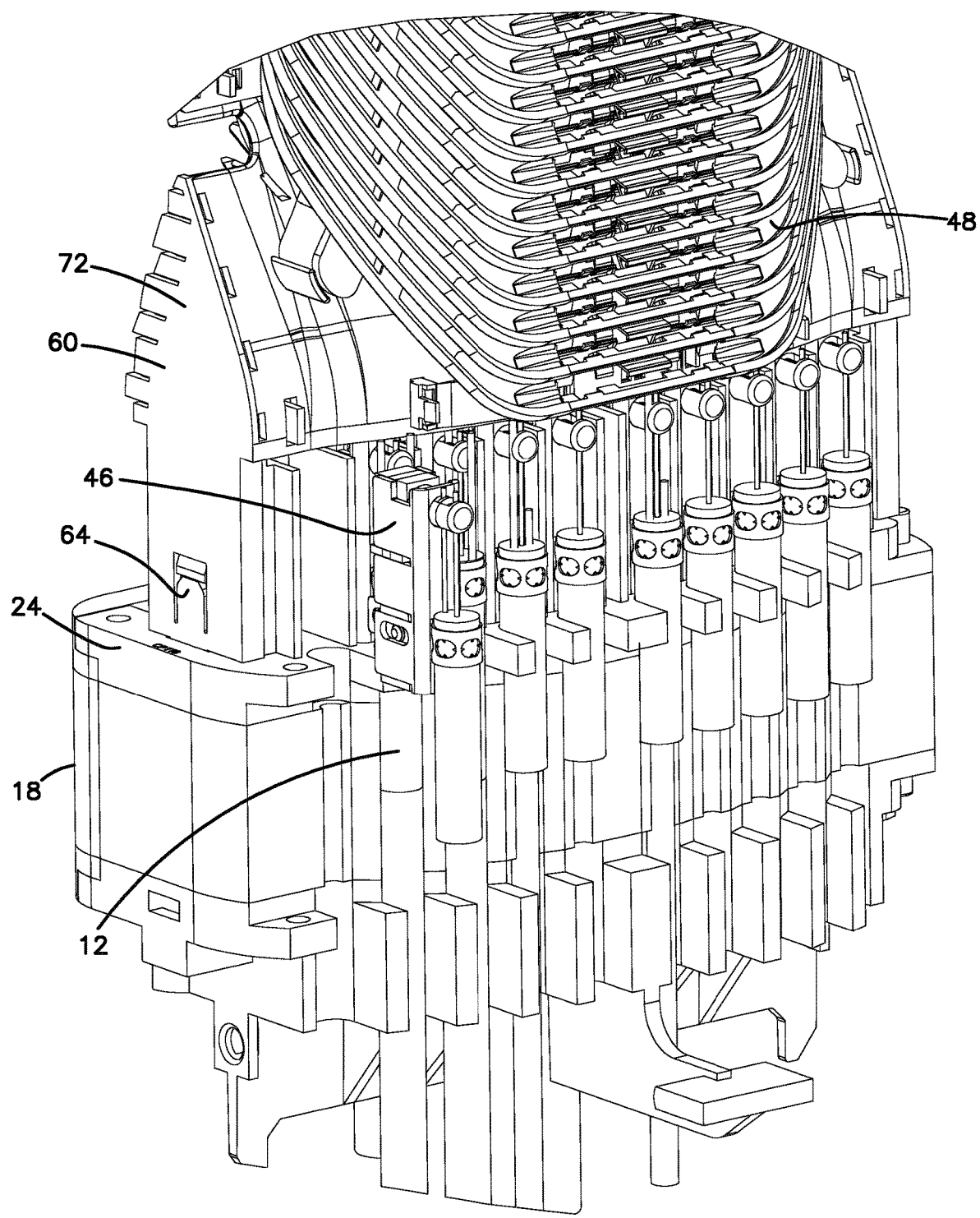
FIG. 26 shows a plurality of the cable clamps mounted to the seal block.

Positioned on framework 300 above the bottom and top tube holder 340, 350 is a cable organizer or management plate 390. Cable organizer plate 390 can be made with an integral construction, or it can be made in multiple pieces. If made in multiple pieces, cable organizer 390 can be designed to assemble together in desired configurations with different elements. As shown, a first organizer element 392 includes a FIG. 8 configuration for changing cable directions and/or allowing cable passage from one side of cable organizer 390 to the other. A second organizer element 394 can hold cables for storage. A third organizer element 396 can hold cable splices or splitters. Each of the first, second and third organizer elements 392, 394, 396 can include cable retention tabs to assist with cable management. Organizer plate 390 snap fits to framework 300. A side ramp 400 leads from a bottom side of cable organizer 390 to an upper side in communication with side slots 404. Tabs 408 can assist with cable retention in side slots 404. Upper ramp 410 leads from top tube holders 340 to side slots 404 where the cables meet with cables from the bottom side of cable organizer 390. Elements 392, 394, 396 can be arranged in a different order or be constructed differently, if desired. The elements 392, 394, 396 can be reduced to 2 or 1 if desired, for smaller profile enclosures.

A tower 420 mounts to an end of cable organizer 390 and defines mounting locations 422 for mounting pivoting trays 426. Trays 426 pivot upwardly away from cable organizer 390 as desired. Each tray 426 can receive an incoming and outgoing single or multiple fibers which can be managed by each tray. Each tray 426 can include cable routing areas 428 and cable splicing areas 430.

One or more trays 426 can be received within an interior region 432 of cable organizer 390 and disposed between side slots 404 for improved space savings. In addition, area 440 between top tube holder 350 and cable organizer 390 can be utilized for cable storage.

Figure 62:
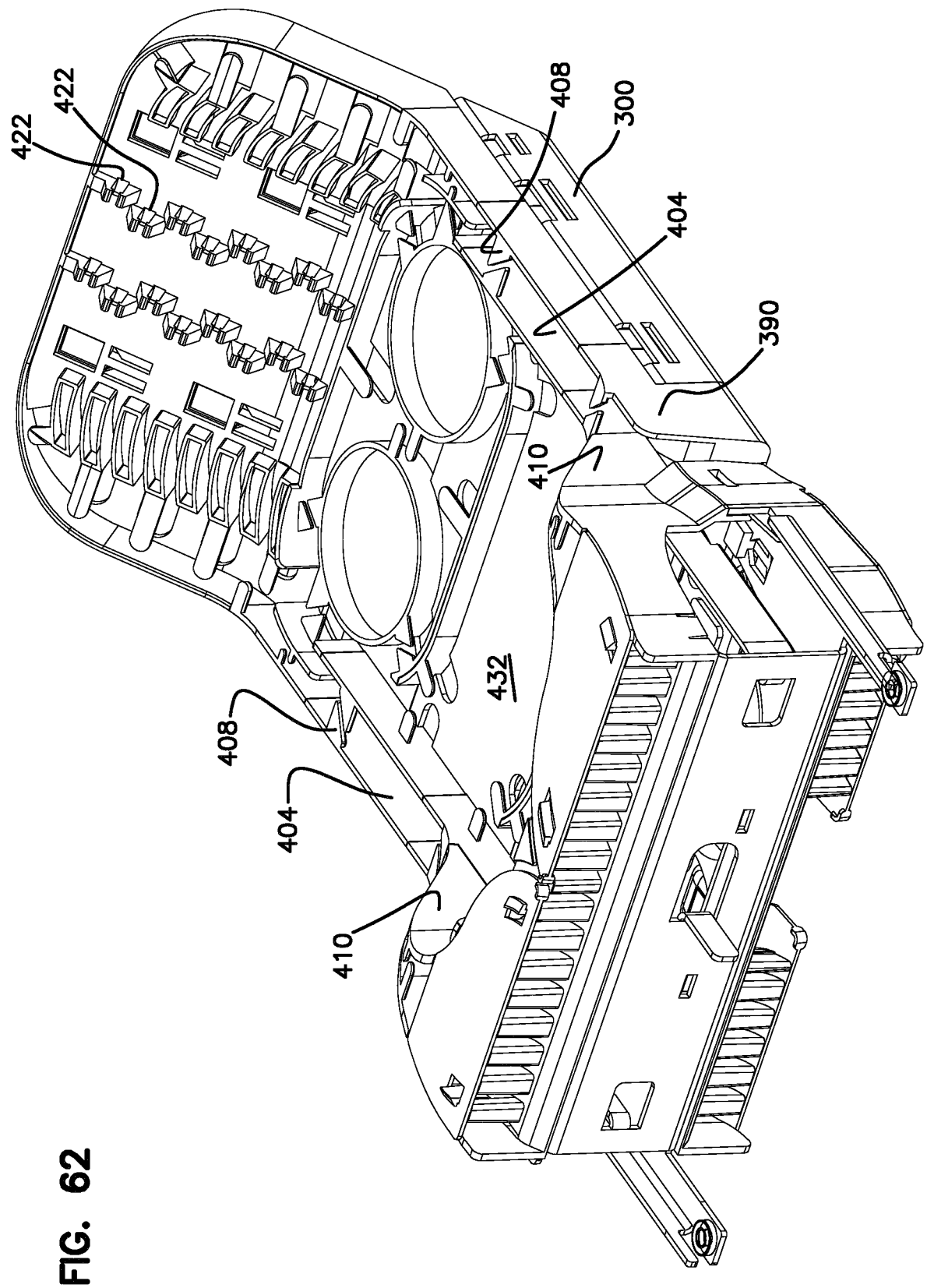
FIG. 62 shows the organizer in perspective view without the pivoting trays.
Figure 63:
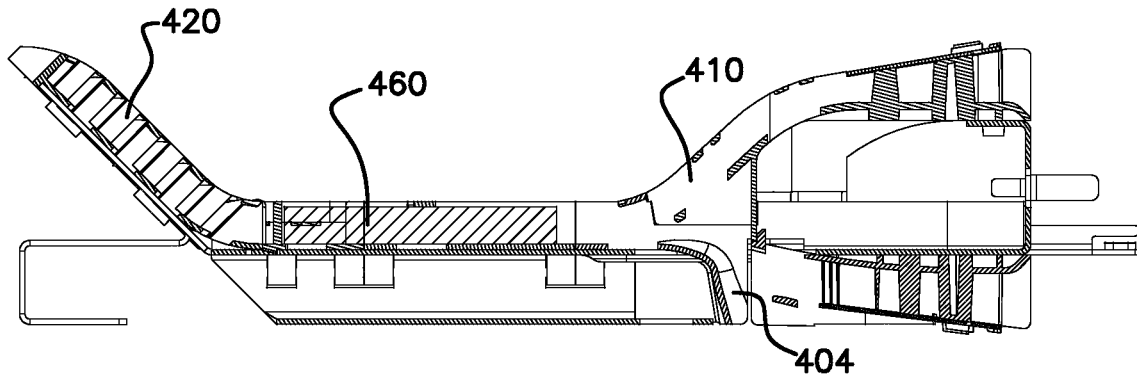
FIG. 63 is a cross-sectional side view of the organizer of FIG. 62, showing a first cable crossing area.
Figure 64:
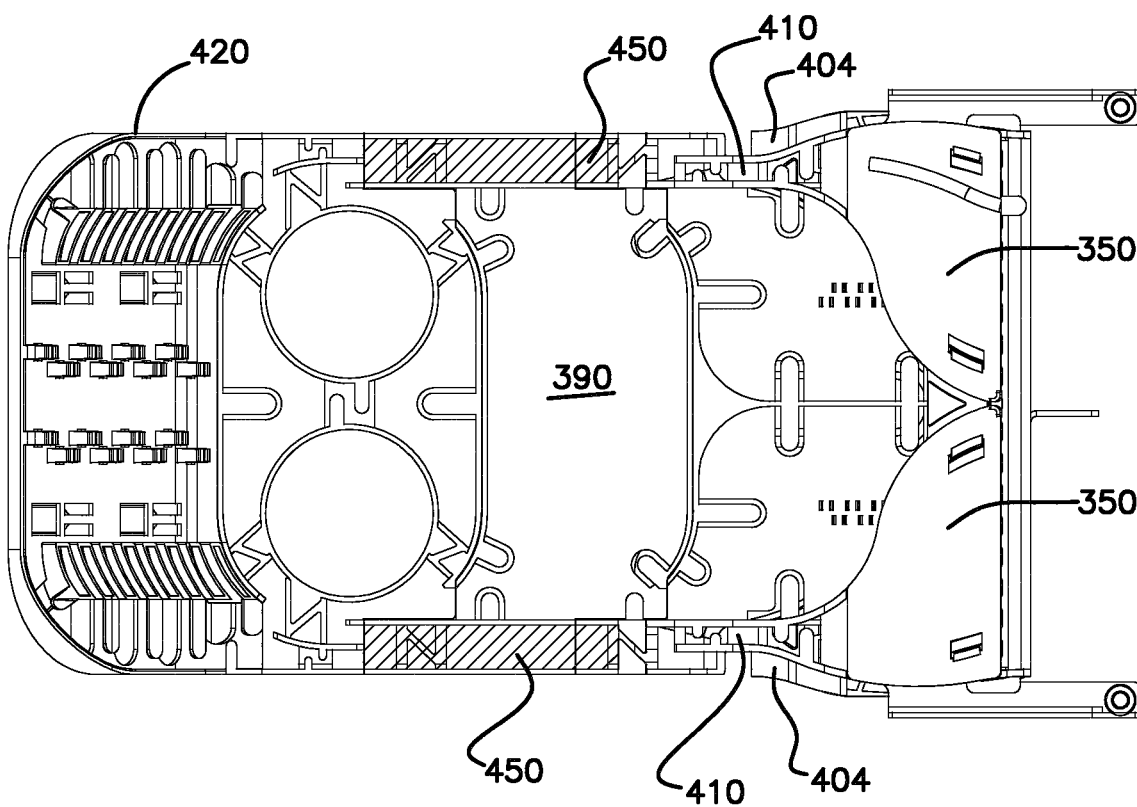
FIG. 64 is a top view of the organizer of FIG. 62, showing another cable crossing area.

As shown in FIGS. 62-64, cables entering cable organizer 390 from the top side and from the bottom side they need to cross one another at crossing area 450 (vertical plane). In addition, cables may need to cross a second time to enter cable organizer 390, or continue to tower 420 at second crossing area 460 (horizontal plane). As shown, these areas are separated to allow for crossings of cables into planes, without causing potential tangling or knotting of the cables. If all of the crossings were located in area, in both the vertical plane and the horizontal plane, a greater potential for tangling or knotting of the cables could occur.

Figure 65:
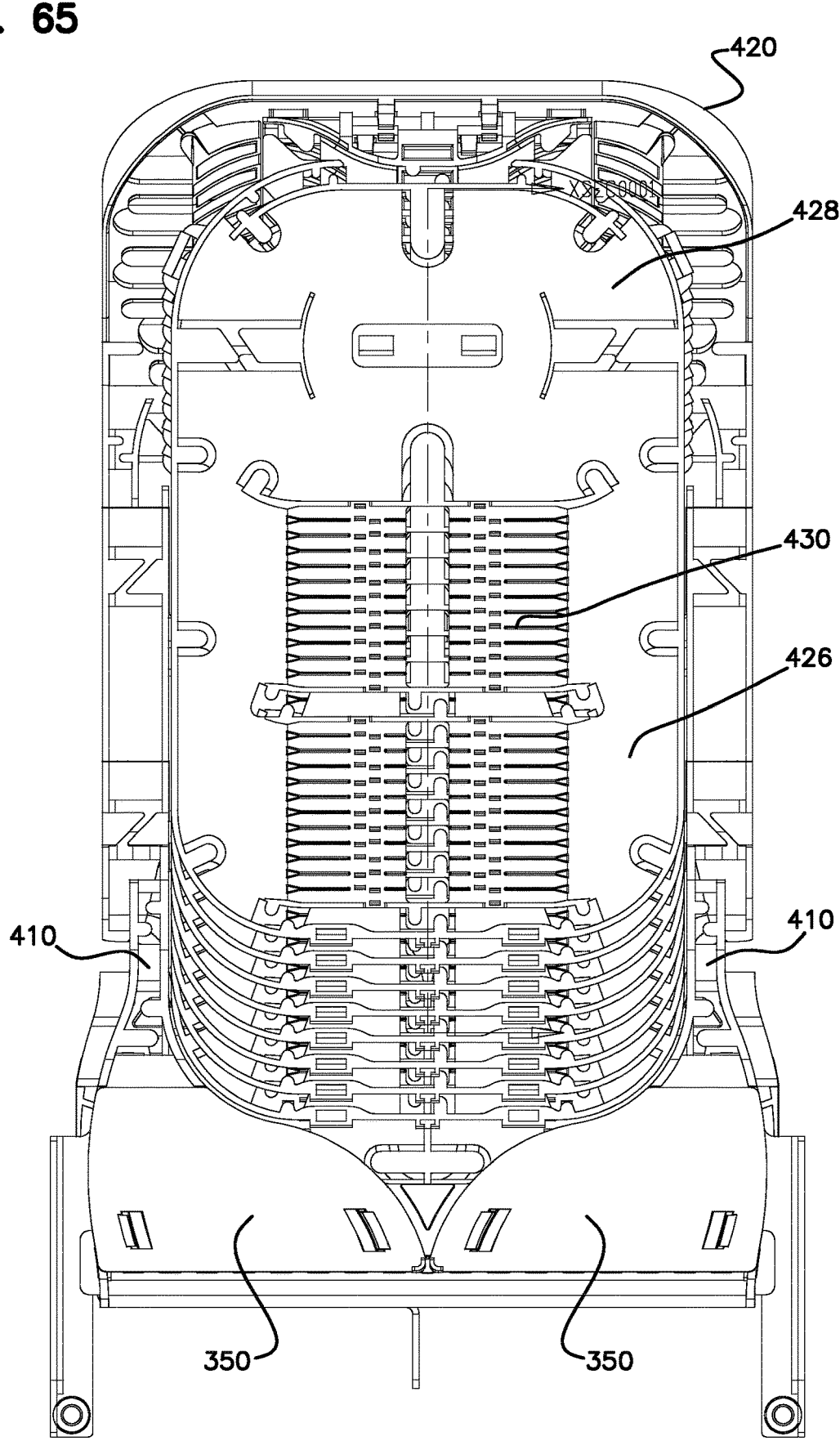
FIG. 65 is a top view of the cable organizer.
Figure 66:
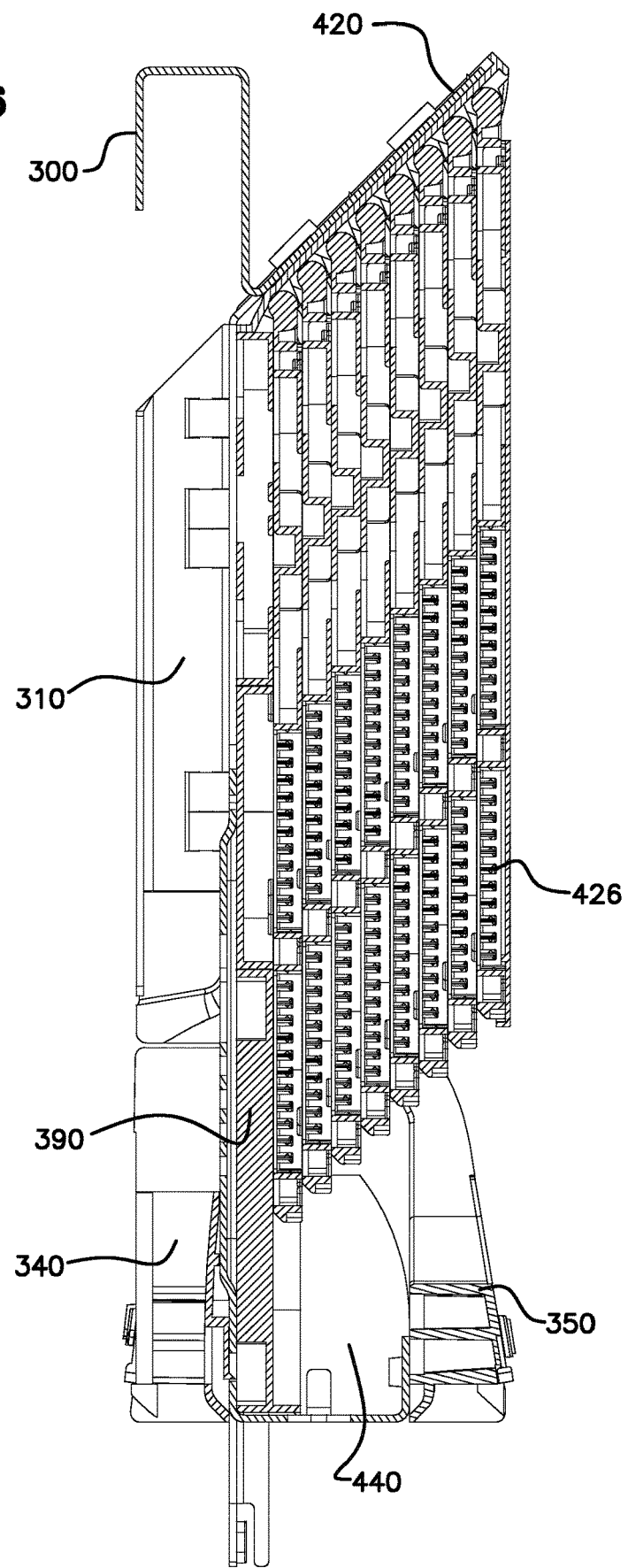
FIG. 66 is a cross-sectional side view of the cable organizer.
Figure 67:
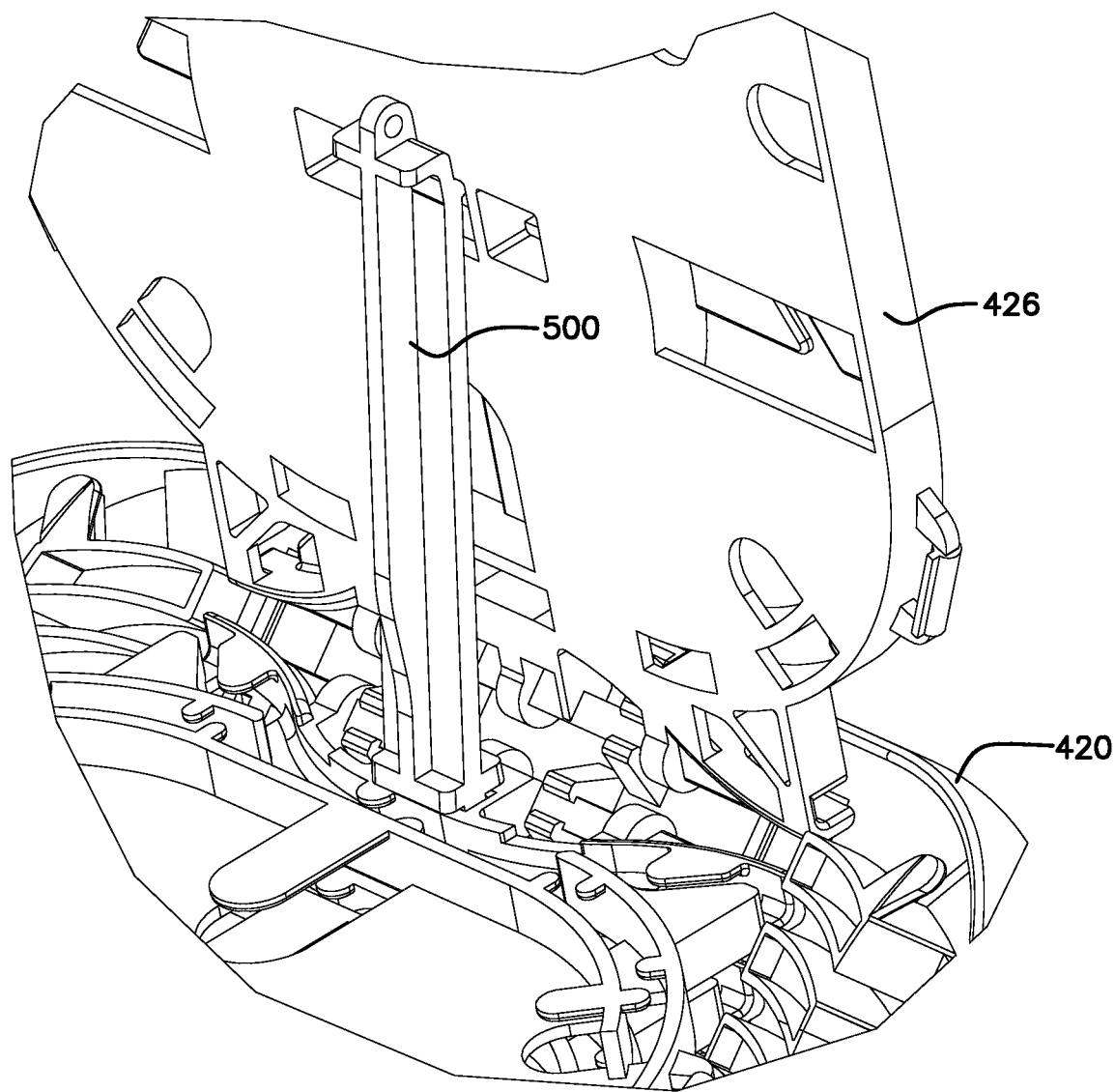
FIG. 67 shows one of the trays pivoted upwardly with a support member in position.
Figure 68:
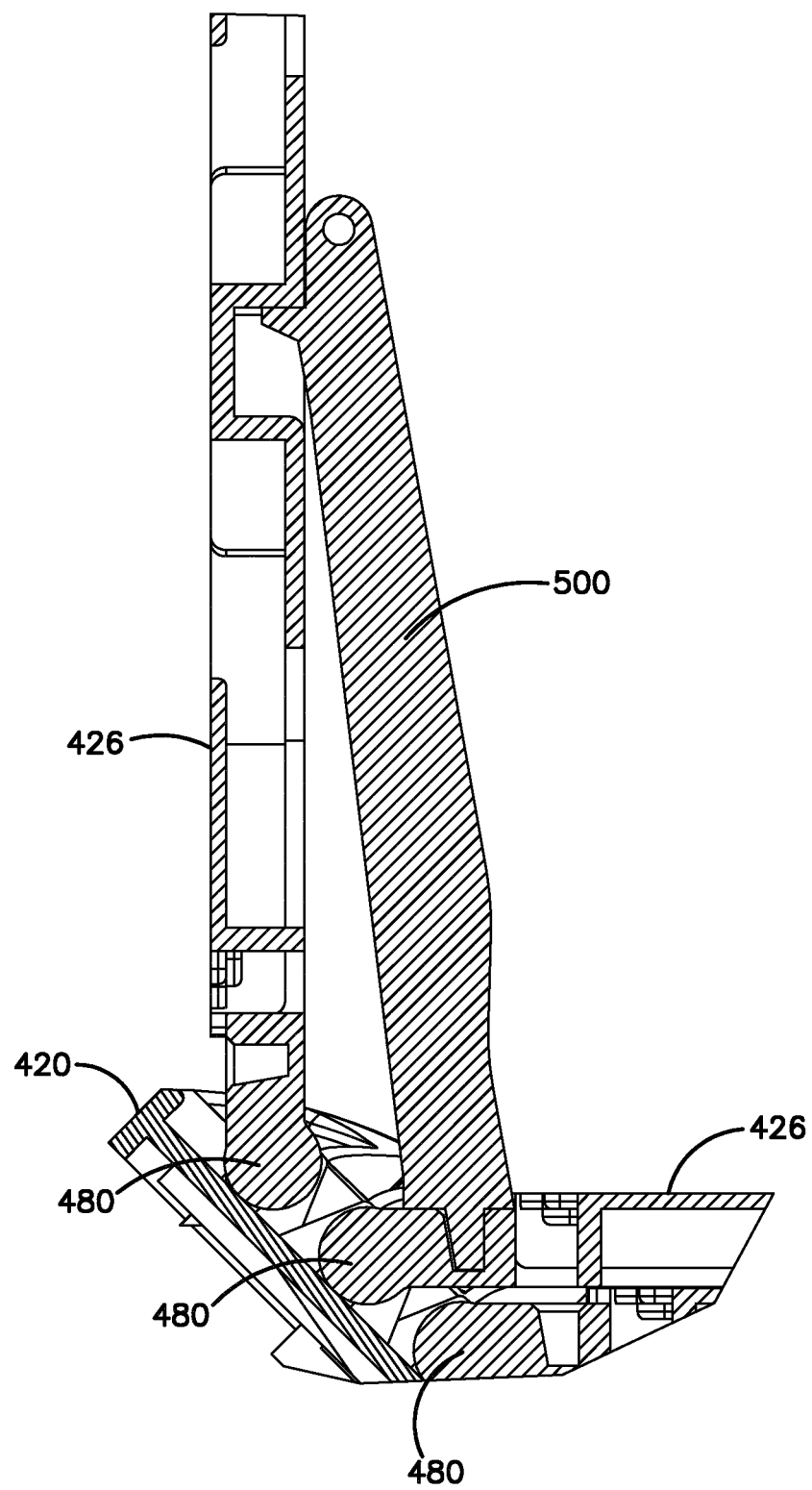
FIG. 68 shows the view of FIG. 67 in cross-section.

As shown in FIG. 65, pivoting trays 426 are received in a curved pocket formed by top tube holders 350 for improved space efficiencies. The cables are directed toward the side slots 404 via upper ramps 410

Figure 69:
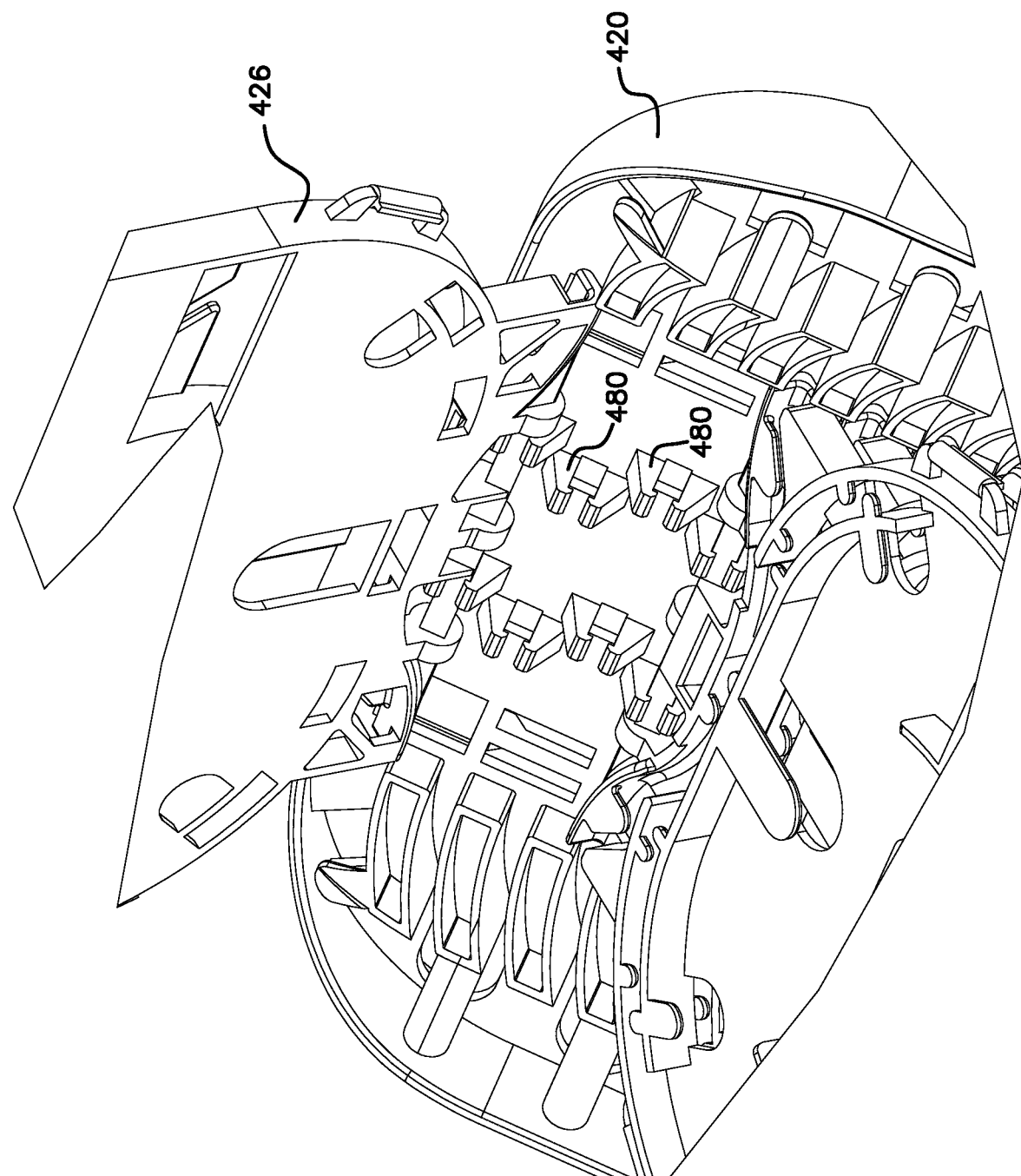
FIG. 69 shows the pivotal tray mount region of the organizer.
Figure 70:
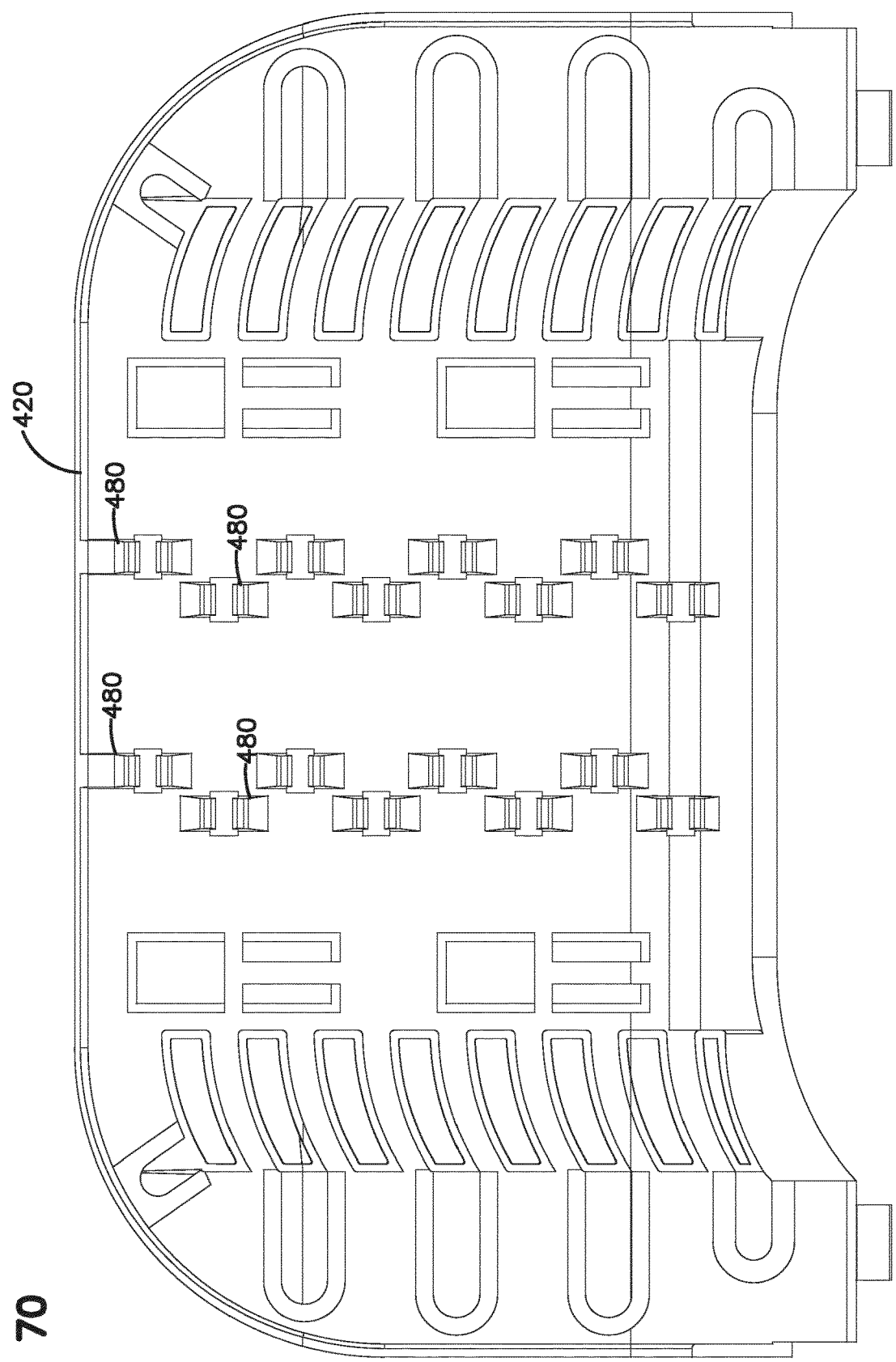
FIG. 70 shows the tray mount on the tower.

Referring now to FIGS. 67-70, pivoting trays 426 are mounted to tower 420 for pivoting movement to allow selected access to a desired tray. Tower 420 is angled relative to the plane defined by cable organizer 390. Such angling allows for trays 426 to lay flat on top of one another, for improved space efficiency. Increased density of the cable trays is facilitated by the staggering of the hinges 480 between adjacent trays as shown in FIGS. 69 and 70. Also, each tray has a non-rounded hinge shaft 490 which allows for each tray to pivot into position and maintain this position while pivoted. Should additional support be desired, such as due to the weight of the tray and its contents, a support element 500 can be provided to hold the desired number of trays upwardly allowing a technician to access a lower tray.

Support element 500 is located to not interfere with any fiber routing of the exposed tray 426. Fiber management tool 504 can be used to help locate selected fibers on trays 426 or organizer 390.

PARTS LIST 10 enclosure
12 cables
14 cover
16 open end
18 seal block
20 interior
22 gel seal
24 upper portion
26 lower portion
28 openings
30 latches
32 strength member
L length of open end
W width of open end
34 arms
36 openings
38 tabs
44 mounting locations
46 cable fixation clamps
48 trays
50 pockets
52 arms
54 clips
60 organizer
64 snaps
66 snaps
68 clips
70 snaps
72 first block
74 groove plate
78 end plate
80 snaps
82 front side
84 rear side
92 opening
94 opening
100 cable storage area
104 mounting posts
110 divider plate
120 finger
122 finger
124 tab
150 mounting pocket
154 mounting clip
156 extension
158 projecting clip
160 cable tie location
170 shaft
174 arms
178 non-cylindrical portion
184 knob
186 base portion
210 enclosure
214 cover
216 open end
218 base
220 seal block
224 cable fixation areas
226 cable fixation areas
230 latches 260 organizer
300 framework
304 fasteners
310 cable basket
320 flanges
330 end
332 opening
340 bottom tube holder
350 top tube holder
360 cable slots
370 retention tube
372 tube handle
380 covers
390 cable organizer plate/management plate
392 first organizer element
394 second organizer element
396 third organizer element
398 tabs
400 side ramp
404 side slots
408 tabs
410 upper ramp
420 tower
422 mounting locations
426 pivoting trays
428 cable routing areas
430 cable splicing areas
432 interior region
440 cable storage area
450 first crossing area
460 second crossing area
480 hinges
490 shaft
500 support element
504 management tool
506 tray cover

What is claimed is:

1. A cable organizer comprising:
a framework extending from a top to a bottom along a first axis, extending from a left side to a right side along a second axis, and extending from a proximate end to a distal end along a third axis, the first axis, the second axis and the third axis being mutually perpendicular to one another, the framework having an upper first surface at an upper side and a lower second surface at an opposite lower side, each of the upper side and the lower side extending between the proximate end and the distal end of the framework, the upper first surface and the lower second surface facing opposite directions from each other along the first axis;
a cable organizer plate mounted to the upper first surface at the upper side of the framework;
a tube holder mounted to the upper side of the framework at the proximate end of the framework and configured to receive one or more cables entering at the upper side of the framework;
a plurality of trays pivotable relative to the cable organizer plate, all of the plurality of trays arranged at the upper side of the framework;
a cable basket positioned at the lower side of the framework and defined in part by the lower second surface of the framework, the cable basket defining an opening at the proximate end of the framework through which cables entering the second side of the framework can enter the cable basket for storage in the cable basket, the cable basket including a plurality of flanges of the framework that are arranged below, and parallel to, the lower second surface, the plurality of flanges configured to retain cables between the flanges and the lower second surface;
a first side slot positioned, relative to the second axis, at a right side of the opening and configured to guide cables within the first slot from the lower side to the upper side of the framework; and
a second side slot positioned, relative to the second axis, at a left side of the opening and configured to guide cables within the second slot from the lower side of the framework to the upper side of the framework.

2. The cable organizer of claim 1, wherein each of the first side slot and the second side slot includes a ramp extending between the upper side and the lower side of the framework.

3. The cable organizer of claim 1, further comprising a tower, the tower defining mounting locations for pivotally mounting the plurality of trays.

4. The cable organizer of claim 3, wherein the framework includes a third surface angled away from the upper first surface for mounting the tower.

5. The cable organizer of claim 1, wherein the tube holder includes a plurality of cable slots for the one or more cables entering at the first side of the framework.

6. The cable organizer of claim 5,
wherein the tube holder includes a first set of cable slots for guiding at least one of the one or more cables entering at the upper first side of the framework to a right side of the cable organizer plate and a right side of the plurality of trays; and
wherein the tube holder includes a second set of cable slots for guiding at least one of the one or more cables entering at the upper first side of the framework to a left side of the cable organizer plate and a left side of the plurality of trays.

7. The cable organizer of claim 1, wherein the cable basket is configured to store loop cables.

8. The cable organizer of claim 1, further comprising a cable.

9. The cable organizer of claim 8, wherein the cable includes:
a first portion that enters the lower side of the framework;
a second portion that enters the cable organizer through the opening; and
a third portion that is stored in the cable basket as a loop.

10. The cable organizer of claim 1, wherein the opening is centrally positioned between the first side slot and the second side slot.

11. A telecommunications closure, comprising:
a cover having an open end;
a base configured to mount to the cover;
a seal block configured to seal an interior of the closure; and
the cable organizer of claim 1, the cable organizer being configured to be positioned within the interior of the enclosure and to be inserted into the cover through the open end.

12. The telecommunications closure of claim 11, wherein each of the first side slot and the second side slot includes a ramp extending between the upper side and the lower side of the framework.

13. The telecommunications closure of claim 11, wherein the cable basket is configured to store loop cables.

14. The telecommunications closure of claim 11, further comprising a cable, wherein the cable includes:
a first portion that enters the lower side of the framework;
a second portion that enters the cable organizer through the opening; and
a third portion that is stored in the cable basket as a loop.

15. The telecommunications closure of claim 11, wherein the opening is centrally positioned between the first side slot and the second side slot.

16. The telecommunications closure of claim 11, wherein the seal block is mounted to the cable organizer and is configured to seal to the base.

17. The telecommunications closure of claim 16, wherein the seal block includes a cable fixation area.

* * * * *

UNITED STATES PATENT AND TRADEMARK OFFICE
CERTIFICATE OF CORRECTION

Page 1 of 1

PATENT NO. : 11,016,257 B2
APPLICATION NO. : 16/546489
DATED : May 25, 2021
INVENTOR(S) : Mohamed Aznag et al.

It is certified that error appears in the above-identified patent and that said Letters Patent is hereby corrected as shown below:

In the Claims

Column 10, Line 26, Claim 6: "at the upper first side of the" should read --at the upper side of the--

Column 10, Line 31, Claim 6: "at the upper first side of the" should read --at the upper side of the--

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*